(12) United States Patent
Kodama

(10) Patent No.: US 9,755,862 B2
(45) Date of Patent: Sep. 5, 2017

(54) SIGNAL TRANSFER DEVICE FOR TRANSFERRING SIGNAL BY BALANCED TRANSMISSION

(71) Applicant: Funai Electric Co., Ltd., Daito, Osaka (JP)

(72) Inventor: Shinichi Kodama, Shijonawate (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 15/095,446

(22) Filed: Apr. 11, 2016

(65) Prior Publication Data
US 2016/0308692 A1 Oct. 20, 2016

(30) Foreign Application Priority Data

Apr. 14, 2015 (JP) .................... 2015-082453

(51) Int. Cl.
*H04L 25/02* (2006.01)
*H04B 1/7097* (2011.01)
(Continued)

(52) U.S. Cl.
CPC ....... *H04L 25/0276* (2013.01); *H04B 1/7097* (2013.01); *H04B 3/06* (2013.01);
(Continued)

(58) Field of Classification Search
CPC . H04L 25/0276; H04L 25/0274; H04L 25/08; H04L 25/085; H04L 25/0272;
(Continued)

(56) References Cited

U.S. PATENT DOCUMENTS

| | | | | |
|---|---|---|---|---|
| 6,052,420 A | * | 4/2000 | Yeap .................. | H04B 15/00 375/258 |
| 2005/0066077 A1 | * | 3/2005 | Shibata ............... | G06F 1/3203 710/33 |

(Continued)

FOREIGN PATENT DOCUMENTS

JP  2002-289992 A  10/2002

OTHER PUBLICATIONS

Extended European Search Report of the corresponding European Patent Application No. 16164885.2, dated Sep. 15, 2016.

*Primary Examiner* — Aristocratis Fotakis
(74) *Attorney, Agent, or Firm* — Global IP Counselors, LLP

(57) ABSTRACT

A signal transfer device includes a signal transmitter, a first amplitude adjustment component, an adjustment signal output component, a detector and a second amplitude adjustment component. The signal transmitter outputs signals to first and second transfer paths based on single-phase or differential input signal. The first amplitude adjustment component adjusts at least one of amplitudes of the signals transferred to the first and second transfer paths based on a predetermined amplitude ratio. The adjustment signal output component outputs adjustment signals to the first and second transfer paths. The detector detects the adjustment signals. The second amplitude adjustment component adjusts at least one of the amplitudes of the signals transferred to the first and second transfer paths based on detection result of the detector.

8 Claims, 35 Drawing Sheets

(51) Int. Cl.
  *H04B 3/06*   (2006.01)
  *H04L 25/08*  (2006.01)
  *H04B 3/28*   (2006.01)

(52) U.S. Cl.
  CPC ............... *H04B 3/28* (2013.01); *H04L 25/08* (2013.01); *H04B 2201/709709* (2013.01)

(58) Field of Classification Search
  CPC ........ H04B 1/7097; H04B 15/00; H04B 3/04; H05K 1/0245; H03H 2/005
  See application file for complete search history.

(56) References Cited

U.S. PATENT DOCUMENTS

| | | | |
|---|---|---|---|
| 2006/0187004 A1 | 8/2006 | Vollmer et al. | |
| 2013/0195218 A1* | 8/2013 | Whitby-Strevens | H04B 15/00 375/296 |
| 2014/0178064 A1* | 6/2014 | Hino | H04J 1/12 398/41 |
| 2014/0327717 A1* | 11/2014 | Umeda | B41J 2/04563 347/17 |
| 2015/0023446 A1* | 1/2015 | Kodama | H04B 15/00 375/268 |
| 2015/0036756 A1* | 2/2015 | Choi | G09G 5/006 375/240.28 |
| 2016/0080007 A1* | 3/2016 | Yong | H04B 1/0475 375/297 |

* cited by examiner

| NO. | EVENT | MOBILE DEVICE, OR DEVICE INCLUDING WIRELESS COMMUNICATION OR WIRELESS BROADCASTING | STATIONARY DEVICE |
|---|---|---|---|
| 1 | COMMUNICATION HALTED BETWEEN TRANSMITTER AND RECEIVER | CONTROL OFF | CONTROL OFF |
| 2 | COMMUNICATION CONTINUING BETWEEN TRANSMITTER AND RECEIVER | FEEDBACK CONTROL | FIXED VALUE CONTROL |
| 3 | COMMUNICATION STARTED BETWEEN TRANSMITTER AND RECEIVER | FEEDBACK CONTROL | FEEDBACK CONTROL |
| 4 | COMMUNICATION CONDITIONS HAVE CHANGED BETWEEN TRANSMITTER AND RECEIVER | FEEDBACK CONTROL | FEEDBACK CONTROL |
| 5 | TRANSMITTER OR RECEIVER HAS STARTED OPERATING | FEEDBACK CONTROL | FEEDBACK CONTROL |
| 6 | TRANSMITTER OR RECEIVER CONNECTED TO TRANSMISSION PATH | FEEDBACK CONTROL | FEEDBACK CONTROL |
| 7 | DEGRADATION OF SIGNAL QUALITY (S/N, ETC.) EXCEEDING PERMISSIBLE RANGE CONFIRMED | FEEDBACK CONTROL | FEEDBACK CONTROL |
| 8 | OTHER EVENT HAS OCCURRED THAT CAN AFFECT SIGNAL ENVIRONMENT WITH DEVICE INCLUDING TRANSMITTER OR RECEIVER | FEEDBACK CONTROL | FEEDBACK CONTROL |
| 9 | OPERATING CONDITIONS OF TRANSMITTER AND/OR RECEIVER HAVE CHANGED AT REQUEST FROM OTHER CIRCUIT | FEEDBACK CONTROL | FEEDBACK CONTROL |
| 10 | SPECIFIC LENGTH OF TIME HAS ELAPSED | FEEDBACK CONTROL | FEEDBACK CONTROL |

FIG. 61

SIGNAL TRANSFER DEVICE FOR TRANSFERRING SIGNAL BY BALANCED TRANSMISSION

CROSS-REFERENCE TO RELATED APPLICATIONS

This application claims priority to Japanese Patent Application No. 2015-082453 filed on Apr. 14, 2015. The entire disclosure of Japanese Patent Application No. 2015-082453 is hereby incorporated herein by reference.

BACKGROUND

Field of the Invention

The present invention generally relates to a signal transfer device.

Background Information

In general, the methods for transferring electrical signals are broadly grouped into two types: unbalanced transfer and balanced transfer. Unbalanced transfer is a method in which an electrical signal is transferred using a single transfer line. Balanced transfer is a method in which an electrical signal is converted into a pair of transfer signals of mutually opposite phase (differential signals), and are transferred using a pair of transfer lines, as in Japanese Laid-Open Patent Application Publication No. 2002-289992 (Patent Literature 1), for example.

A major difference between the two methods is the effect of noise received during transfer. For example, with unbalanced transfer, when the transfer line receives noise from the outside, the noise component ends up being superposed over the electrical signal being transferred. Accordingly, the effect of noise received from the outside cannot be avoided.

On the other hand, with balanced transfer, even if the pair of transfer lines receives noise, since noise signals of the same phase and same amplitude are usually superposed over the transfer signals, the noise components are removed when the two transfer signals are transformed into single-phase electrical signals. Therefore, the effect of noise received from the outside can be avoided. Accordingly, balanced transfer is usually used with a communication system that makes use of high-frequency signals, high-speed communication interface such as HDMI™ or LVDS (low voltage differential signaling). In the case of HDMI, the transfer line includes an inter-device HDMI cable or an intra-device HDMI signal line. Of these, some HDMI cables have good shielding and are resistant to noise, but inexpensive models may not be very resistant. Within a device, sometimes a common mode filter or the like is provided to an HDMI signal line, but even still quite a lot of noise is emitted. Also, it is often the case that when an HDMI signal line is close to another communication circuit, noise becomes admixed into the signals of the other communication circuit, and affects the characteristics of the other communication circuit.

SUMMARY

Nevertheless, in balanced transfer, noise signals of the same phase superposed over the transfer signals will sometimes have asymmetrical amplitude. For example, there may be the case where the noise generation source is very close to the transfer line, or there may be the case where the design limitations prevent the pair of transfer lines from being installed in parallel. In these cases, noise components of different amplitude will be superposed over the various transfer signals, so the effect of noise received by electrical signals from the outside can be neither avoided nor suppressed. Furthermore, it is possible that noise will become admixed into the interior of the signal transmitter and signal receiver (see FIG. 1 (discussed below), for example). However, in portions such as the signal receiver and the signal transmitter that are functionally grouped together in a compact space, it is easy to come up with a design that will not allow any noise to be admixed. On the other hand, in transfer portions between functional portions, if connected functional portions can be laid out close together, the admixture of noise can be reduced, but there are situations when functional portions that are far apart are connected together for use, and in such cases noise tends to be admixed.

Also, in Patent Literature 1, the noise that radiates outward from a pair of transfer lines is reduced, but there is no mention whatsoever regarding suppression of noise received from the outside as discussed above.

The present invention is conceived in light of this situation, and it is an object thereof to provide a signal transfer device which effectively reduce the effect that noise signals of different amplitude have on differential signals, and with which there is no need for control lines to transfer control signals.

In view of the state of the known technology, a signal transfer device is provided that includes a signal transmitter, a first amplitude adjustment component, an adjustment signal output component, a detector and a second amplitude adjustment component. The signal transmitter outputs signals to first and second transfer paths based on single-phase or differential input signal. The first amplitude adjustment component adjusts at least one of amplitudes of the signals transferred to the first and second transfer paths based on a predetermined amplitude ratio. The adjustment signal output component outputs adjustment signals to the first and second transfer paths. The detector detects the adjustment signals. The second amplitude adjustment component adjusts at least one of the amplitudes of the signals transferred to the first and second transfer paths based on detection result of the detector.

BRIEF DESCRIPTION OF THE DRAWINGS

Referring now to the attached drawings which form a part of this original disclosure:

FIG. 61 is a table of control timing.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First, a specific example of a signal transfer device with which the effect that noise signals of different amplitude have on differential signals can be effectively reduced will be described through reference to the drawings, after which embodiments of the present invention will be described.

First Reference Example

Figure 1:
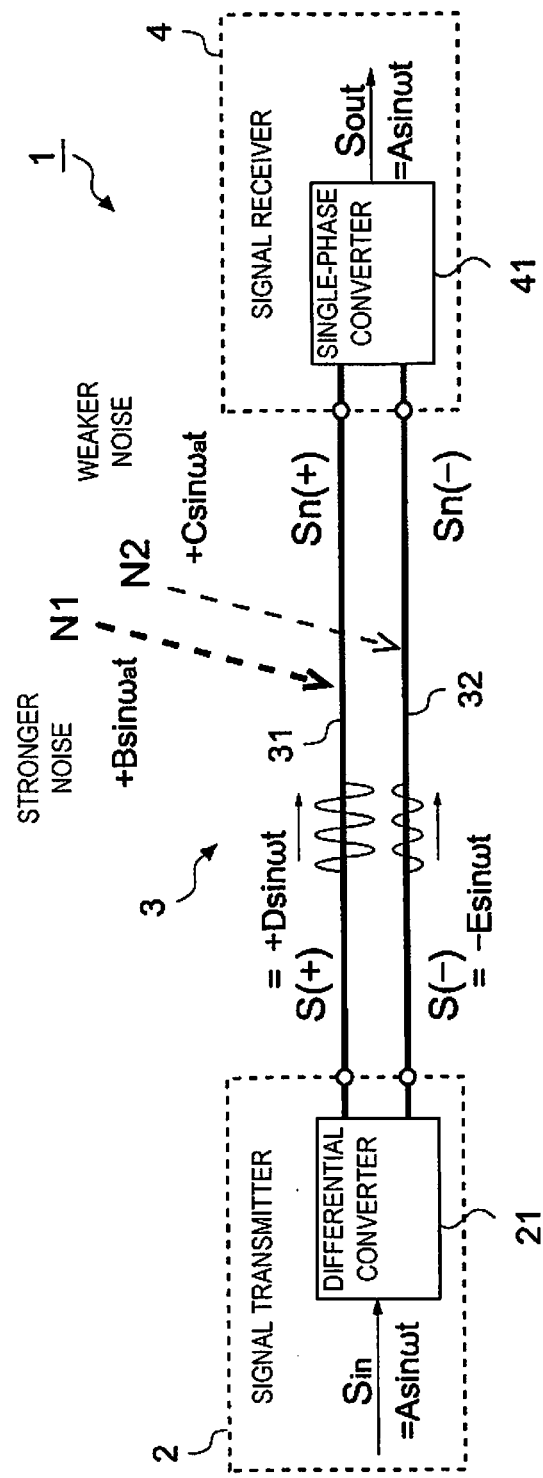
FIG. 1 is a conceptual configuration diagram showing an example of the signal transfer device pertaining to a first reference example.

FIG. 1 is a conceptual configuration diagram showing an example of the signal transfer device pertaining to a first reference example. As shown in FIG. 1, a signal transfer device 1 subjects a single-phase input signal Sin to balanced transfer from a signal transmitter 2 through a pair of transfer paths 3 to a signal receiver 4, and outputs a single-phase output signal Sout.

The signal transmitter 2 has a differential converter 21. In the first reference example, the differential converter 21 is an example of the amplitude adjustment means. The differential converter 21 converts the single-phase input signal Sin into opposite phase first and second transfer signals S(+) and S(−). The transfer paths 3 are made up of a first transfer path 31 over which the first transfer signal S(+) is transferred, and a second transfer path 32 over which the second transfer signal S(−) is transferred. The signal receiver 4 has a single-phase converter 41. This single-phase converter 41 converts the first and second transfer signals S(+) and S(−) received by the signal receiver 4 from the transfer paths 3 into the single-phase output signal Sout.

The process by which electrical signals undergo balanced transfer with the signal transfer device 1 will now be described through reference to FIG. 1. In the example described here, a single-phase sinusoidal signal Sin (=A sin ωt).

First, in the signal transmitter 2, the differential converter 21 converts the single-phase input signal Sin into a differential signal composed of a pair of transfer signals S(+) and S(−) so as to satisfy the following Mathematical Formulas 1 and 2. This conversion produces a first transfer signal S(+)(=+D sin ωt) and a second transfer signal S(−)(=−E sin ωt). These first and second transfer signals S(+) and S(−) are in opposite phase to each other, and are also signals of different amplitude (hereinafter referred to as asymmetrical amplitude).

$$E*S(+)+D*S(-)=0 \quad \text{(Mathematical Formula 1)}$$

$$E*S(+)-D*S(-)=\text{Sin} \quad \text{(Mathematical Formula 2)}$$

Here, ω is the single-phase input signal Sin, and indicates the angular frequency of the first and second transfer signals S(+) and S(−), and t is time. A, D, and E are the respective amplitudes of the single-phase input signal Sin and the first and second transfer signals S(+) and S(−). Because of Mathematical Formula 2, the amplitudes A, D, and E satisfy the following Mathematical Formula 3.

$$2DE=A \quad \text{(Mathematical Formula 3)}$$

Also, the amplitudes D and E are set according to the amplitudes B and C (B>C) of first and second noise signals N1 and N2 (discussed below). More specifically, they are set so that the amplitude ratio of the first transfer signal S(+) to the first noise signal N1 will be equal to the amplitude ratio of the second transfer signal S(−) to the second noise signal N2. That is, the amplitudes D and E are set so as to satisfy the following Mathematical Formula 4 as well.

$$E:C=D:B$$

$$EB=CD \quad \text{(Mathematical Formula 4)}$$

The first and second transfer signals S(+) and S(−) thus produced are outputted from the signal transmitter 2 and transferred along the first and second transfer paths 31 and 32. If the first and second transfer paths 31 and 32 should be affected by external noise during this transfer, first and second noise signals N1 (=+B sin ωat) and N2 (=+C sin ωat) of the same phase will be superposed over the first and second transfer signals S(+) and S(−). B and C here are the amplitude of the first and second noise signals N1 and N2, respectively, and ωa is the angular frequency of the first and second noise signals N1 and N2.

Accordingly, the signal receiver 4 receives from the first and second transfer paths 31 and 32 the first and second transfer signals S(+) and S(−) over which noise signals have been superposed, as shown in the following Mathematical Formulas 5 and 6.

$$Sn(+) = S(+) + N1 \quad \text{(Mathematical Formula 5)}$$
$$= +D\sin\omega t + B\sin\omega at$$

$$Sn(-) = S(-) + N2 \quad \text{(Mathematical Formula 6)}$$
$$= -E\sin\omega t + C\sin\omega at$$

In the signal receiver 4, the single-phase converter 41 converts the first and second transfer signals S(+) and S(−) over which the noise signals N1 and N2 have been superposed into the single-phase output signal Sout. This conversion is carried out based on the amplitude ratio of the first and second transfer signals S(+) and S(−) over which the noise signals N1 and N2 have been superposed, as in the following Mathematical Formula 7.

$$Sout=ESn(+)-DSn(-) \quad \text{(Mathematical Formula 7)}$$

The amplitudes of the differential signals (the first and second transfer signals S(+) and S(−)) are set so as to satisfy the conditions of the above-mentioned Mathematical Formula 4. Therefore, when the single-phase converter 41 produces the output signal Sout, the first and second noise signals N1 and N2 are removed as in the following Mathematical Formula 8.

$$Sout = E\{+D\sin\omega t + B\sin\omega at\} - \quad \text{(Mathematical Formula 8)}$$
$$D\{-E\sin\omega t + C\sin\omega at\}$$
$$= 2DE\sin\omega t + (EB - CD)\sin\omega at$$
$$= A\sin\omega t$$

Furthermore, the first and second noise signals N1 and N2 that are superposed over the first and second transfer signals S(+) and S(−) are removed regardless of whether they have the same amplitudes or have asymmetrical amplitudes (different amplitudes). Therefore, with the signal transfer device 1, the effect that external noise has on differential signals can be avoided.

The configuration described above is particularly effective when there is substantially no change in the amplitudes B and C of the first and second noise signals N1 and N2 superposed over the first and second transfer signals S(+) and S(−). If the amplitudes B and C of the first and second noise signals N1 and N2 change, this can be handled by suitably varying the setting of the conditions for conversion into differential signals at the signal transmitter 2, and the setting of the conditions for conversion into the single-phase signal Sout at the signal receiver 4. Also, even if the amplitudes B and C of the first and second noise signals N1 and N2 deviate from the conditions that would satisfy the above-mentioned Mathematical Formula 4, the noise components superposed over the single-phase output signal Sout can be effectively reduced. In this case, the noise signal with the greater amplitude out of the first and second noise signals N1 and N2 with asymmetrical amplitudes (such as the first noise signal N1) may be superposed over the transfer signal with the greater amplitude out of the first and second transfer signals S(+) and S(−) with asymmetrical amplitudes (such as the first transfer signal S(+)). For example, when the amplitudes of the first and second noise signals N1 and N2 are such that B>C, the amplitudes of the first and second transfer signals S(+) and S(−) may be such that D>E.

Comparative Example 1

Figure 2:
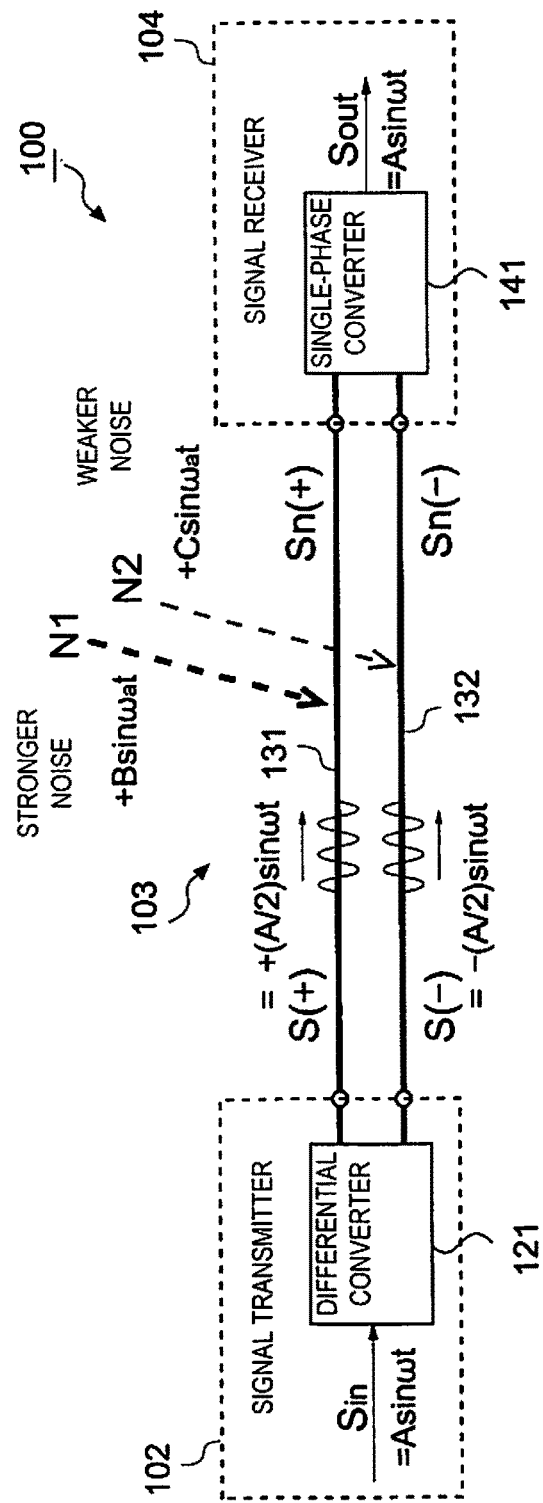
FIG. 2 is a conceptual configuration diagram showing the signal transfer device pertaining to Comparative Example 1.

Next, a Comparative Example 1 will be described to make it easier to understand the effect of the signal transfer device 1 in this reference example. FIG. 2 is a conceptual configuration diagram showing the signal transfer device pertaining to Comparative Example 1. As shown in FIG. 2, with the signal transfer device 100 of Comparative Example 1, an input signal Sin is converted into differential signals of opposite phase and the same amplitude, and subjected to balanced transfer.

In Comparative Example 1, in a signal transmitter 102, a differential converter 121 converts the single-phase input signal Sin into differential signals composed of a pair of transfer signals S(+) and S(−) so as to satisfy the following Mathematical Formula 9. This conversion produces a first transfer signal S(+)(=+(A/2)sin ωt) and a second transfer signal S(−)(=−(A/2)sin ωt) of opposite phase and the same amplitude.

$$S(+)+S(-)=0$$
$$S(+)-S(-)=Sin \quad \text{(Mathematical Formula 9)}$$

The first and second transfer signals S(+) and S(−) thus produced are outputted from the signal transmitter 102. First and second noise signals N1 (=+B sin ωat) and N2 (=+C sin ωat) of the same phase are superposed on first and second transfer paths 131 and 132.

A signal receiver 104 receives from the first and second transfer paths 131 and 132 the first and second transfer signals S(+) and S(−) over which noise signals N1 and N2 have been superposed. A single-phase converter 141 converts the first and second transfer signals S(+) and S(−) over which the noise signals N1 and N2 have been superposed into the single-phase output signal Sout, as in the following Mathematical Formula 10.

$$Sout = Sn(+) - Sn(-) \quad \text{(Mathematical Formula 10)}$$
$$Sout = \{+(A/2)\sin\omega t + B\sin\omega at\} -$$
$$\{-(A/2)\sin\omega t + C\sin\omega at\}$$
$$= A\sin\omega t + (B - C)\sin\omega at$$

Here, the first and second noise signals N1 and N2 can be removed from the first and second transfer signals S(+) and S(−) as long as the amplitudes are the same (that is, B=C), but if the amplitudes are asymmetrical (that is, B≠C), they cannot be removed. Therefore, with the signal transfer device 100 in Comparative Example 1, the effect that the first and second noise signals N1 and N2 of different amplitude have on differential signals can be avoided.

A first reference example is described above. In this first Reference Example, the signal transfer device 1 comprises the signal transmitter 2, the first transfer path 31, the second transfer path 32, and the signal receiver 4. The signal transmitter 2 transmits the first and second transfer signals S(+) and S(−) of mutually opposite phase. The first transfer signal S(+) is transferred by the first transfer path 31, and the second transfer signal S(−) is transferred by the second transfer path 32. The signal receiver 4 converts the first transfer signal S(+) received from the first transfer path 31 and the second transfer signal S(−) received from the second transfer path 32 into the single-phase output signal Sout. Also, the signal transmitter 2 is provided with the differential converter 21 (amplitude adjustment means) that dissimilates the amplitudes of the first and second transfer signals S(+) and S(−) received by the signal receiver 4. The signal receiver 4 converts the received first and second transfer signals S(+) and S(−) based on the amplitude ratio of the first and second transfer signals S(+) and S(−) adjusted by the differential converter 21.

Also, in the first reference example, the signal transfer method comprises the following steps. In one step, the first and second transfer signals S(+) and S(−) of mutually opposite phase are transmitted. In another step, the first and second transfer signals S(+) and S(−) are transferred. In another step, the first and second transfer signals S(+) and S(−) transferred in the step of transferring are converted into the single-phase output signal Sout. Also, the step of transmitting includes a step of dissimilating the amplitudes of the first and second transfer signals S(+) and S(−) transferred in the step of transferring. In the step of converting, the first and second transfer signals S(+) and S(−) transferred in the step of transferring are converted based on the amplitude ratio of the first and second transfer signals S(+) and S(−) adjusted in the step of dissimilating.

The result is that the first and second transfer signals S(+) and S(−) of mutually opposite phase and adjusted to different amplitudes are transferred. The transferred first and second transfer signals S(+) and S(−) are converted into the single-phase output signal Sout based on the amplitude ratio of the first and second transfer signals S(+) and S(−) adjusted by the differential converter 21. Accordingly, even if the first and second noise signals N1 and N2 of different amplitude are superposed during the transfer of the first and second transfer signals S(+) and S(−), the effect of the first and second noise signals N1 and N2 can be reduced when the first and second transfer signals S(+) and S(−) are converted into the single-phase output signal Sout. Therefore, the effect that the first and second noise signals N1 and N2 of different amplitude have on differential signals can be effectively reduced.

Also, with the signal transfer device 1 in the first reference example, the differential converter 21 makes the amplitude ratio (D:B) of the first noise signal N1 to the first transfer signal S(+) over which the first noise signal N1 is superposed be equal to the amplitude ratio (E:C) of the second noise signal N2 to the second transfer signal S(−) over which the second noise signal N2 is superposed. This allows the first and second noise signals N1 and N2 to be removed substantially completely when the first and second transfer signals S(+) and S(−) are converted into the single-phase output signal Sout. Therefore, the effect that the first and second noise signals N1 and N2 of different amplitude have on differential signals can be avoided.

Modification Example of First Reference Example

Figure 3:
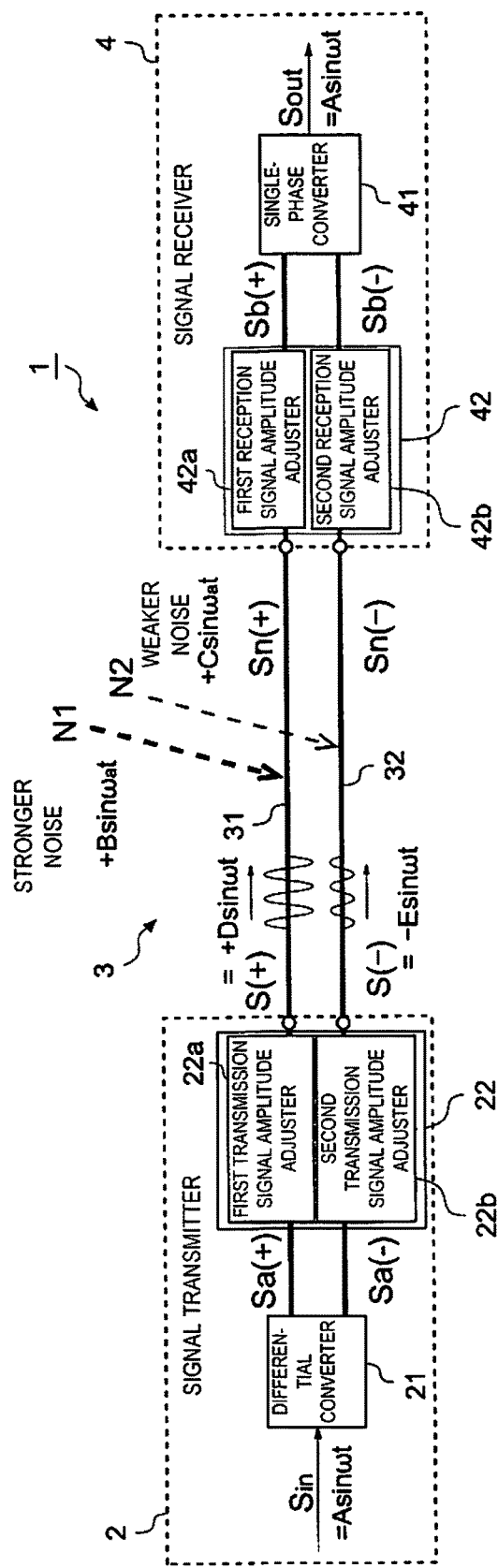
FIG. 3 is a conceptual configuration diagram showing an example of the signal transfer device pertaining to a modification example of the first reference example.

In the above first reference example, the differential converter 21 had two functions: that of converting from the single-phase input signal Sin into differential signals, and that of adjust the amplitudes D and E of the differential signals, but a separate component may be provided for each of these functions. FIG. 3 is a conceptual configuration diagram showing an example of the signal transfer device pertaining to a modification example of the first reference example.

As shown in FIG. 3, the signal transmitter 2 of the signal transfer device 1 further has a transmission signal amplitude adjuster 22. In this modification example, of the first reference example, the transmission signal amplitude adjuster 22 is an example of an amplitude adjustment means.

The differential converter 21 converts the single-phase input signal Sin into the first and second transfer signals S(+) and S(−) of mutually opposite phase and the same amplitude. The transmission signal amplitude adjuster 22 includes first and second transmission signal amplitude adjusters 22a and 22b. The first transmission signal amplitude adjuster 22a adjusts the amplitude of the first transfer signal S(+) produced by the differential converter 21 to an amplitude D that satisfies the conditions of Mathematical Formula 4. The second transmission signal amplitude adjuster 22b adjusts the amplitude of the second transfer signal S(−) produced by the differential converter 21 to an amplitude E that satisfies the conditions of Mathematical Formula 4.

The signal receiver 4 further has a reception signal amplitude adjuster 42. The reception signal amplitude adjuster 42 includes first and second reception signal amplitude adjusters 42a and 42b. The first reception signal amplitude adjuster 42a adjusts the amplitude of the first transfer signal S(+) over which the first noise signal N1 has been superposed to E times. The second reception signal amplitude adjuster 42b adjusts the amplitude of the second transfer signal S(−) over which the second noise signal N2 has been superposed to D times. The single-phase converter 41 converts the adjusted first and second transfer signals ESn(+) and DSn(−) to the approximately output signal Sout by multiplying them as in the following Mathematical Formula 11.

$$Sout = ESn(+) - DSn(-) \quad \text{(Mathematical Formula 11)}$$
$$= E\{+D\sin\omega t + B\sin\omega at\} -$$
$$D\{-E\sin\omega t + C\sin\omega at\}$$
$$= 2DE\sin\omega t + (EB - CD)\sin\omega at$$
$$A\sin\omega t$$

In FIG. 3, the amplitudes of the first and second transfer signals S(+) and S(−) are adjusted by the transmission signal amplitude adjuster 22 of the signal transmitter 2, but they may be adjusted, for example, to 1 and (E/D), or to (D/E) and 1. With adjustment such as this, however, the reception signal amplitude adjuster 42 of the signal receiver 4 may adjust the amplitudes of the first and second transfer signals S(+) and S(−) to (E/D) times and one time, or to (D/E) times and one time.

A modification example of the first reference example is described above. With the signal transfer device 1 in this modification example, the signal transmitter 2 has the differential converter 21 and the transmission signal amplitude adjuster 22. The differential converter 21 converts the single-phase input signal Sin into first and second transfer signals S(+) and S(−) of mutually opposite phase. The transmission signal amplitude adjuster 22 adjusts the amplitudes D and E of the first and second transfer signals S(+) and S(−) so that the amplitude D of the first transfer signal S(+) will be different from the amplitude E of the second transfer signal S(−). The signal receiver 4 has the reception signal amplitude adjuster 42 and the single-phase converter 41. The reception signal amplitude adjuster 42 adjusts the amplitudes of the first and second transfer signals S(+) and S(−) received by the signal receiver 4 based on the amplitude ratio of the first and second transfer signals S(+) and S(−) adjusted by the transmission signal amplitude adjuster 22. The single-phase converter 41 converts the first and second transfer signals S(+) and S(−) adjusted by the reception signal amplitude adjuster 42 into the single-phase output signal Sout.

This allows the first and second transfer signals S(+) and S(−) of mutually opposite phase and different amplitudes to be transmitted from the signal transmitter 2. Even if the first and second noise signals N1 and N2 of different amplitude should be superposed over the first and second transfer signals S(+) and S(−), conversion to the single-phase output signal Sout can be easily accomplished by adjusting based on the amplitude ratio of the first and second transfer signals S(+) and S(−) adjusted by the transmission signal amplitude adjuster 22.

Also, in the first reference example above, a configuration is described in which, when differential signals of opposite phase and asymmetrical amplitude are outputted from the signal transmitter 2, the effect that external noise has on the differential signals transferred over a pair of transfer paths 3 is avoided. Next, we will describe a configuration that allows the effect of external noise to be avoided even when differential signals of opposite phase and the same amplitude are outputted from the signal transmitter 2.

Second Reference Example

A second reference example will be described. In the second reference example, differential signals with opposite phase and asymmetrical amplitude are received by the signal receiver 4 by dissimilating the impedance Z1 and Z2 of the pair of transfer paths 3 over which the differential signals are transferred. Specifically, in the second reference example, the pair of transfer paths 3 is an example of an amplitude adjustment means. The part of the second reference example that differs from the first reference example will be described below. Those components that are the same as in the first reference example will be numbered the same and will not be described again.

Figure 4:
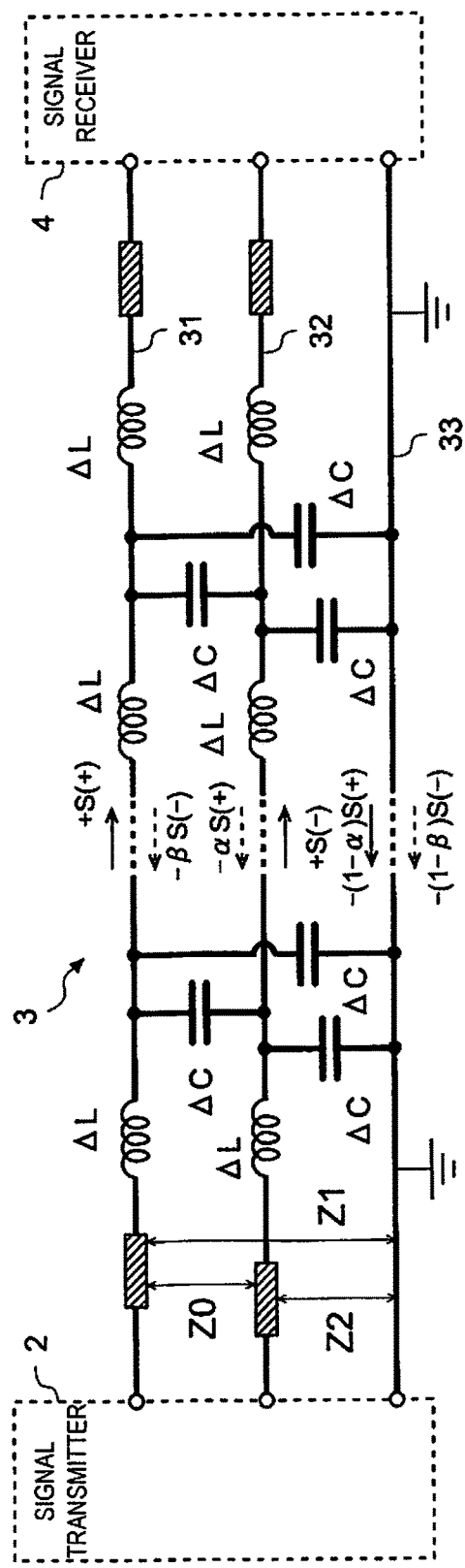
FIG. 4 is an equivalent circuit diagram of a transfer path that takes actual unbalanced transfer components into account.

First, in ideal balanced transfer, differential signals are transferred over the pair of transfer paths 3, but in actual practice, things such as a ground pattern or electrical linkage with other signal lines cannot be ignored in regard to the transfer paths 3. Accordingly, actual balanced transfer includes a certain amount of unbalanced transfer components. FIG. 4 is an equivalent circuit diagram of a transfer path that takes actual unbalanced transfer components into account.

The transfer paths 3 in FIG. 4 are made up of a grounded reference path 33 in addition to the first and second transfer paths 31 and 32. In FIG. 4, the boxes shaded with hatching indicate the thickness of the first and second transfer paths 31 and 32, and show the impedance Z1 and Z2 of the first and second transfer paths 31 and 32. $\Delta L$ and $\Delta C$ are inductors and capacitors in the micro-zones between lines, and show the inductance component and capacitance component of the impedance Z1 and Z2 of the first and second transfer paths 31 and 32.

The opposite phase first and second transfer signals S(+) and S(−) are inputted to the first and second transfer paths 31 and 32, and are transferred from the signal transmitter 2 to the signal receiver 4. Also, return signals of the first and second transfer signals S(+) and S(−) are outputted from the signal receiver 4 to the transfer paths 31 to 33, but part of the feedback current flows to the reference path 33. For example, a part $-\alpha S(+)(0<\alpha<1)$ of the feedback current of the first transfer signal S(+) flows through the second transfer path 32, and part of the remainder $-(1-\alpha)S(+)$ flows through the reference path 33. Also, a part $-\beta S(-)(0<\beta<1))$ of the feedback current of the second transfer signal S(−) flows through the first transfer path 31, and part of the remainder $-(1-\beta)S(-)$ flows through the reference path 33. $\alpha$ and $\beta$ are such that $\alpha=\beta$ when the impedance Z1 and Z2 of the first and second transfer paths 31 and 32 are the same, but $\alpha \neq \beta$ when the impedance Z1 and Z2 are different.

Figure 5A:
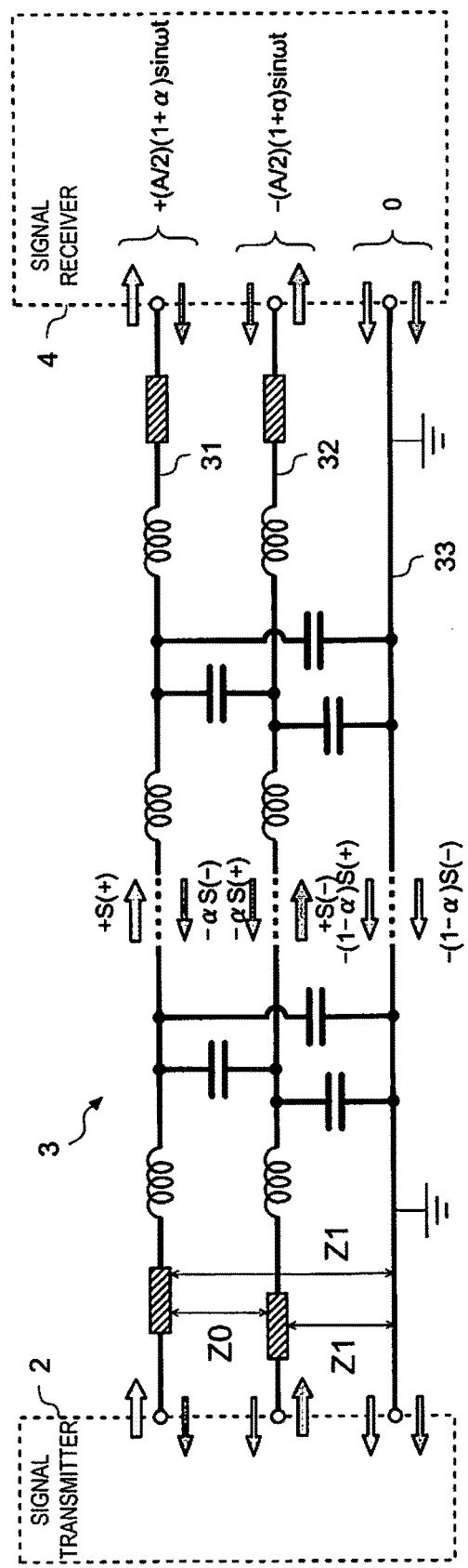
FIG. 5A is an equivalent circuit diagram of when differential signals of opposite phase and the same amplitude are transferred by transfer paths with no difference in impedance.
Figure 5B:
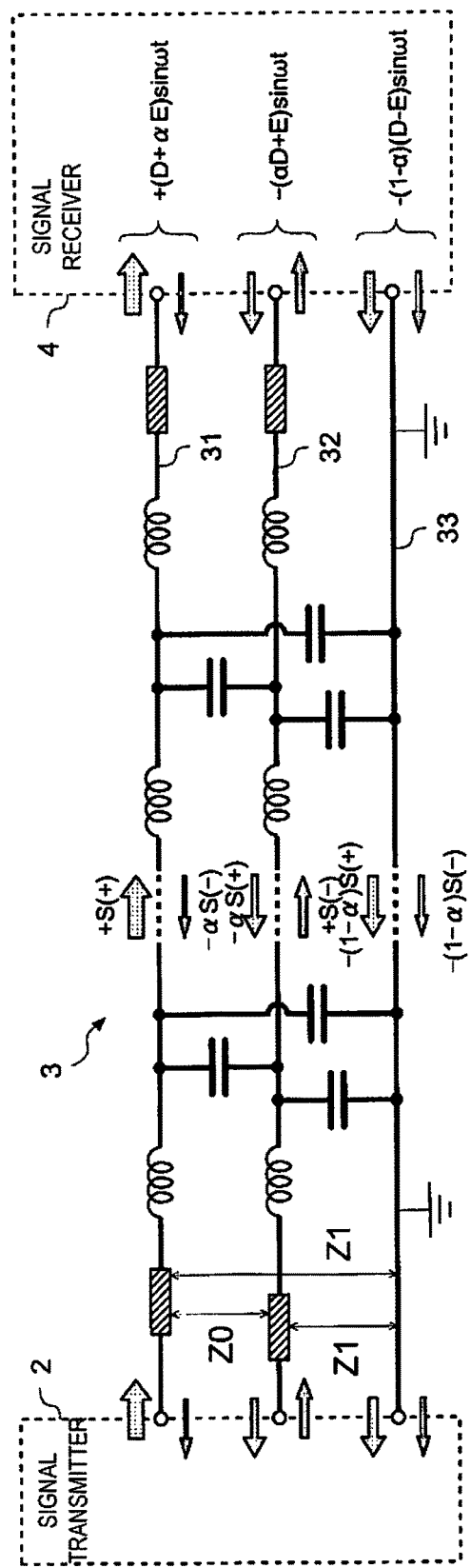
FIG. 5B is an equivalent circuit diagram of when differential signals of opposite phase and different amplitude are transferred by transfer paths with no difference in impedance.

First, we will describe a situation in which the impedance Z1 and Z2 of the first and second transfer paths 31 and 32 are substantially the same. FIG. 5A is an equivalent circuit diagram of when differential signals of opposite phase and the same amplitude are transferred by transfer paths with no difference in impedance. FIG. 5B is an equivalent circuit diagram of when differential signals of opposite phase and the different amplitude are transferred by transfer paths with no difference in impedance. Here, the superposition of the first and second noise signals N1 and N2 will be ignored in order to make it easier to understand how the impedance Z1 and Z2 of the first and second transfer paths 31 and 32 affect the differential signals.

When the first and second transfer signals $S(+)(=+(A/2)\sin \omega t)$ and $S(-)(=-(A/2)\sin \omega t)$ of opposite phase and the same amplitude are transferred over the transfer paths 3, as shown in FIG. 5A, the first transfer signal S(+) received by the signal receiver 4 is $+(A/2)(1+\alpha)\sin \omega t$, and the second transfer signal S(−) is $-(A/2)(1+\alpha)\sin \omega t$. That is, the signal receiver 4 receives differential signals of opposite phase and the same amplitude.

On the other hand, when the first and second transfer signals $S(+)(=+D \sin \omega t)$ and $S(-)(=-E \sin \omega t)$ of opposite phase and different amplitude are transferred over the transfer paths 3, as shown in FIG. 5B, the first transfer signal S(+) received by the signal receiver 4 is $+(D+\alpha E)\sin \omega t$, and the second transfer signal S(−) is $-(\alpha D+E)\sin \omega t$. That is, the signal receiver 4 receives differential signals of opposite phase and different amplitude.

Figure 6:
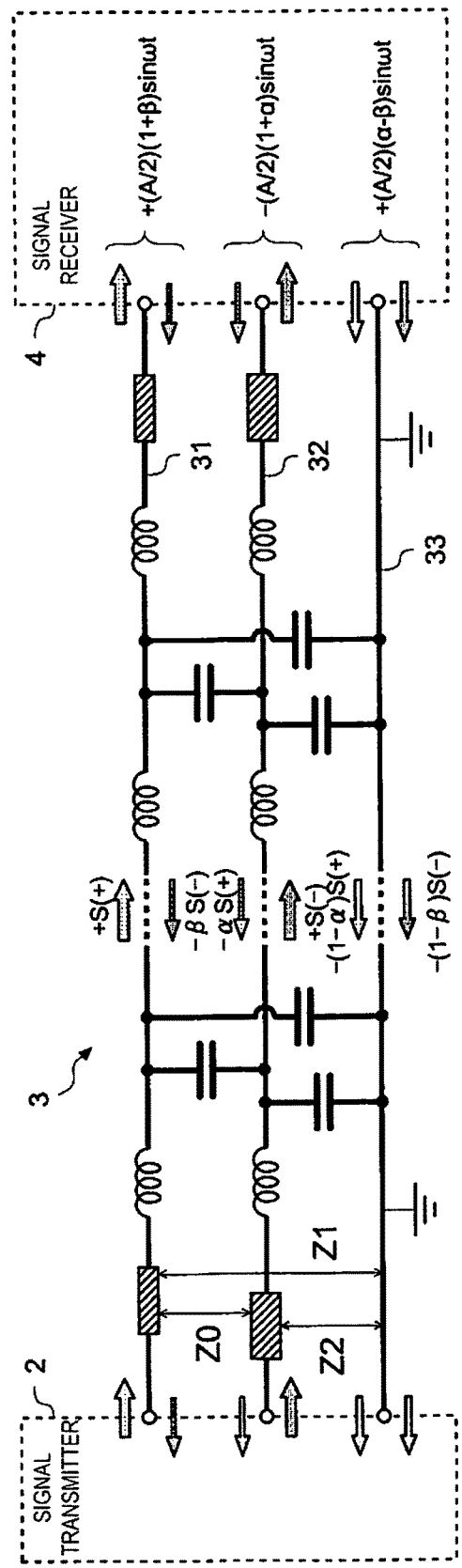
FIG. 6 is an equivalent circuit diagram of when differential signals of opposite phase and the same amplitude are transferred by transfer paths with a difference in impedance.

Next, we will describe a situation in which the impedance Z1 and Z2 of the first and second transfer paths 31 and 32 are different. FIG. 6 is an equivalent circuit diagram of when differential signals of opposite phase and the same amplitude are transferred by transfer paths with a difference in impedance. Here again, the superposition of the first and second noise signals N1 and N2 will be ignored in order to make it easier to understand how the impedance Z1 and Z2 of the first and second transfer paths 31 and 32 affect the differential signals.

When the first and second transfer signals $S(+)(=+(A/2)\sin \omega t)$ and $S(-)(=-(A/2)\sin \omega t)$ of opposite phase and the same amplitude are transferred over the transfer paths 3, as shown in FIG. 6, the first transfer signal S(+) received by the signal receiver 4 is $+(A/2)(1+\beta)\sin \omega t$, and the second transfer signal S(−) is $-(A/2)(1+\alpha)\sin \omega t$. That is, the signal receiver 4 receives differential signals of opposite phase and different amplitude even if the differential signals of opposite phase and the same amplitude are transferred from the signal transmitter 2.

Such transfer paths 3 can be realized by dissimilating the resistance components, capacitance components, and/or impedance components of the impedance Z1 and Z2 of the first and second transfer paths 31 and 32. Specific configuration examples of the configuration of transfer paths 3 with different impedance Z1 and Z2 will now be described by giving first to sixth configuration examples.

First Configuration Example

Figure 7A:
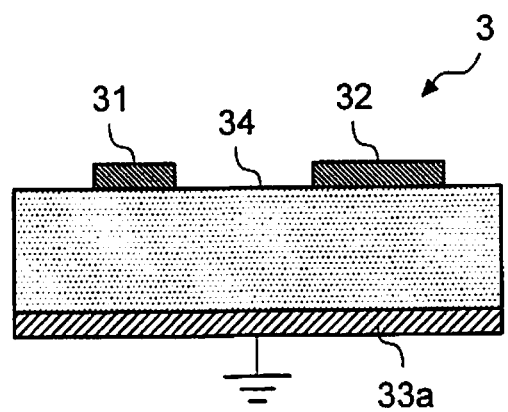
FIG. 7A is a diagram of an example of the transfer paths in a second reference example.

FIG. 7A is a diagram of an example of the transfer paths in a second reference example. With the transfer paths 3 in FIG. 7A, a dielectric layer 34 is formed over a grounded conductor substrate 33a. First and second transfer paths 31 and 32 having different cross sectional area are disposed on the upper face of the dielectric layer 34. This allows the capacitance components of the impedance Z1 and Z2 of the first and second transfer paths 31 and 32 to be dissimilated. The conductor substrate 33a in the first configuration example is part of the grounded component.

Second Configuration Example

Figure 7B:
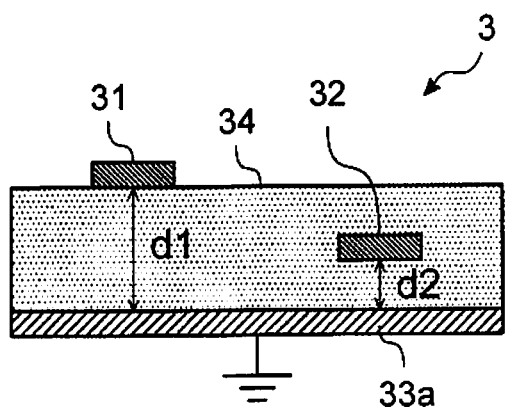
FIG. 7B is a diagram of another example of the transfer paths in the second reference example.

FIG. 7B is a diagram of another example of the transfer paths in the second reference example. With the transfer paths 3 in FIG. 7B, the dielectric layer 34 is formed over the grounded conductor substrate 33a. Also, the first transfer path 31 is disposed over the dielectric layer 34, but the second transfer path 32 is disposed in the interior of the dielectric layer 34. This allows the spacings d1 and d2 between the conductor substrate 33a and the first and second transfer paths 31 and 32 to be dissimilated, so the capacitance components of the impedance Z1 and Z2 of the first and second transfer paths 31 and 32 can be dissimilated. The conductor substrate 33a in the second configuration example is part of the grounded component.

Third Configuration Example

Figure 7C:
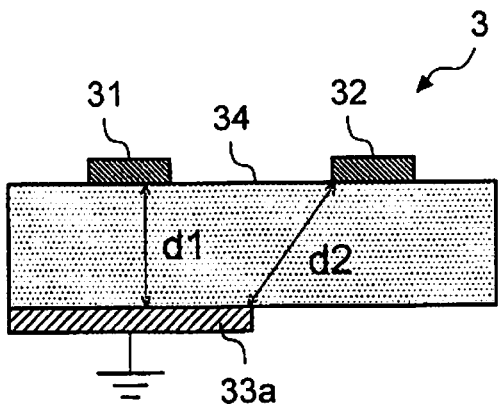
FIG. 7C is a diagram of another example of the transfer paths in the second reference example.

FIG. 7C is a diagram of another example of the transfer paths in the second reference example. With the transfer paths 3 in FIG. 7C, the first and second transfer paths 31 and 32 are disposed on the upper face of the dielectric layer 34. Also, the grounded conductor substrate 33a is provided to part of the lower face of the dielectric layer 34. In a plan view of a main face of the conductor substrate 33a as seen in the normal direction, the first transfer path 31 is superposed with the conductor substrate 33a, but the second transfer path 32 is not superposed with the conductor substrate 33a. This also allows the spacings d1 and d2 between the conductor substrate 33a and the first and second transfer paths 31 and 32 to be easily dissimilated, so the capacitance components of the impedance Z1 and Z2 of the first and second transfer paths 31 and 32 can be dissimilated. The conductor substrate 33a in the third configuration example is part of the grounded component.

Fourth Configuration Example

Figure 7D:
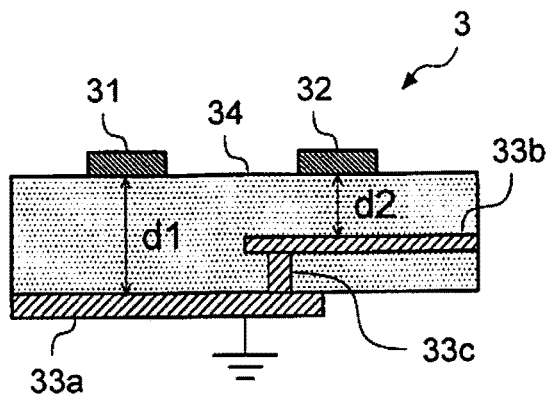
FIG. 7D is a diagram of another example of the transfer paths in the second reference example.

FIG. 7D is a diagram of another example of the transfer paths in the second reference example. With the transfer paths 3 in FIG. 7D, the first and second transfer paths 31 and 32 are disposed on the upper face of the dielectric layer 34. Also, a grounded conductor substrate 33a is provided to part of the lower face of the dielectric layer 34. Also, a conductor layer 33b is provided in the interior of the dielectric layer 34. This conductor layer 33b is continuous with the conductor substrate 33a through a via 33c having a conduction path formed in the interior. In a plan view of a main face of the conductor substrate 33a as seen in the normal direction, the first transfer path 31 is not superposed with the conductor layer 33b, but the second transfer path 32 is superposed with the conductor layer 33b. This also allows the spacing d1 between the first transfer path 31 and the conductor substrate 33a, and the spacing d2 between the second transfer path 32 and the conductor layer 33b to be easily dissimilated, so the capacitance components of the impedance Z1 and Z2 of the first and second transfer paths 31 and 32 can be dissimilated. The conductor substrate 33a, the conductor layer 33b, and the via 33c in the fourth configuration example are part of the grounded component.

Fifth Configuration Example

Figure 7E:
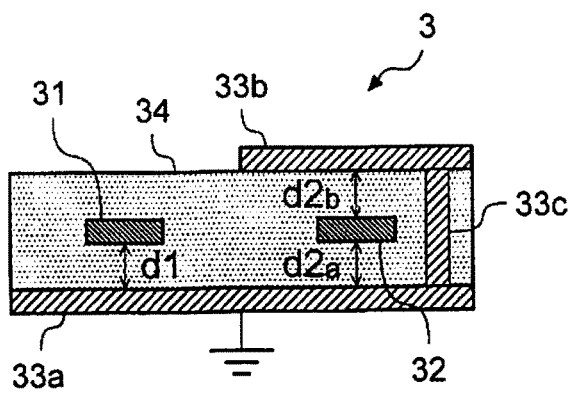
FIG. 7E is a diagram of another example of the transfer paths in the second reference example.

FIG. 7E is a diagram of another example of the transfer paths in the second reference example. With the transfer paths 3 in FIG. 7E, the dielectric layer 34 is disposed on the upper face of the grounded conductor substrate 33a. Also, the first and second transfer paths 31 and 32 are disposed in the interior of the dielectric layer 34. Furthermore, the conductor layer 33b is provided to part of the upper face of the dielectric layer 34, and this conductor layer 33b is continuous with the conductor substrate 33a through a via 33c having a conduction path formed in the interior. In a plan view of a main face of the conductor substrate 33a as seen in the normal direction, the first transfer path 31 is not superposed with the conductor layer 33b, but the second transfer path 32 is superposed with the conductor layer 33b. Accordingly, the second transfer path 32 is disposed between the conductor substrate 33a and the conductor layer 33b in the interior of the dielectric layer 34. This allows the second transfer path 32 disposed in the interior of the dielectric layer 34 to have two capacitance components, one in a space d2a between itself and the conductor substrate 33a and one in a space d2b between itself and the conductor layer 33b, so the capacitance components of the impedance Z1 and Z2 of the first and second transfer paths 31 and 32 can be dissimilated. The conductor substrate 33a, the conductor layer 33b, and the via 33c in the fifth configuration example are part of the grounded component.

Sixth Configuration Example

Figure 7F:
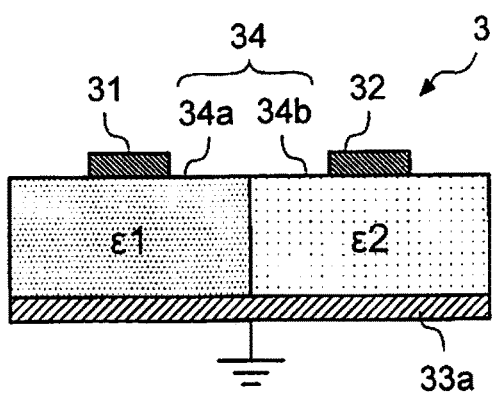
FIG. 7F is a diagram of another example of the transfer paths in the second reference example.

FIG. 7F is a diagram of another example of the transfer paths in the second reference example. With the transfer paths 3 in FIG. 7F, two dielectric layers 34a and 34b with different dielectric constants are formed over the grounded conductor substrate 33a. Also, the first transfer path 31 is disposed on the upper face of the dielectric layer 34a, and the second transfer path 32 is disposed on the upper face of the dielectric layer 34b. Because the dielectric constants ∈1 and ∈2 are different between the conductor substrate 33a and the first and second transfer paths 31 and 32, the capacitance components of the impedance Z1 and Z2 of the first and second transfer paths 31 and 32 can be dissimilated. The conductor substrate 33a in the sixth configuration example is part of the grounded component.

The configuration example of the transfer paths 3 is not limited to or by the first to sixth configuration examples described above. For example, the cross sectional areas of the first and second transfer paths 31 and 32 can be dissimilated in the second to sixth configuration examples. This allows further dissimilation of the capacitance components of the impedance Z1 and Z2 of the first and second transfer paths 31 and 32.

A second reference example is described above. The signal transfer device 1 in the second reference example comprises the signal transmitter 2, the first transfer path 31, the second transfer path 32, and the signal receiver 4. The signal transmitter 2 transmits the first and second transfer signals S(+) and S(−) of mutually opposite phase. The first transfer signal S(+) is transferred by the first transfer path 31, and the second transfer signal S(−) is transferred by the second transfer path 32. The signal receiver 4 converts the first transfer signal S(+) received from the first transfer path 31 and the second transfer signal S(−) received from the second transfer path 32 into the single-phase output signal Sout. Also, the first and second transfer paths 31 and 32 function as amplitude adjustment means for dissimilating the amplitudes of the first and second transfer signals S(+) and S(−) received by the signal receiver 4 (because the impedance Z1 and Z2 are mutually different). The signal receiver 4 converts the received first and second transfer signals S(+) and S(−) based on the amplitude ratio of the first and second transfer signals S(+) and S(−) adjusted by the amplitude adjustment means.

Thus, the first and second transfer signals S(+) and S(−) that are of mutually opposite phase and have been adjusted to different amplitudes are transferred. The transferred first and second transfer signals S(+) and S(−) are then converted into the single-phase output signal Sout based on the amplitude ratio of the first and second transfer signals S(+) and S(−) adjusted by the first and second transfer paths 31 and 32 that function as the amplitude adjustment means. Accordingly, even if noise signals N1 and N2 of different amplitude are superposed during the transfer of the first and second transfer signals S(+) and S(−), the effect of the noise signals N1 and N2 can be reduced in the conversion of the first and second transfer signals S(+) and S(−) into the single-phase output signal Sout. Therefore, the effect that the noise signals N1 and N2 of different amplitude have on differential signals can be effectively reduced.

With the signal transfer device 1 in the second reference example, the impedance Z1 of the first transfer path 31 is different from the impedance Z2 of the second transfer path 32. Accordingly, even though the first and second transfer signals S(+) and S(−) outputted from the signal transmitter 2 have the same amplitude, the amplitudes of the first and second transfer signals S(+) and S(−) received by the signal receiver 4 can be dissimilated. Therefore, the effect of the noise signals N1 and N2 of different amplitude can be sufficiently reduced in the conversion of the first and second transfer signals S(+) and S(−) into the single-phase output signal Sout.

Examples will be given below of methods for dissimilating the impedance Z1 and Z2 of the first and second transfer paths 31 and 32. For example, in the second reference example the cross sectional areas of the first and second transfer paths 31 and 32 may be different. This allows the capacitance components of the impedance Z1 and Z2 of the first and second transfer paths 31 and 32 to be dissimilated.

Also, in the second reference example, the signal transfer device 1 may further comprise the dielectric layer 34 on which the first and second transfer paths 31 and 32 are disposed, and a grounded component to which the dielectric layer 34 is provided. The grounded component has the grounded conductor substrate 33a, and the shortest distance between the first transfer path 31 and the grounded component may be different from the shortest distance between the second transfer path 32 and the grounded component. This allows the capacitance components of the impedance Z1 and Z2 of the first and second transfer paths 31 and 32 to be dissimilated.

Furthermore, the dielectric layer 34 may have the first and second dielectric layers 34a and 34b of different dielectric constants, the first transfer path 31 may be provided to the first dielectric layer 34a, and the second transfer path 32 may be provided to the second dielectric layer 34b. In this configuration, the first and second transfer paths 31 and 32 are provided to the dielectric layers 34a and 34b of different dielectric constants, so the capacitance components of the impedance Z1 and Z2 of the first and second transfer paths 31 and 32 can be dissimilated.

Alternatively, in the second reference example, there may be provided a dielectric layer having first and second dielectric layers of different dielectric constants, and a grounded component to which the dielectric layer is provided. The grounded component may have a grounded conductor substrate, the first transfer path may be provided to the first dielectric layer, and the second transfer path may be provided to the second dielectric layer. Here again, since the first and second transfer paths 31 and 32 are respectively provided to the dielectric layers 34a and 34b having different dielectric constants, the capacitance components of the impedance Z1 and Z2 of the first and second transfer paths 31 and 32 can be dissimilated.

Also, in the second reference example, the grounded component may further have the conductor layer 33b that is electrically connected to the conductor substrate 33a. Also, the conductor layer 33b may be provided to the dielectric layer 34 so as to superpose the second transfer path 32 in a plan view of a main face of the conductor substrate 33a as seen in the normal direction. Thus providing the conductor layer 33b to the dielectric layer 34 so as to superpose the second transfer path 32 in plan view allows the capacitance components of the impedance Z1 and Z2 of the first and second transfer paths 31 and 32 to be dissimilated.

Furthermore, the conductor layer 33b that is electrically connected to the conductor substrate 33a may be provided over the dielectric layer 34, and the second transfer path 32 may be disposed between the conductor substrate 33a and the conductor layer 33b in the interior of the dielectric layer 34. This allows the second transfer path 32 disposed in the interior of the dielectric layer 34 to have two capacitance components between itself and the conductor substrate 33a and between itself and the conductor layer 33b, so the capacitance components of the impedance Z1 and Z2 of the first and second transfer paths 31 and 32 can be dissimilated.

Third Reference Example

A third reference example will now be described. In this third reference example, the amplitude of the first transfer signal S(+) transferred over the first transfer path 31 is controlled independently from the amplitude of the second transfer signal S(−) transferred over the second transfer path 32. Only the parts of the third reference example that differ from the first and second reference examples will be described below. Those components that are the same as in the first and second reference examples will be numbered the same and not described again.

Figure 8:
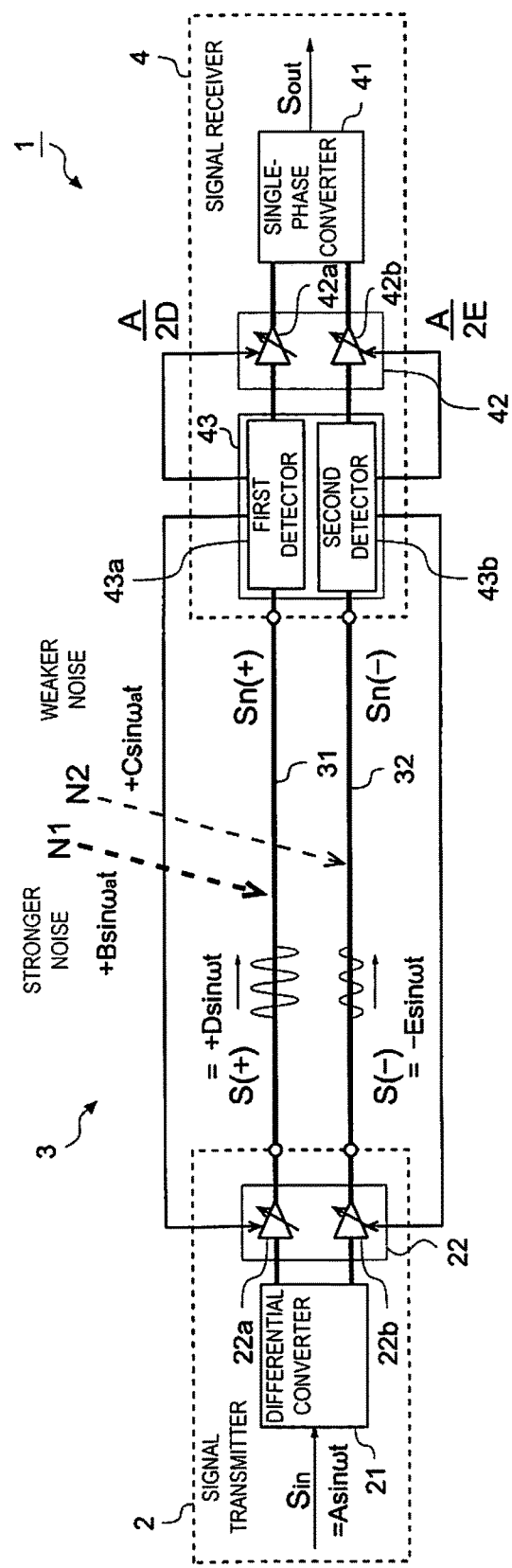
FIG. 8 is a conceptual configuration diagram showing an example of the signal transfer device pertaining to a third reference example.

FIG. 8 is a conceptual configuration diagram showing an example of the signal transfer device pertaining to a third reference example. As shown in FIG. 8, the signal receiver 4 further has a detector 43 that senses the amplitude of the first and second transfer signals S(+) and S(−) received by the signal receiver 4. This detector 43 includes first and second detectors 43a and 43b. The first and second detectors 43a and 43b are respectively first and second detectors that sense the amplitude of the first and second transfer signals S(+) and S(−) received by the signal receiver 4.

The transmission signal amplitude adjuster 22 of the signal transmitter 2 has the function of adjusting the amplitudes D and E of the first and second transfer signals S(+) and S(−) so that the amplitude of the first transfer signal S(+) will differ from the amplitude of the second transfer signal S(−). Furthermore, the transmission signal amplitude adjuster 22 also functions as a GCA (gain control amplifier or gain control attenuator). The transmission signal amplitude adjuster 22 performs feedback control over the amplitudes D and E of the first and second transfer signals S(+) and S(−) outputted from the signal transmitter 2, based on the sensing result of the detector 43. For example, the first and second transmission signal amplitude adjusters 22a and 22b respectively adjust the amplitudes of the first and second transfer signals S(+) and S(−) produced by the differential converter 21 to amplitudes D and E that satisfy the conditions of the above-mentioned Mathematical Formula 4. Furthermore, the first transmission signal amplitude adjuster 22a performs feedback control over the amplitude D of the first transfer signal S(+) outputted from the signal transmitter 2 based on the sensing result of the first detector 43a. The second transmission signal amplitude adjuster 22b performs feedback control over the amplitude E of the second transfer signal S(−) outputted from the signal transmitter 2 based on the sensing result of the first detector 43b.

Also, the reception signal amplitude adjuster 42 of the signal receiver 4 adjusts the amplitude of the first and second transfer signals S(+) and S(−) over which the noise signals N1 and N2 have been superposed, based on the sensing result of the detector 43. For example, the first reception signal amplitude adjuster 42a adjusts the amplitude of the first transfer signal S(+) over which the first noise signal N1 has been superposed to (A/2D) times based on the sensing result of the first detector 43a. The second reception signal amplitude adjuster 42b adjusts the amplitude of the second transfer signal S(−) over which the second noise signal N2 has been superposed to (A/2E) times based on the sensing result of the second detector 43b.

Thus, in the third reference example, the first and second transfer signals S(+) and S(−) are independently subjected to AGC (automatic gain control) based on the sensing result of the first and second detectors 43a and 43b.

The single-phase converter 41 converts into the single-phase output signal Sout by computing the first and second transfer signals (A/2D)Sn(+) and (A/2E)S(−) adjusted by the reception signal amplitude adjuster 42, according to the following Mathematical Formula 12.

$$Sout=(A/2D)Sn(+)-(A/2E)Sn(-) \quad \text{(Mathematical Formula 12)}$$

Here, the amplitudes of the differential signals (the first and second transfer signals S(+) and S(−)) are set so as to satisfy the conditions of the above-mentioned Mathematical Formula 4. Therefore, when the single-phase converter 41 produces the single-phase output signal Sout, the noise component is removed as shown in the following Mathematical Formula 13.

$$\begin{aligned} Sout &= \{+(A/2)\sin\omega t + (BA/2D)\sin\omega at\} - \\ &\quad \{-(A/2)\sin\omega t + (CA/2E)\sin\omega at\} \\ &= A\sin\omega t + (A/2DE)(EB - CD)\sin\omega at \\ &= A\sin\omega t \end{aligned} \quad \text{(Mathematical Formula 13)}$$

Furthermore, the first and second noise signals N1 and N2 of the same phase and superposed over the first and second transfer signals S(+) and S(−) are removed regardless of whether they have the same amplitude or have asymmetrical amplitude (different amplitudes). Therefore, with the signal transfer device 1, the effect that external noise has on differential signals can be avoided.

In the above description, an example is given in which the first and second transfer signals S(+) and S(−) underwent independent AGC, but this is not the only option. One or the other of the first and second transfer signals S(+) and S(−) may undergo AGC, and the other AGC balance control (in which the gain differential is control versus the AGC of one signal).

A third reference example is described above. With the signal transfer device 1 in the third reference example, the signal receiver 4 further has the detector 43 that senses the amplitude of the first and second transfer signals S(+) and S(−) received by the signal receiver 4. The transmission signal amplitude adjuster 22 of the signal transmitter 2 independently adjusts the amplitude of the first and second transfer signals S(+) and S(−) based on the sensing result of the detector 43. The reception signal amplitude adjuster 42 of the signal receiver 4 independently adjusts the amplitude of the first and second transfer signals S(+) and S(−) received by the signal receiver 4 based on the sensing result of the detector 43.

This allows the amplitude of the feedback-controlled first and second transfer signals S(+) and S(−) to be adjusted independently. Therefore, even though the first and second transfer signals S(+) and S(−) are feedback-controlled, the amplitudes of the first and second transfer signals S(+) and S(−) transferred by the transfer paths 3 can be dissimilated, and the effect that the noise signals N1 and N2 of different amplitude have on the output signal Sout can be sufficiently reduced.

Fourth Reference Example

The effect of external noise is reduced in the first to third reference examples above, but the effect of noise received from the outside can be considered to be inextricably linked to the effect that noise has on the outside. Accordingly, the above-mentioned first to third reference examples can also be applied as a means for moderating the noise (such as electromagnetic noise) radiated to the outside from differential signals of opposite phase that transfer the first and second transfer signals S(+) and S(−)(the first and second transfer signals).

Figure 9:
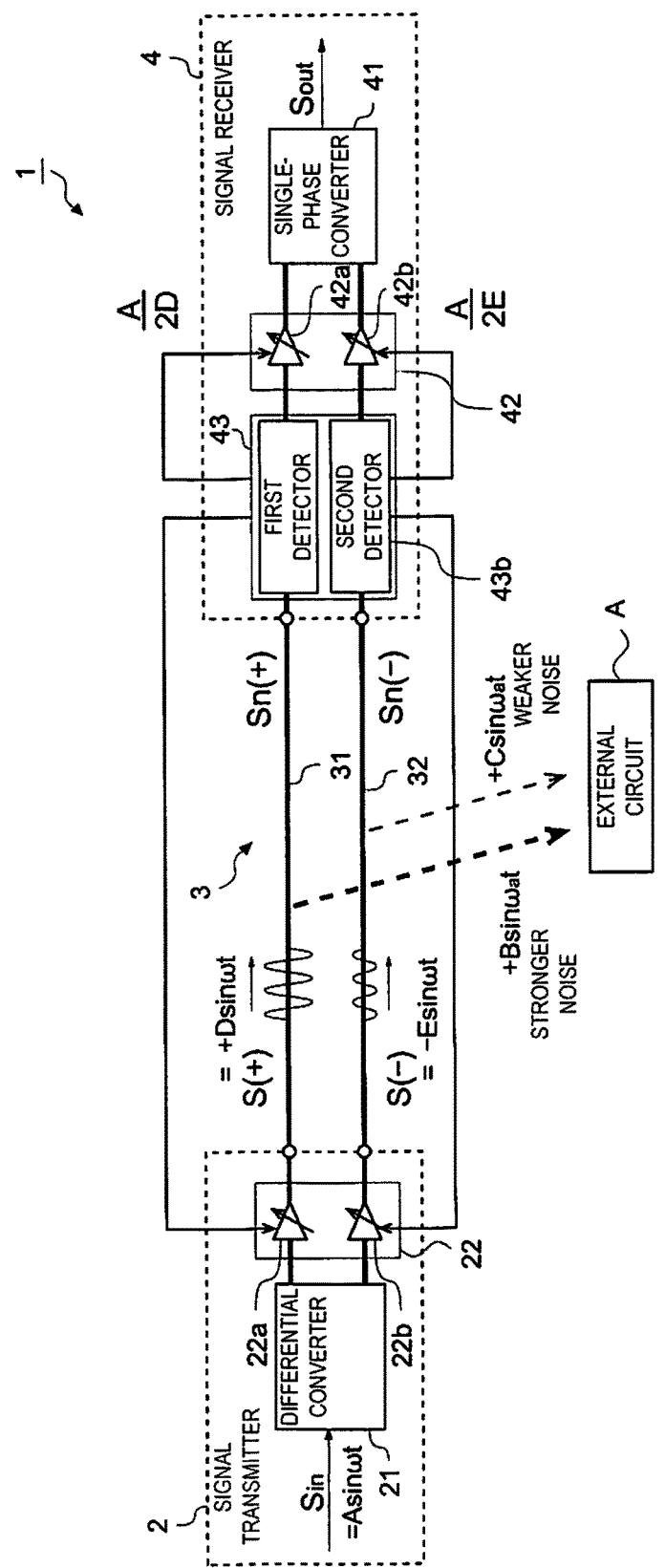
FIG. 9 is a conceptual configuration diagram illustrating that electromagnetic noise radiated from a signal transfer device to the outside is moderated.

FIG. 9 is a conceptual configuration diagram illustrating that electromagnetic noise radiated from a signal transfer device to the outside is moderated. In FIG. 9, the amplitude E of the second transfer signal S(−) transferred over the second transfer path 32 on the side closer to an external circuit A is set lower than the amplitude D of the first transfer signal S(+) transferred over the first transfer path 31 on the farther side. This reduces or eliminates the amplitude difference of electromagnetic waves (that is, noise) radiated from the transfer paths 3 to the external circuit.

In FIG. 9, the signal transfer device 1 of the third reference example is illustrated as an example, but it should go without saying that electromagnetic noise radiated to the outside can be similarly moderated by using the signal transfer device 1 from the first reference example or the transfer paths 3 from the second reference example.

Embodiments of the Present Invention

In the third reference example above, the sensing result (control signal) of the detector 43 has to be sent to the signal transmitter 2, which requires a control line for transferring the control signal.

For example, in the transfer of a signal from a tuner to a demodulator, an AGC line can be used as the above-mentioned control line, so no additional control line has to be provided. Meanwhile, in the transfer of a signal using HDMI or another such digital bus line, the above-mentioned control line is not used, so again no additional control line has to be provided.

In view of this, the signal transfer device pertaining to the present invention is configured so that there is no need for a control line to transfer control signals between the signal transmitter and the signal receiver. In the various embodiments that follow, first and second transfer signals are dissimilated by means of the gain difference between a first amplitude adjuster and a second amplitude adjuster, but the first and second transfer signals may instead be dissimilated by making the characteristics of the first and second transfer paths 31 and 32 different from one another as in the second reference example. Also, description of noise will be omitted in the following description, except for in the fifth embodiment.

First Embodiment

Figure 10:
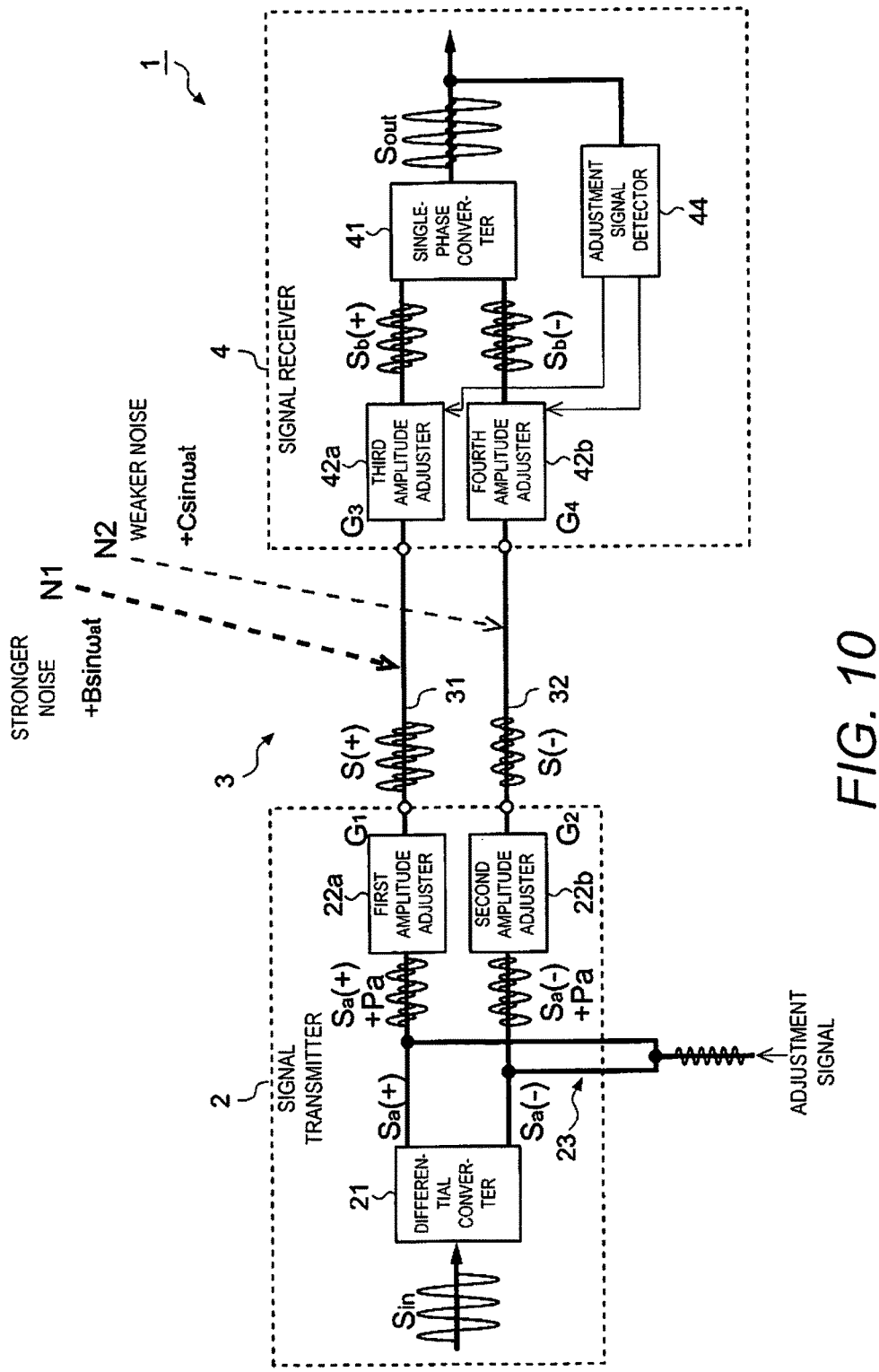
FIG. 10 is a conceptual configuration diagram showing an example of the signal transfer device pertaining to a first embodiment.

FIG. 10 is a conceptual configuration diagram showing an example of the signal transfer device 1 pertaining to a first embodiment. In FIG. 10, those components that are the same as or similar to those in FIG. 9 are numbered the same and will not be described in detail.

The signal transmitter 2 comprises the differential converter 21, the first amplitude adjuster 22a, the second amplitude adjuster 22b, and a superposition component 23. A variable gain amplifier or a variable gain attenuator, for example, can be used as the first amplitude adjuster 22a. The first amplitude adjuster 22a may be a circuit that is a combination of a variable gain amplifier, a variable gain attenuator, a switch, etc. Similarly, a variable gain amplifier or a variable gain attenuator, for example, can be used as the second amplitude adjuster 22b. Also, the second amplitude adjuster 22b may be a circuit that is a combination of a variable gain amplifier, a variable gain attenuator, a switch, etc.

The differential converter 21 converts the single-phase input signal Sin (=A sin ωt) into transfer signals Sa(+)(=(A/2)sin ωt) and Sa(−)(=−(A/2)sin ωt) of mutually opposite phase.

The superposition component 23 superposes an adjustment signal Pa(=F sin $\omega_P$t) over the transfer signal S(+), and superposes an adjustment signal Pa(=F sin $\omega_P$t) over the transfer signal S(−).

The first amplitude adjuster 22a, which performs amplitude adjustment with a first gain $G_1$, converts the transfer signal S(+)+Pa over which the adjustment signal has been superposed into the first transfer signal S(+)(=$G_1$(A/2)sin ωt+$G_1$F sin $\omega_P$t). The second amplitude adjuster 22b, which performs amplitude adjustment with a second gain $G_2$, converts the transfer signal S(−)+Pa over which the adjustment signal has been superposed into the second transfer signal S(−)(=−$G_2$(A/2)sin ωt+$G_2$F sin $\omega_P$t).

The first transfer signal S(+) is transferred by the first transfer path 31 from the signal transmitter 2 to the signal receiver 4. The second transfer signal S(−) is transferred by the second transfer path 32 from the signal transmitter 2 to the signal receiver 4.

The signal receiver 4 comprises a third amplitude adjuster 42a, a fourth amplitude adjuster 42b, the single-phase converter 41, and an adjustment signal detector 44.

The third amplitude adjuster 42a, which performs amplitude adjustment with a third gain $G_3$, converts the first transfer signal S(+) into a signal Sb(+)(=$G_3G_1$(A/2)sin ωt+$G_3G_1$F sin $\omega_P$t). The fourth amplitude adjuster 42b, which performs amplitude adjustment with a fourth gain $G_4$, converts the second transfer signal S(−) into a signal Sb(−)(=$G_4G_2$(A/2)sin ωt+$G_4G_2$F sin $\omega_P$t).

The single-phase converter 41 converts the signal S(+) and the signal S(−) into the single-phase output signal Sout(=($G_3G_1$+$G_4G_2$)(A/2)sin ωt+($G_3G_1$−$G_4G_2$)F sin $\omega_P$t).

The adjustment signal detector 44 detects an adjustment signal component from the output signal Sout, and adjusts the third gain $G_3$ of the third amplitude adjuster 42a and the fourth gain $G_4$ of the fourth amplitude adjuster 42b so that the adjustment signal component will approach zero ($G_3G_1$−$G_4G_2$=0), based on the detection result. At this point, because $G_3G_1$=$G_4G_2$, signals in which the adjustment signals have been removed from the signal Sb(+) and the signal Sb(−) are correctly restored to the same amplitude.

In this embodiment, the signal transmitter 2 has the superposition component 23 that superposes the first adjustment signal Pa over the transfer signal S(+), and superposes the second adjustment signal Pa, which has the same phase as the first adjustment signal, over the transfer signal S(−). Also, in this embodiment, the signal receiver 4 has the adjustment signal detector 44 (detector) that detects a first adjustment signal transferred by the first transfer path 31 and a second adjustment signal transferred by the second transfer path 32, and the third amplitude adjuster 42a and fourth amplitude adjuster 42b that vary the amplitude of the first and second transfer signals based on the detection result of the adjustment signal detector 44 (detector).

With this configuration, the signal receiver 4 can execute gain balance suited to the gain balance determined by the signal transmitter 2, based on an adjustment signal. There is therefore no need for a control line to transfer control signals.

In the illustrated embodiment, the signal transfer device 1 is provided that comprises the signal transmitter 2, the first and second amplitude adjuster 22a and 22b (e.g., first amplitude adjustment component), the superposition component 23 (e.g., adjustment signal output component), the adjustment signal detector 44 (e.g., detector) and the third and fourth amplitude adjusters 42a and 42b (e.g., second amplitude adjustment component). The signal transmitter 2 is configured to output the first and second transfer signals S(+) and S(−)(e.g., signals) to the first and second transfer paths 31 and 32 based on the single-phase input signal Sin. The first and second amplitude adjuster 22a and 22b are configured to adjust at least one of the amplitudes of the first and second transfer signals S(+) and S(−) transferred to the first and second transfer paths 31 and 32 based on a predetermined amplitude ratio. Specifically, the first and second amplitude adjuster 22a and 22b are configured to adjust the amplitude ratio of the amplitudes of the first and second transfer signals S(+) and S(−) transferred to the first and second transfer paths 31 and 32 to a predetermined amplitude ratio. The superposition component 23 is configured to output the adjustment signals Pa to the first and second transfer paths 31 and 32. The adjustment signal detector 44 is configured to detect the adjustment signals Pa. The third and fourth amplitude adjusters 42a and 42b are configured to adjust at least one of the amplitudes of the first and second transfer signals S(+) and S(−) transferred to the first and second transfer paths 31 and 32 based on detection result of the adjustment signal detector 44.

In the illustrated embodiment, with the signal transfer device 1 mentioned above, the signal transmitter 2 includes the differential converter 21 (e.g., first converter). The differential converter 21 is configured to convert the single-phase input signal Sin to the transfer signals Sa(+) and Sa(−)(e.g., signals) of mutually opposite phase. The signal transmitter 2 is configured to output the transfer signals Sa(+) and Sa(−) of mutually opposite phase to the first and second transfer paths 31 and 32.

In the illustrated embodiment, the signal transfer device 1 further comprises the single-phase converter 41 (e.g., second converter). The single-phase converter 41 is configured to convert the first and second transfer signals S(+) and S(−) transferred to the first and second transfer paths 31 and 32 to the single-phase output signal Sout. The single-phase converter 41 is configured to convert the first and second transfer signals S(+) and S(−) based on the predetermined amplitude ratio.

In the illustrated embodiment, with the signal transfer device 1 mentioned above, the adjustment signals Pa outputted to the first and second transfer paths 31 and 32 are signals of the same phase.

In the illustrated embodiment, with the signal transfer device 1 mentioned above, the adjustment signal detector 44 is configured to detect the adjustment signals Pa that are transferred to the output signal transfer path over which the single-phase output signal Sout is transferred.

Second Embodiment

Figure 11:
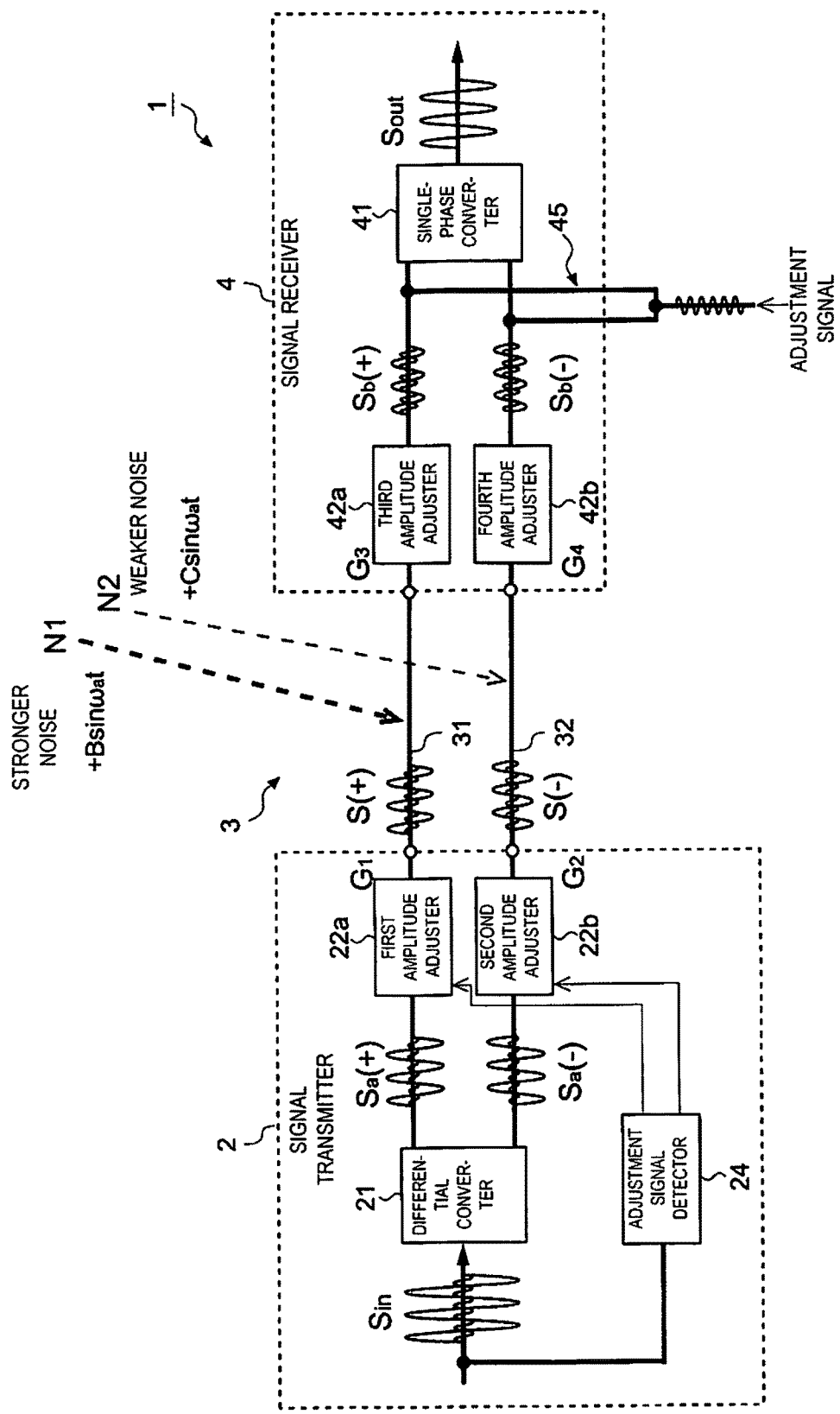
FIG. 11 is a conceptual configuration diagram showing an example of the signal transfer device pertaining to a second embodiment.

The configuration of the signal transfer device 1 pertaining to the second embodiment is shown in FIG. 11. In FIG. 11, those components that are the same as or similar to those in FIG. 10 are numbered the same and will not be described in detail.

With the signal transfer device 1 pertaining to the first embodiment, the signal receiver 4 executed gain balance suited to the gain balance determined by the signal transmitter 2, based on an adjustment signal. With the signal transfer device 1 pertaining to this embodiment, as opposed to the signal transfer device 1 pertaining to the first embodiment, the signal transmitter 2 executes gain balance suited to the gain balance determined by the signal receiver 4, based on an adjustment signal. When the signal receiver 4 evaluates the quality of the transfer signal transferred from the signal transmitter 2, the gain balance is preferably determined by the signal receiver 4 based on this evaluation result, so the signal transfer device 1 pertaining to this embodiment is favorable.

The signal transfer device 1 pertaining to this embodiment differs from the signal transfer device 1 pertaining to the first embodiment in that the signal receiver 4 comprises a superposition component 45, and the signal transmitter 2 comprises an adjustment signal detector 24. The superposition component 45 has the same configuration as the superposition component 23 of the signal transfer device 1 pertaining to the first embodiment, and the adjustment signal detector 24 has the same configuration as the adjustment signal detector 44 of the signal transfer device 1 pertaining to the first embodiment.

As mentioned above, the signal transfer device 1 pertaining to this embodiment is such that the signal receiver 4 comprises the superposition component 45 and the signal transmitter 2 comprises the adjustment signal detector 24, so adjustment signals are transferred from the signal receiver 4 to the signal transmitter 2. Specifically, with the signal transfer device 1 pertaining to this embodiment, since the transfer direction of transfer signals is the opposite of the transfer direction of adjustment signals, the first amplitude adjuster 22a, the second amplitude adjuster 22b, the third amplitude adjuster 42a, and the fourth amplitude adjuster 42b cannot be equipped with active elements. Therefore, with the signal transfer device 1 pertaining to this embodiment, the first amplitude adjuster 22a, the second amplitude adjuster 22b, the third amplitude adjuster 42a, and the fourth amplitude adjuster 42b can only perform gain attenuation, and not gain amplification.

The various signals in this embodiment will now be described. Superposition of an adjustment signal results in the signal Sb(+) transferred from the third amplitude adjuster 42a to the single-phase converter 41 becoming $G_3G_1(A/2)\sin \omega t+F \sin \omega_F t$, and in the signal Sb(−) transferred from the fourth amplitude adjuster 42b becoming $-G_4G_2(A/2)\sin \omega t+F \sin \omega_F t$.

Also, transfer of the adjustment signal through the third amplitude adjuster 42a and the fourth amplitude adjuster 42b causes the first transfer signal S(+) to become $G_1(A/2) \sin \omega t+G_3F \sin \omega_F t$, and the second transfer signal S(−) to become $G_2(A/2)\sin \omega t+G_4F \sin \omega_F t$.

Also, transfer of the adjustment signal through the first amplitude adjuster 22a and the second amplitude adjuster 22b causes the signal Sa(+) transferred from the differential converter 21 to the first amplitude adjuster 22a to become $(A/2)\sin \omega t+G_1G_3F \sin \omega_F t$, and the signal Sa(−) transferred from the differential converter 21 to the second amplitude adjuster 22b to become $-(A/2)\sin \omega t+G_2G_4F \sin \omega_F t$.

Therefore, the signal Sin transferred to the differential converter 21 becomes $A \sin \omega t+(G_1G_3-G_2G_4)F \sin \omega_F t$.

The adjustment signal detector 24 detects the adjustment signal component from the signal Sin, and adjusts the first gain $G_1$ of the first amplitude adjuster 22a and the second gain $G_2$ of the second amplitude adjuster 22b so that the adjustment signal component will approach zero ($G_1G_3-G_2G_4=0$), based on this detection result. At this time, because $G_1G_3=G_2G_4$, signals in which the adjustment signals have been removed from the signal Sb(+) and the signal Sb(−) are correctly restored to the same amplitude.

With the signal transfer device 1 pertaining to this embodiment, the signal transmitter 2 can execute gain balance suited to the gain balance determined by the signal receiver 4, based on an adjustment signal. There is therefore no need for a control line to transfer control signals.

In the illustrated embodiment, the signal transfer device 1 is provided that comprises the signal transmitter 2, the third and fourth amplitude adjusters 42a and 42b (e.g., first amplitude adjustment component), the superposition component 45 (e.g., adjustment signal output component), the adjustment signal detector 24 (detector) and the first and second amplitude adjuster 22a and 22b (e.g., second amplitude adjustment component). The signal transmitter 2 is configured to output the first and second transfer signals S(+) and S(−)(e.g., signals) to the first and second transfer paths 31 and 32 based on the single-phase input signal Sin. The third and fourth amplitude adjusters 42a and 42b are configured to adjust at least one of the amplitudes of the first and second transfer signals S(+) and S(−) transferred to the first and second transfer paths 31 and 32 based on a predetermined amplitude ratio. Specifically, the third and fourth amplitude adjusters 42a and 42b are configured to adjust the amplitude ratio of the amplitudes of the first and second transfer signals S(+) and S(−) transferred to the first and second transfer paths 31 and 32 to a predetermined amplitude ratio. The superposition component 45 is configured to output the adjustment signals to the first and second transfer paths 31 and 32. The adjustment signal detector 24 is configured to detect the adjustment signals. The first and second amplitude adjuster 22a and 22b are configured to adjust at least one of the amplitudes of the first and second transfer signals S(+) and S(−) transferred to the first and second transfer paths 31 and 32 based on detection result of the adjustment signal detector 24.

In the illustrated embodiment, with the signal transfer device 1 mentioned above, the signal transmitter 2 includes the differential converter 21 (e.g., first converter). The differential converter 21 is configured to convert the single-phase input signal Sin to the transfer signals Sa(+) and Sa(−)(e.g., signals) of mutually opposite phase. The signal transmitter 2 is configured to output the transfer signals Sa(+) and Sa(−) of mutually opposite phase to the first and second transfer paths 31 and 32.

In the illustrated embodiment, the signal transfer device 1 further comprises the single-phase converter 41 (e.g., second converter). The single-phase converter 41 is configured to convert the first and second transfer signals S(+) and S(−) transferred to the first and second transfer paths 31 and 32 to the single-phase output signal Sout. The single-phase converter 41 is configured to convert the first and second transfer signals S(+) and S(−) based on the predetermined amplitude ratio.

In the illustrated embodiment, with the signal transfer device 1 mentioned above, the adjustment signals outputted to the first and second transfer paths 31 and 32 are signals of the same phase.

In the illustrated embodiment, with the signal transfer device 1 mentioned above, the adjustment signal detector 24 is configured to detect the adjustment signals that are transferred to the input signal transfer path over which the single-phase input signal Sin is transferred.

Third Embodiment

Figure 12:
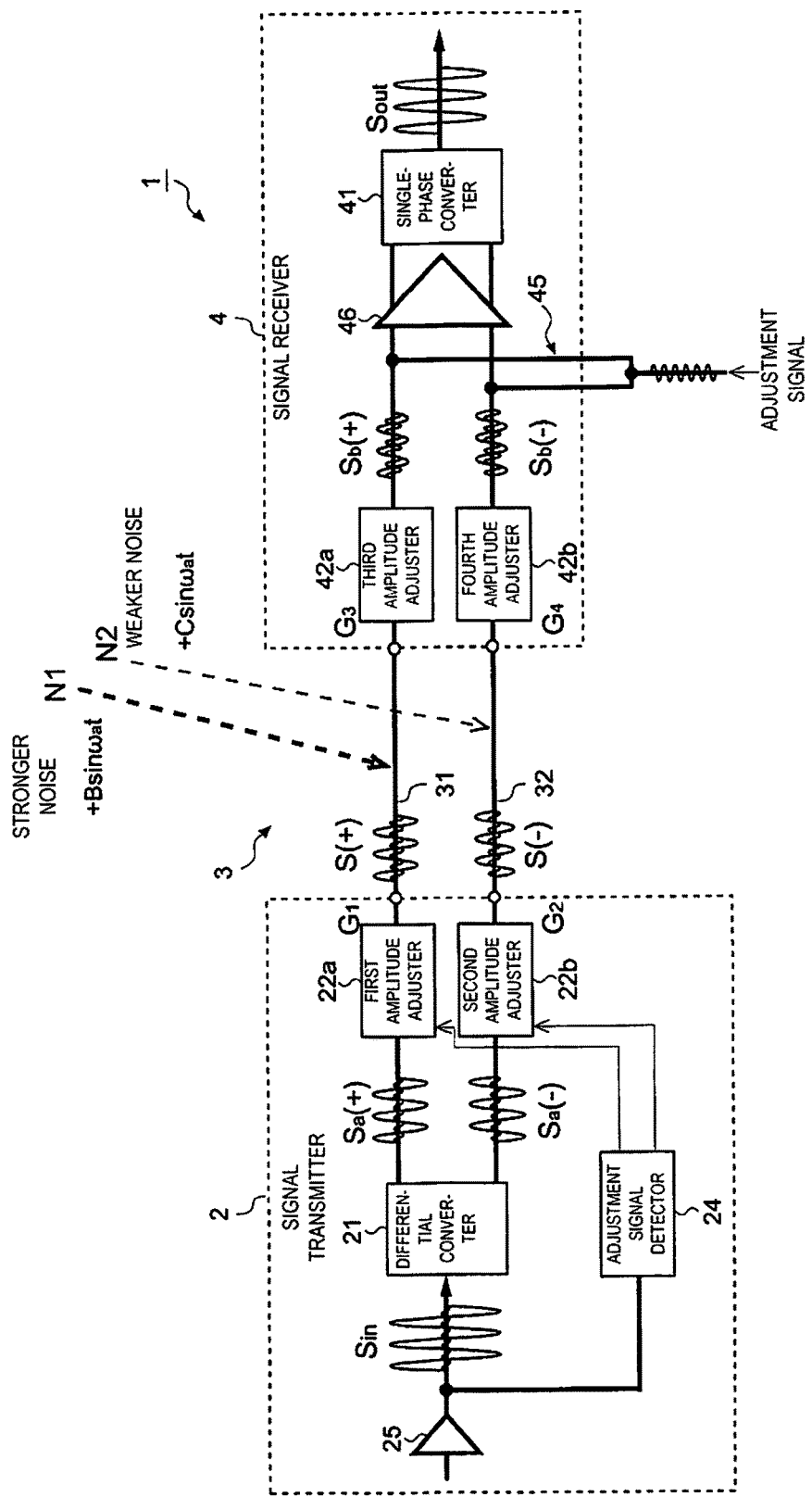
FIG. 12 is a conceptual configuration diagram showing an example of the signal transfer device pertaining to a third embodiment.

FIG. 12 shows the configuration of the signal transfer device 1 pertaining to a third embodiment. In FIG. 12, those components that are the same as or similar to those in FIG. 11 are numbered the same and will not be described in detail.

The signal transfer device 1 pertaining to this embodiment have a configuration in which a receiving-side amplifier 46 and a transmitting-side amplifier 25 are added to the signal transfer device 1 pertaining to the second embodiment. The receiving-side amplifier 46 is provided at a stage before the differential converter 21 and the adjustment signal detector 24, and the transmitting-side amplifier 25 is provided at a stage after the superposition component 45.

With the signal transfer device 1 pertaining to this embodiment, signal amplification at the signal transmitter 2 and signal amplification at the signal receiver 4 are possible. Just the receiving-side amplifier 46 or the transmitting-side amplifier 25 may instead be provided, so that only signal amplification at the signal transmitter 2 or signal amplification at the signal receiver 4 is possible.

In the illustrated embodiment, the signal transfer device 1 further comprises the receiving-side amplifier 46 (e.g., first amplifier). The receiving-side amplifier 46 is configured to amplify the first and second transfer signals S(+) and S(−) or the transfer signals Sa(+) and Sa(−)(e.g., signals) transferred to the first and second transfer paths 31 and 32.

In the illustrated embodiment, the signal transfer device 1 further comprises the transmitting-side amplifier 25 (e.g., second amplifier). The transmitting-side amplifier 25 is configured to amplify input signal Sin or input signal to the signal transmitter 2 (e.g., signal) transferred to the input signal transfer path.

Fourth Embodiment

Figure 13:
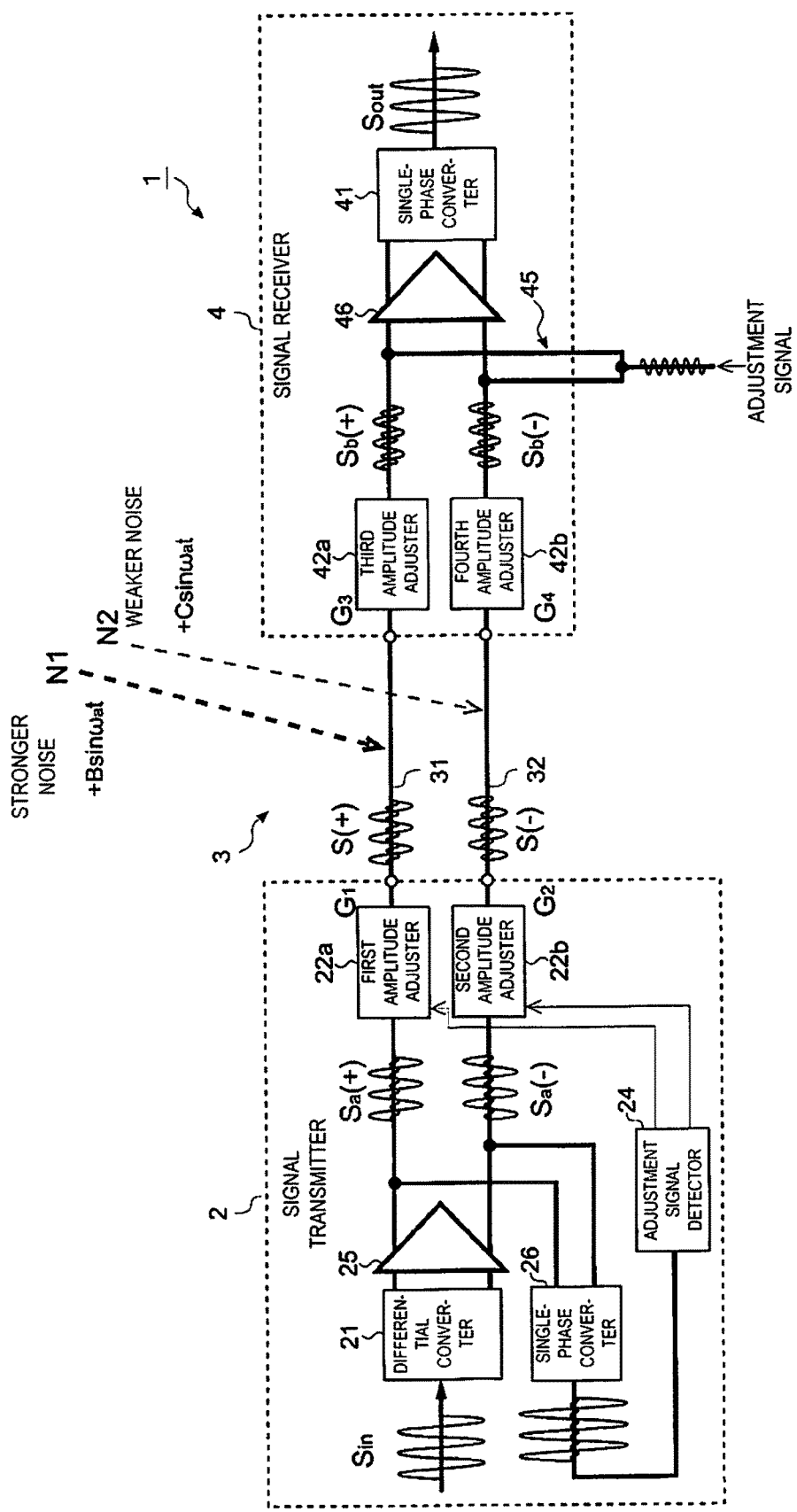
FIG. 13 is a conceptual configuration diagram showing an example of the signal transfer device pertaining to a fourth embodiment.

FIG. 13 shows the configuration of the signal transfer device 1 pertaining to a fourth embodiment. In FIG. 13, those components that are the same as or similar to those in FIG. 12 are numbered the same and will not be described in detail.

With the signal transfer device 1 pertaining to this embodiment, the receiving-side amplifier 46 of the signal transfer device 1 pertaining to the third embodiment is changed to a differential type of amplifier and is disposed at a stage after the differential converter 21 and before the adjustment signal detector 24, and a single-phase converter 26 is added and is disposed at a stage after the receiving-side amplifier 46 and before the adjustment signal detector 24.

With the signal transfer device 1 pertaining to this embodiment, signal amplification at the signal transmitter 2 and signal amplification at the signal receiver 4 are possible. The transmitting-side amplifier 25 may be removed so that only signal amplification at the signal transmitter 2 is possible.

In the illustrated embodiment, with the signal transfer device 1 mentioned above, the adjustment signal detector 24 (e.g., detector) is configured to detect the adjustment signals that are transferred to the first and second transfer paths 31 and 32.

Fifth Embodiment

Figure 14:
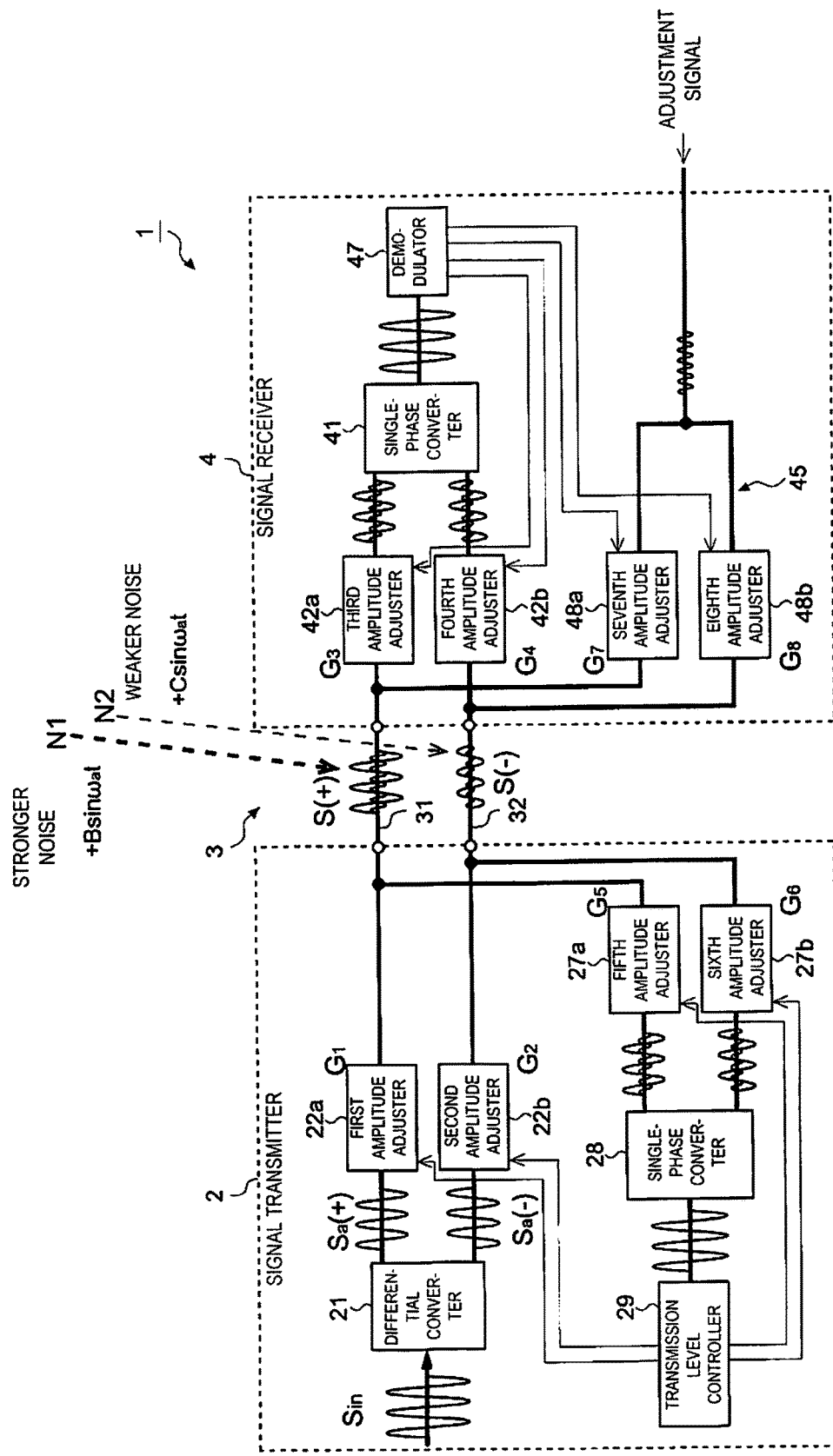
FIG. 14 is a conceptual configuration diagram showing an example of the signal transfer device pertaining to a fifth embodiment.

FIG. 14 shows the configuration of the signal transfer device 1 pertaining to a fifth embodiment. In FIG. 14, those components that are the same as or similar to those in FIG. 11 are numbered the same and will not be described in detail.

With the signal transfer device 1 pertaining to this embodiment, a fifth amplitude adjuster 27a, a sixth amplitude adjuster 27b, and a single-phase converter 28 are added to the signal transmitter 2 of the signal transfer device 1 pertaining to the second embodiment, the adjustment signal detector 24 is replaced with a transmission level controller 29, and a demodulator 47, a seventh amplitude adjuster 48a, and an eighth amplitude adjuster 48b are added to the signal receiver 4 of the signal transfer device 1 pertaining to the second embodiment. The transmission level controller 29 is an example of the "detector" and the "amplitude variation component" comprised by the signal transfer device pertaining to the present invention. In other words, in the illustrated embodiment, the fifth and sixth amplitude adjusters 27a and 27b, the single-phase converter 28 and the transmission level controller 29 forms the "detector" of the present application.

The basic operation of the signal transfer device 1 pertaining to this embodiment will be described. We will describe a situation in which the first noise signal N1 (=+B sin ωat) is incident on the first transfer path 31, and the second noise signal N2 (=+C sin ωat) is incident on the second transfer path 32.

The demodulator 47 measures the quality (C/N) of the signal transferred from the single-phase converter 41, and adjusts the third gain $G_3$ of the third amplitude adjuster 42a and the fourth gain $G_4$ of the fourth amplitude adjuster 42b so that C/N will reach its maximum. This adjustment results in $G_3B-G_4C=0$, so $G_4=(B/C)G_3$ is the result.

The demodulator 47 also detects the adjustment signal component included in the signal transferred from the single-phase converter 41, and adjusts the seventh gain $G_7$ of the seventh amplitude adjuster 48a and the eighth gain $G_8$ of the eighth amplitude adjuster 48b so that the adjustment signal component included in the signal transferred from the single-phase converter 41 will be zero. This adjustment results in $G_3G_7-G_4G_8=0$, so $G_8=(G_3/G_4)G_7=(C/B)G_7$ is the result. As long as the third, fourth, seventh, and eighth gains $G_3$, $G_4$, $G_7$, and $G_8$ controlled by the signal receiver 4 are control values that allow control at sufficient accuracy, it is possible to adjust so that $G_3G_7-G_4G_8=0$ even without the demodulator 47 performing detection of the adjustment signal component. Therefore, in this case the detection of the adjustment signal component by the demodulator 47 may be omitted.

The transmission level controller 29 performs detection of the adjustment signal component included in the signal transferred from the single-phase converter 28, and adjusts the fifth gain $G_5$ of the fifth amplitude adjuster 27a and the sixth gain $G_6$ of the sixth amplitude adjuster 27b so that the adjustment signal component included in the signal transferred from the single-phase converter 28 will be zero. This adjustment results in $G_5G_7-G_6G_8=0$, so $G_6=(G_7/G_8)G_5=(B/C)G_5$ is the result.

The transmission level controller 29 measures the level of the transmission signal (transfer signal) transmitted by the signal transmitter 2 by measuring the level of the signal transferred from the single-phase converter 28.

If we let $S_{det}$ be the level detected by the transmission level controller 29, then $$S_{det}=(G_1G_5+G_2G_6)(A/2)\sin \omega t+(G_7G_5-G_8G_6)F \sin \omega_p t+(G_5B-G_6C)\sin \omega at,$$

and if this is controlled with $G_2G_2=G_{12}=$(constant), it can be expressed as a function $f(G_1)$ of $G_1$ as follows.

$$(\text{amplitude of } S_{det} \text{ first term})/(A/2) = G_1G_5 + G_2G_6$$

$$= G_1G_5 + G_{12}G_6/G_1$$

$$= G_5\{G_1 + G_{12}C/B)(1/G_1)\}(\because G_6 = (B/C)G_5)$$

$$= f(G_1)$$

If a differential of $f(G_1)$ produced by $G_1$ is expressed by $f'(G_1)$, we obtain:

$$f'(G_1)=df(G_1)/dG_1=G_5\{1-(G_{12}C/B)(1/G_1^2)\}$$

which gives the following:

when $G_1<\sqrt{(G_{12}C/B)},f'(G_1)<0$, when $G_1=\sqrt{(G_{12}C/B)},f'(G_1)=0$, and when $G_1>\sqrt{(G_{12}C/B)},f'(G_1)>0$.

That is, $G_1=\sqrt{(G_{12}C/B)}=G_1=\sqrt{(G_1G_2C/B)}$, and therefore when $G_1G_5-G_2G_6=0$, $f'(G_1)$ is at its minimum.

Specifically, if the first gain $G_1$ of the first amplitude adjuster 22a and the second gain $G_2$ of the second amplitude adjuster 22b are adjusted so that the level detected by the transmission level controller 29 is at its minimum, the result is that $G_1G_5-G_2G_6=0$, so we obtain $G_2=(G_5/G_6)G_1=(C/B)G_1$. Also, at this point $G_3/G_4=G_2/G_1=C/B$, that is, $G_3G_1=G_4G_2$, so signals obtained by removing the adjustment signal from the signal transferred from the third amplitude adjuster 42a to the single-phase converter 41 and the signal transferred from the fourth amplitude adjuster 42b to the single-phase converter 41 are correctly restored to the same amplitude. As long as the first, second, fifth, and sixth gains $G_1$, $G_2$, $G_5$, and $G_6$ controlled by the signal transmitter 2 are control values that allow control at sufficient accuracy, it is possible to adjust so that $G_1G_5-G_2G_6=0$ even without the transmission level controller 29 measuring the level of the signal transferred from the single-phase converter 28. Therefore, in this case the level measurement of the signal transferred from the single-phase converter 28 by the transmission level controller 29 may be omitted.

With the above operation, the demodulator 47 of the signal receiver 4 can evaluate the quality (C/N) of the transfer signal transferred from the signal transmitter 2, and the gain balance can be determined by the signal receiver 4 based on this evaluation result. The signal transmitter 2 can execute gain balance suited to the gain balance determined by the signal receiver 4.

In the illustrated embodiment, with the signal transfer device 1 mentioned above, the fifth and sixth amplitude adjusters 27a and 27b, the single-phase converter 28 and the transmission level controller 29 (e.g., detector) are configured to detect the adjustment signals that are transferred to the first and second transfer paths 31 and 32.

In the illustrated embodiment, with the signal transfer device 1 mentioned above, the detector has the single-phase converter 28 (e.g., differential combiner). The single-phase converter 28 is configured to perform differential combination on the amplified signals of the first and second transfer signals S(+) and S(−) transferred to the first and second transfer paths 31 and 32.

In the illustrated embodiment, the signal transfer device 1 mentioned above further includes the seventh and eighth amplitude adjusters 48a and 48b (e.g., third amplitude adjustment component). The seventh and eighth amplitude adjusters 48a and 48b are configured to adjust at least one of the amplitudes of the adjustment signals that is to be outputted to the first and second transfer paths 31 and 32 from the superposition component 45 (e.g., adjustment signal output component).

In the illustrated embodiment, the signal transfer device 1 mentioned above further comprises the demodulator 47. The demodulator 47 is configured to demodulate the output signal (e.g., signal) from the single-phase converter 41. At least one of the adjustments by the the third and fourth amplitude adjusters 42a and 42b (e.g., first amplitude adjustment component) and the the seventh and eighth amplitude adjusters 48a and 48b (e.g., third amplitude adjustment component) is conducted based on the demodulated signal of the demodulator 47. Specifically, in the illustrated embodiment, the signal transfer device 1 mentioned above comprises the single-phase converter 41 (e.g., second converter) and the demodulator 47. The single-phase converter 41 is configured to convert the signals transferred to the first and second transfer paths 31 and 32 to a single-phase output signal. The demodulator 47 is configured to demodulate the output signal converted by the single-phase converter 41. At least one of the adjustments by the the third and fourth amplitude adjusters 42a and 42b (e.g., first amplitude adjustment component) and the the seventh and eighth amplitude adjusters 48a and 48b (e.g., third amplitude adjustment component) is conducted based on the demodulated signal of the demodulator 47.

Sixth Embodiment

Figure 15:
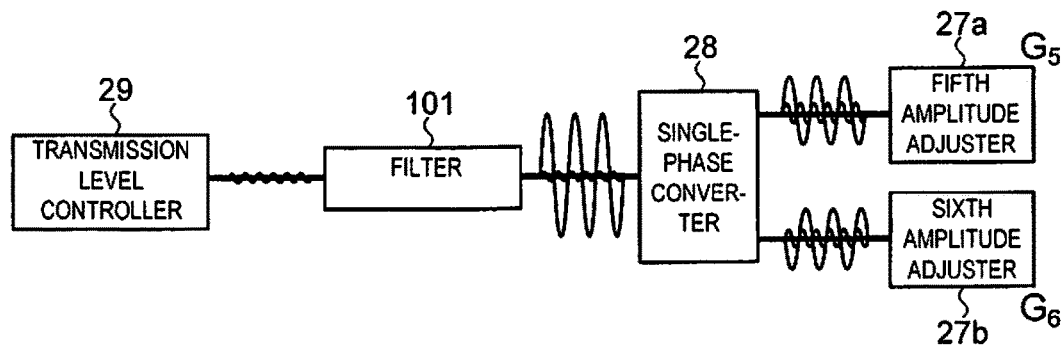
FIG. 15 is a conceptual partial configuration diagram showing an example of the signal transfer device pertaining to a sixth embodiment.

The configuration of the signal transfer device 1 pertaining to the sixth embodiment is such that a filter 101 is provided between the single-phase converter 28 and the transmission level controller 29 as shown in FIG. 15 in the signal transfer device 1 pertaining to the fifth embodiment. Thus, in FIG. 15, those components that are the same as or similar to those in FIG. 14 are numbered the same and will not be described in detail. A high-pass filter or a band-pass filter can be used, for example, as the filter 101.

In the fifth embodiment, the signal transferred from the single-phase converter 28 to the transmission level controller 29 includes not only an adjustment signal component, but also a transfer signal component, so the adjustment signal component sometimes has to be extracted by removing the transfer signal component in order for the transmission level controller 29 to accurately detect the adjustment signal component. In view of this, a configuration example in which the adjustment signal component can be extracted is proposed in this embodiment.

Figure 16:
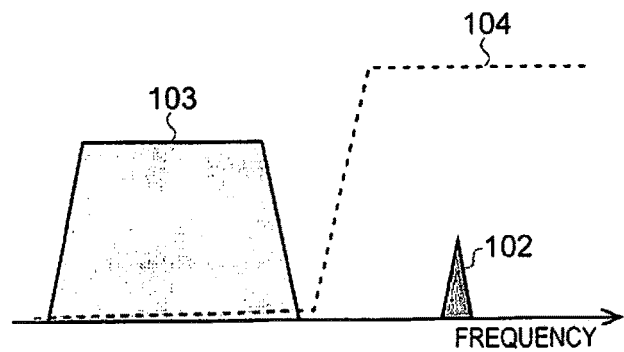
FIG. 16 is a graph of the pass characteristics of a filter and the output signal of a single-phase converter in the sixth embodiment.
Figure 17:
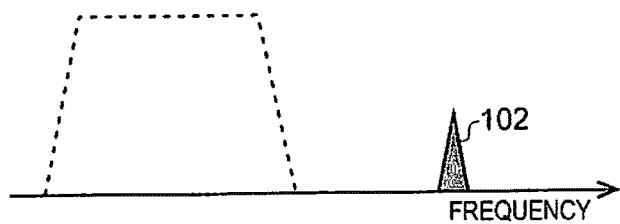
FIG. 17 is a graph of the output signal of the filter in the sixth embodiment.

As shown in FIG. 16, a feature of this embodiment is that the frequency bands are different for an adjustment signal component 102 and a transfer signal component 103 included in the output signal of the single-phase converter 28, and the transmission characteristics 104 of the filter 101 allow the adjustment signal component 102 to pass, but remove the transfer signal component 103. Therefore, the signal transferred from the filter 101 to the transmission level controller 29 has its transfer signal component removed as shown in FIG. 17, and becomes a signal from which the adjustment signal component 102 has been extracted.

In this embodiment, the first, second, fifth, and sixth gains $G_1$, $G_2$, $G_5$, and $G_6$ controlled by the signal transmitter 2 are control values that allow control at sufficient accuracy. Therefore, the transmission level controller 29 performs adjustment that results in $G_1G_5-G_2G_6=0$ without measuring the level of the signal transferred from the single-phase converter 28.

Also, in this embodiment, the filter 101 is provided between the single-phase converter 28 and the transmission level controller 29, but the configuration may be one in which the filter 101 is provided inside the single-phase converter 28, or one in which the filter 101 is provided inside the transmission level controller 29.

Also, the drawings illustrating this embodiment illustrate a case in which the frequency of the adjustment signal is higher than the frequency of the transfer signal, but the frequency of the adjustment signal may instead be lower than the frequency of the transfer signal. In this case, a low-pass filter or a band-pass filter can be used, for example, as the filter 101.

In the illustrated embodiment, with the signal transfer device 1 mentioned above, the detector shown in FIG. 15 further has the filter 101 (e.g., extractor). The filter 101 is configured to extract the adjustment signal component 102 from the differential combination signal of the single-phase converter 28 (e.g., differential combiner).

Seventh Embodiment

Figure 18:
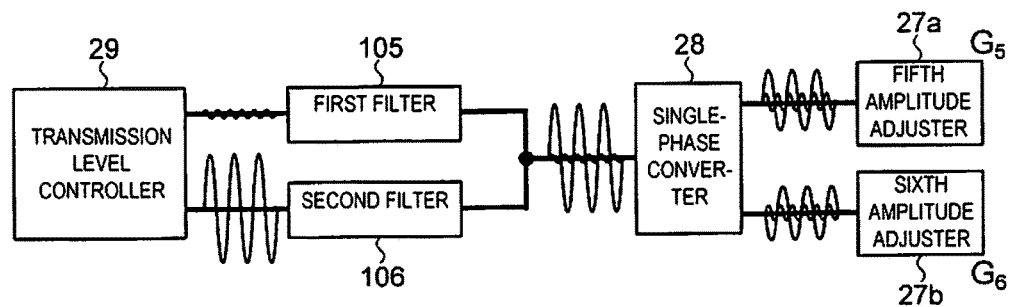
FIG. 18 is a conceptual partial configuration diagram showing an example of the signal transfer device pertaining to a seventh embodiment.

With the configuration of the signal transfer device 1 pertaining to the seventh embodiment, the transfer path between the single-phase converter 28 and the transmission level controller 29 is split in two as shown in FIG. 18 in the signal transfer device 1 pertaining to the fifth embodiment, with a first filter 105 provided to one path and a second filter 106 provided to the other. Thus, in FIG. 18, those components that are the same as or similar to those in FIG. 14 are numbered the same and will not be described in detail. A high-pass filter or a band-pass filter can be used, for example, as the first filter 105, and a low-pass filter or a band-pass filter can be used, for example, as the second filter 106.

With the fifth embodiment, the signal transferred from the single-phase converter 28 to the transmission level controller 29 includes not only an adjustment signal component, but also a transfer signal component, so the adjustment signal component sometimes has to be extracted by removing the transfer signal component in order for the transmission level controller 29 to accurately detect the adjustment signal component. In view of this, a configuration example in which the adjustment signal component can be extracted is proposed in this embodiment.

Figure 19:
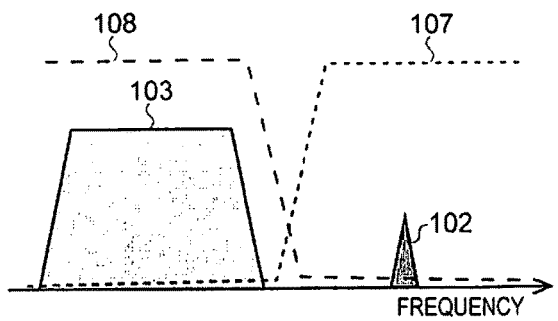
FIG. 19 is a graph of the pass characteristics of first and second filters and the output signal of a single-phase converter in the seventh embodiment.
Figure 20:
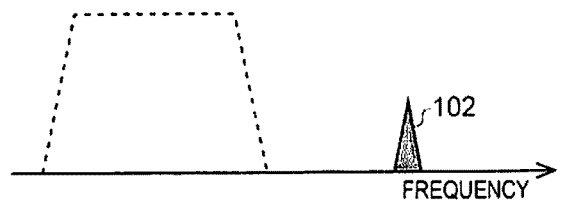
FIG. 20 is a graph of the output signal of the first filter in the seventh embodiment.
Figure 21:
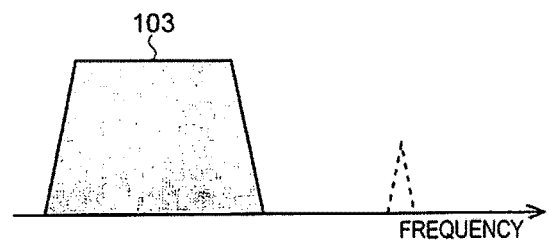
FIG. 21 is a graph of the output signal of the second filter in the seventh embodiment.

With this embodiment, as shown in FIG. 19, the frequency bands are different for the adjustment signal component 102 and the transfer signal component 103 included in the output signal of the single-phase converter 28. Also, as shown in FIG. 19, the transmission characteristics 107 of the first filter 105 allow the adjustment signal component 102 to pass, but remove the transfer signal component 103. Therefore, the signal transferred from the first filter 105 to the transmission level controller 29 has its transfer signal component removed as shown in FIG. 20, and becomes a signal from which the adjustment signal component 102 has been extracted. Furthermore, as shown in FIG. 19, the transmission characteristics 108 of the second filter 106 remove the adjustment signal component 102, and allow the transfer signal component 103 to pass. Therefore, a signal transferred from the second filter 106 to the transmission level controller 29 has its adjustment signal component removed as shown in FIG. 21, and becomes a signal from which the transfer signal component 103 has been extracted.

In this embodiment, unlike in the sixth embodiment, the transmission level controller 29 performs adjustment so that $G_1 G_5 - G_2 G_6 = 0$ by measuring the level of the signal transferred from the single-phase converter 28.

Also, with this embodiment, the first filter 105 and the second filter 106 are provided between the single-phase converter 28 and the transmission level controller 29, but the configuration may instead be such that just the first filter 105 and/or the second filter 106 is provided inside the transmission level controller 29.

Also, the drawings illustrating this embodiment illustrate a case in which the frequency of the adjustment signal is higher than the frequency of the transfer signal, but the frequency of the adjustment signal may instead be lower than the frequency of the transfer signal. In this case, a low-pass filter or a band-pass filter can be used, for example, as the filter 105, and a high-pass filter or a band-pass filter can be used, for example, as the filter 106.

In the illustrated embodiment, with the signal transfer device 1 mentioned above, the detector shown in FIG. 18 further has the filter 105 (e.g., extractor). The filter 105 is configured to extract the adjustment signal component 102 from the differential combination signal of the single-phase converter 28 (e.g., differential combiner).

In the illustrated embodiment, with the signal transfer device 1 mentioned above, the detector shown in FIG. 18 further has a splitter (black dot on the signal line between the single-phase converter 28 and the first and second filters 105 and 106) and the first filter 105 (e.g., first extractor). The splitter is configured to split the differential combination signal of the single-phase converter 28. The first filter 105 is configured to extract the adjustment signal component 102 from one output of the splitter.

In the illustrated embodiment, with the signal transfer device 1 mentioned above, the detector shown in FIG. 18 further has the second filter 106 (e.g., second extractor). The second filter 106 is configured to extract the transfer signal component (e.g., signal component) of the first and second transfer signals S(+) and S(−) transferred to the first and second transfer paths 31 and 32 based on the single-phase input signal Sin from the other output of the splitter.

Eighth Embodiment

Figure 22:
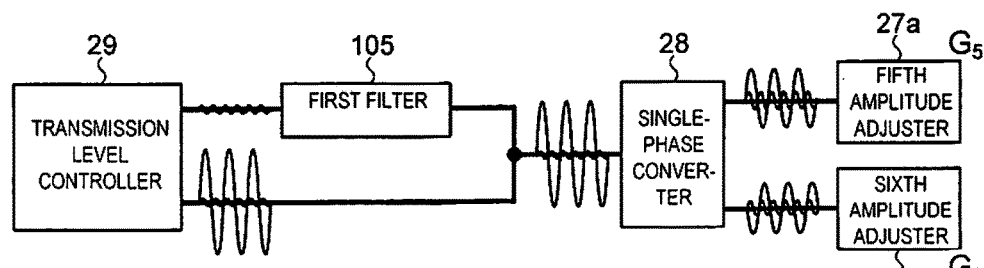
FIG. 22 is a conceptual partial configuration diagram showing an example of the signal transfer device pertaining to an eighth embodiment.
Figure 23:
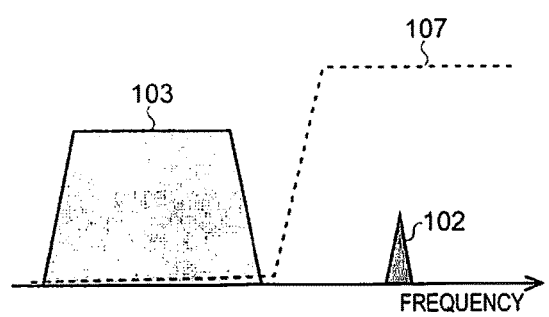
FIG. 23 is a graph of the pass characteristics of a first filter and the output signal of a single-phase converter in the eighth embodiment.
Figure 24:
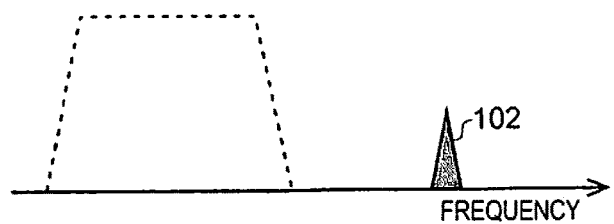
FIG. 24 is a graph of the output signal of the first filter in the eighth embodiment.
Figure 25:
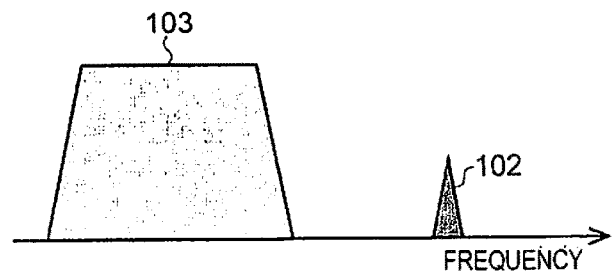
FIG. 25 is a graph of the signal transferred from the single-phase converter to a transmission level controller, without going through a filter, in the eighth embodiment.

As shown in FIG. 22, the configuration of the signal transfer device 1 pertaining to the eighth embodiment is one in which the second filter 106 is omitted from the signal transfer device 1 pertaining to the seventh embodiment. Thus, in FIG. 22, those components that are the same as or similar to those in FIG. 18 are numbered the same and will not be described in detail. Therefore, again in this embodiment, just as in the seventh embodiment, the frequency bands are different for the adjustment signal component 102 and the transfer signal component 103 included in the output signal of the single-phase converter 28, as shown in FIG. 23. Also, as shown in FIG. 23, the transmission characteristics 107 of the first filter 105 allow the adjustment signal component 102 to pass, but remove the transfer signal component 103. Therefore, the signal transferred from the first filter 105 to the transmission level controller 29 has its transfer signal component removed as shown in FIG. 24, and becomes a signal from which the adjustment signal component 102 has been extracted. The signal transferred from the single-phase converter 28 to the transmission level controller 29 without going through a filter includes the adjustment signal component 102 and the transfer signal component 103, as shown in FIG. 25.

To maintain good signal quality of the transfer signal after demodulation by the demodulator 47, the adjustment signal is kept at a level that is usually sufficiently lower than that of the transfer signal. Accordingly, even if the second filter 106 is omitted, the transmission level controller 29 in this embodiment can perform the same control as in the seventh embodiment.

In this embodiment, just as in the seventh embodiment, the transmission level controller 29 performs adjustment so that $G_1 G_5 - G_2 G_6 = 0$ by measuring the level of the signal transferred from the single-phase converter 28.

Also, in this embodiment, the first filter 105 is provided between the single-phase converter 28 and the transmission level controller 29, but the configuration may instead be one in which the first filter 105 is provided inside the transmission level controller 29.

Also, the drawings illustrating this embodiment illustrate a case in which the frequency of the adjustment signal is higher than the frequency of the transfer signal, but the frequency of the adjustment signal may instead be lower than the frequency of the transfer signal. In this case, a low-pass filter or a band-pass filter can be used, for example, as the first filter 105.

Adjustment Signal

The adjustment signal used in the embodiments given above must not undergo a pronounced drop in the signal quality of the data signal being transferred when superposed over this data signal. The elements that remove an adjustment signal are the removal performance of the receiving device and the capability to cancel out in-phase signals with a differential converter or a single-phase converter (in-phase removal ratio). If an adjustment signal is outside the reception band, the removal performance of the receiving device is the extra-band signal suppression performance of a filter or the like. Here, the adjustment signal must be kept to a level that allows sufficient removal with the filter or the like of the receiving device. To give a similar example, in Japanese standards for tuners that receive terrestrial digital broadcasts, there is a restriction stating that interference signals in adjacent channels must be to a level of no more than about 20 to 30 dB higher than the reception signal. If the frequency of the adjustment signal is within the signal band of the data signal, filtering cannot be done by frequency, so the adjustment signal must be at a level that is sufficiently low with respect to the data signal. To put this in terms of the above-mentioned similar example of Japanese standards for terrestrial digital reception tuners, interference signals on the same channel must be kept at or below a level of 20 to 30 dB lower than the reception signal.

On the other hand, the lower is the level of an adjustment signal, the more the adjustment signal lowers the accuracy of control. To solve this trade-off, it is preferable to use a spread signal for the adjustment signal. The spreading method of the spread signal should be designed so that the required quality (C/N) of the data signal is satisfied, and so as to achieve a spread gain that gives the control accuracy required by the adjustment signal detectors 24 and 44, the demodulator 47, and the transmission level controller 29.

Ninth Embodiment

Figure 26:
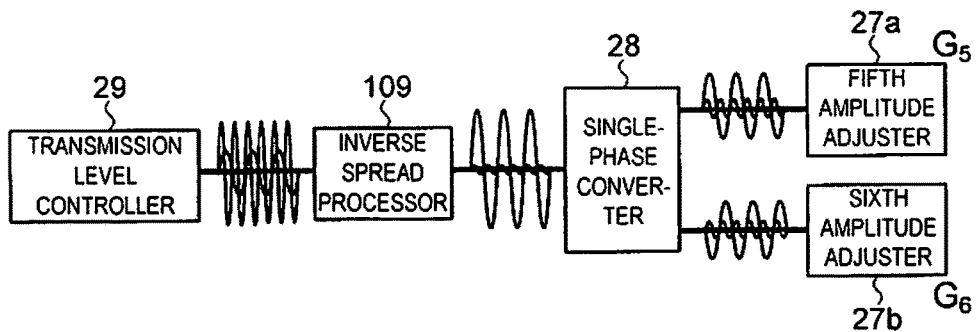
FIG. 26 is a conceptual partial configuration diagram showing an example of the signal transfer device pertaining to a ninth embodiment.

The configuration of the signal transfer device 1 pertaining to the ninth embodiment is one in which an inverse spread processor 109 is provided between the single-phase converter 28 and the transmission level controller 29 as shown in FIG. 26 in the signal transfer device 1 pertaining to the fifth embodiment. Thus, in FIG. 26, those components that are the same as or similar to those in FIG. 14 are numbered the same and will not be described in detail.

Since the signal transferred from the single-phase converter 28 to the transmission level controller 29 includes not only an adjustment signal, but also a transfer signal component, the adjustment signal sometimes has to be extracted in order for the transmission level controller 29 to accurately detect the adjustment signal component. In view of this, a configuration example in which the adjustment signal component can be extracted is proposed in this embodiment.

Figure 27:
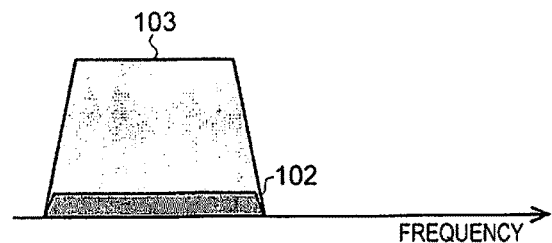
FIG. 27 is a graph of the output signal of the single-phase converter in the ninth embodiment.
Figure 28:
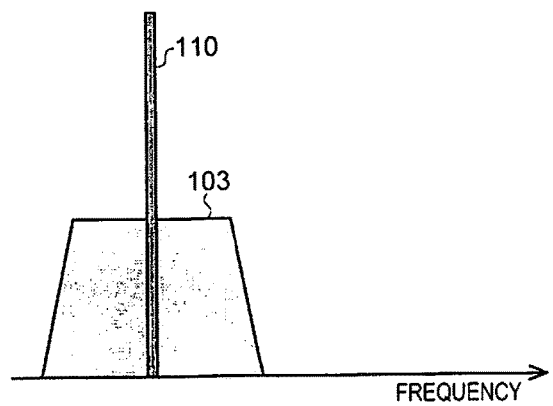
FIG. 28 is a graph of the output signal of the inverse spread processor in the ninth embodiment.

In this embodiment, as shown in FIG. 27, the frequency bands are the same for the adjustment signal component 102 and the transfer signal component 103 included in the output signal of the single-phase converter 28. Therefore, as shown in FIG. 28, the level of an adjustment signal component 110 that has been inversely spread and is included in the output signal of the inverse spread processor 109 is sufficiently higher than the level of the transfer signal component 103 included in the output signal of the inverse spread processor 109. Consequently, the inversely spread adjustment signal component 110 can be easily extracted by the transmission level controller 29.

If we assume here that the transfer signal is also a signal that has undergone spread modulation, the adjustment signal and the transfer signal should be signals that have undergone spread modulation with different spread codes, and the inverse spread processor 109 should perform inverse spread processing using the spread code of the adjustment signal.

In this embodiment, the first, second, fifth, and sixth gains $G_1$, $G_2$, $G_5$, and $G_6$ controlled by the signal transmitter 2 are control values that allow control at sufficient accuracy. Therefore, the transmission level controller 29 performs adjustment that results in $G_1 G_5 - G_2 G_6 = 0$ without measuring the level of the signal transferred from the single-phase converter 28.

Also, in this embodiment, the inverse spread processor 109 is provided between the single-phase converter 28 and the transmission level controller 29, but the configuration may be one in which the inverse spread processor 109 is provided inside the single-phase converter 28, or one in which the inverse spread processor 109 is provided inside the transmission level controller 29.

In the illustrated embodiment, with the signal transfer device 1 mentioned above, the adjustment signals are spread signals.

In the illustrated embodiment, with the signal transfer device 1 mentioned above, the adjustment signals are spread signals. The detector shown in FIG. 26 further has the inverse spread processor 109. The inverse spread processor 109 is configured to inversely spread the differential combination signal of the single-phase converter 28 (e.g., differential combiner).

Tenth Embodiment

Figure 29:
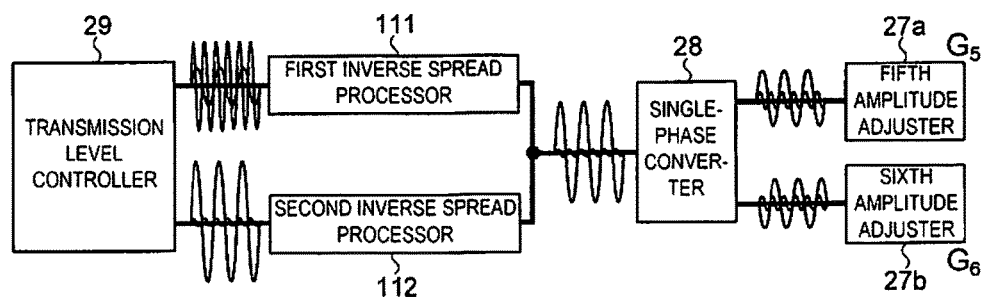
FIG. 29 is a conceptual partial configuration diagram showing an example of the signal transfer device pertaining to a tenth embodiment.

The configuration of the signal transfer device 1 pertaining to the tenth embodiment is one in which the transfer path between the single-phase converter 28 and the transmission level controller 29 is split in two as shown in FIG. 29 in the signal transfer device 1 pertaining to the fifth embodiment. Thus, in FIG. 29, those components that are the same as or similar to those in FIG. 14 are numbered the same and will not be described in detail. In the illustrated embodiment, a first inverse spread processor 111 is provided to one path, and a second inverse spread processor 112 is provided to the other.

In the fifth embodiment, the signal transferred from the single-phase converter 28 to the transmission level controller 29 includes not only an adjustment signal component, but also a transfer signal component, so the adjustment signal component sometimes has to be extracted by removing the transfer signal component in order for the transmission level controller 29 to accurately detect the adjustment signal component. In view of this, a configuration example in which the adjustment signal component can be extracted is proposed in this embodiment.

Figure 30:
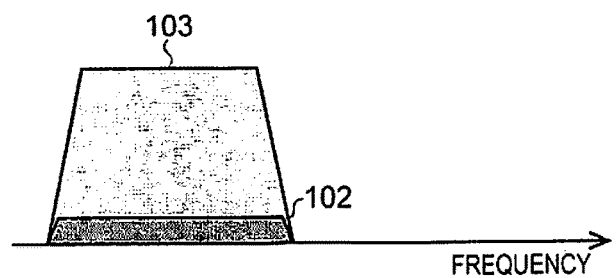
FIG. 30 is a graph of the output signal of the single-phase converter in the tenth embodiment.

With this embodiment, as shown in FIG. 30, the frequency bands are the same for the adjustment signal component 102 and the transfer signal component 103 included in the output signal of the single-phase converter 28, and the adjustment signal and the transfer signal are signals are signals that have undergone spread modulation with different spread codes (e.g., first and second spread codes).

Figure 31:
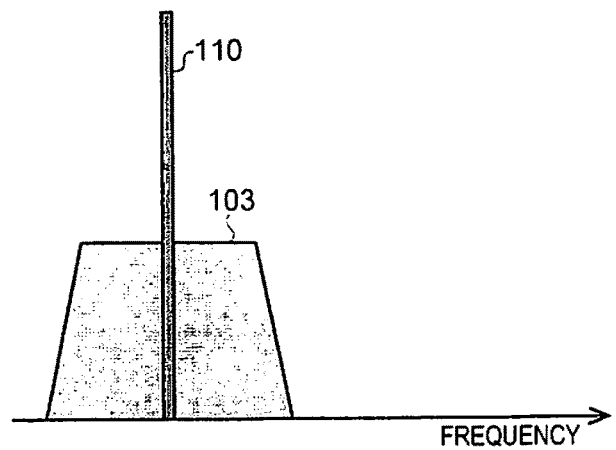
FIG. 31 is a graph of the output signal of the first inverse spread processor in the tenth embodiment.

The first inverse spread processor 111 performs inverse spread processing using the spread code (e.g., first spread code) of the adjustment signal. Accordingly, as shown in FIG. 31, the level of the inversely spread adjustment signal component 110 included in the output signal of the first inverse spread processor 111 is sufficiently higher than the level of the transfer signal component 103 included in the output signal of the first inverse spread processor 111. Consequently, the inversely spread adjustment signal component 110 can be easily extracted by the transmission level controller 29.

Figure 32:
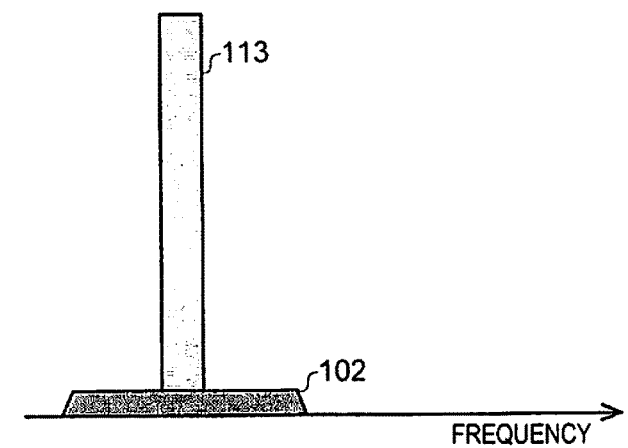
FIG. 32 is a graph of the output signal of the second inverse spread processor in the tenth embodiment.

Meanwhile, the second inverse spread processor 112 performs inverse spread processing using the spread code (e.g., second spread code) of the transfer signal. Accordingly, as shown in FIG. 32, the level of the inversely spread transfer signal component 113 included in the output signal of the second inverse spread processor 112 is sufficiently higher than the level of the adjustment signal component 102 included in the output signal of the second inverse spread processor 112. Consequently, the inversely spread transfer signal component 113 can be easily extracted by the transmission level controller 29.

In this embodiment, unlike in the ninth embodiment, the transmission level controller 29 performs adjustment so that $G_1G_5-G_2G_6=0$ by measuring the level of the signal transferred from the single-phase converter 28.

Also, with this embodiment, the first inverse spread processor 111 and the second inverse spread processor 112 are provided between the single-phase converter 28 and the transmission level controller 29, but the configuration may instead be such that just the first inverse spread processor 111 and/or the second inverse spread processor 112 is provided inside the transmission level controller 29.

In the illustrated embodiment, with the signal transfer device 1 mentioned above, the adjustment signals are spread signals.

In the illustrated embodiment, with the signal transfer device 1 mentioned above, the adjustment signals are spread signals. The detector shown in FIG. 29 further has the first and second inverse spread processors 111 and 112 (e.g., inverse spread processor). The first and second inverse spread processors 111 and 112 are configured to inversely spread the differential combination signal of the single-phase converter 28 (e.g., differential combiner).

In the illustrated embodiment, with the signal transfer device 1 mentioned above, the adjustment signals are spread signals that are spread with the first spread code. The detector shown in FIG. 29 further has a splitter (black dot on the signal line between the single-phase converter 28 and the first and second inverse spread processors 111 and 112), and the first inverse spread processor 111. The splitter is configured to split the differential combination signal of the single-phase converter 28. The first inverse spread processor 111 is configured to inversely spread one output of the splitter using the first spread code.

In the illustrated embodiment, with the signal transfer device 1 mentioned above, the first and second transfer signals S(+) and S(−) transferred to the first and second transfer paths 31 and 32 based on the single-phase input signal Sin are spread signals that are spread with the second spread code. The detector shown in FIG. 29 further has the second inverse spread processor 112. The second inverse spread processor 112 is configured to inversely spread the other output of the splitter using the second spread code. In the illustrated embodiment, the first spread code and the second spread code can be the same spread code or different spread code, as needed and/or desired.

Eleventh Embodiment

Figure 33:
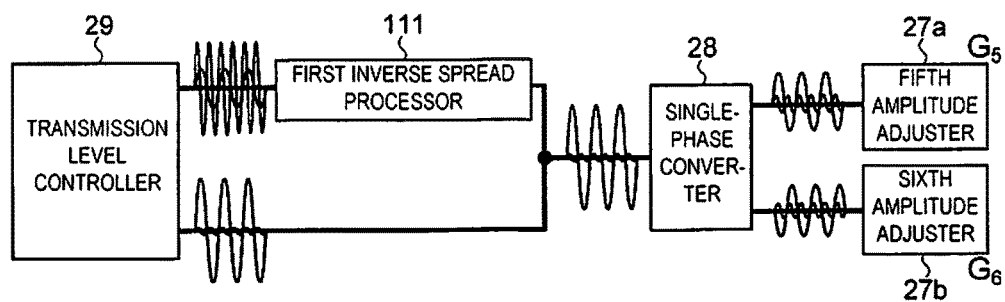
FIG. 33 is a conceptual partial configuration diagram showing an example of the signal transfer device pertaining to an eleventh embodiment.
Figure 34:
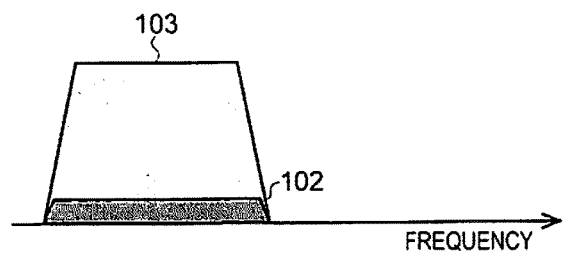
FIG. 34 is a graph of the output signal of the single-phase converter in the eleventh embodiment.

As shown in FIG. 33, the configuration of the signal transfer device 1 pertaining to the eleventh embodiment is one in which the second inverse spread processor 112 is omitted from the signal transfer device 1 pertaining to the tenth embodiment. In FIG. 33, those components that are the same as or similar to those in FIG. 29 are numbered the same and will not be described in detail. Therefore, again in this embodiment, just as in the tenth embodiment, as shown in FIG. 34, the frequency bands are the same for the adjustment signal component 102 and the transfer signal component 103 included in the output signal of the single-phase converter 28, and the adjustment signal and the transfer signal are signals that have undergone spread modulation with different spread codes.

Figure 35:
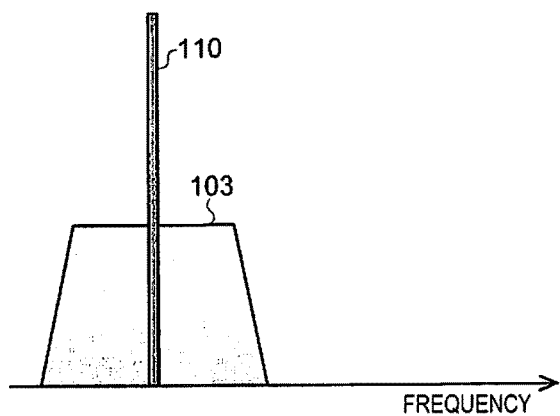
FIG. 35 is a graph of the output signal of the first inverse spread processor in the eleventh embodiment.
Figure 36:
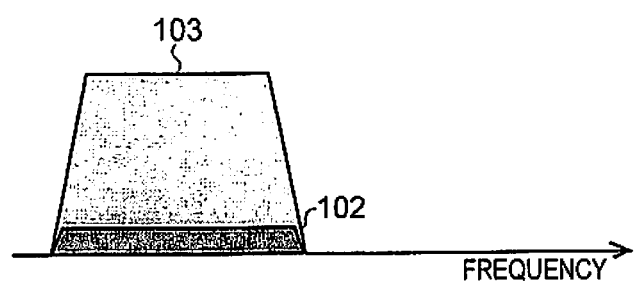
FIG. 36 is a graph of the signal transferred from the single-phase converter to a transmission level controller, without going through a filter, in the eleventh embodiment.

The first inverse spread processor 111 performs inverse spread processing using the spread code of the adjustment signal. Accordingly, as shown in FIG. 35, the level of the inversely spread adjustment signal component 110 included in the output signal of the first inverse spread processor 111 is sufficiently higher than the level of the transfer signal component 103 included in the output signal of the first inverse spread processor 111. Consequently, the inversely spread adjustment signal component 110 can be easily extracted by the transmission level controller 29.

To maintain good signal quality of the transfer signal after demodulation by the demodulator 47, the adjustment signal is kept at a level that is usually sufficiently lower than that of the transfer signal. Accordingly, even if the second inverse spread processor 112 is omitted, the transmission level controller 29 in this embodiment can perform the same control as in the tenth embodiment.

In this embodiment, just as in the tenth embodiment, the transmission level controller 29 performs adjustment so that $G_1G_5-G_2G_6=0$ by measuring the level of the signal transferred from the single-phase converter 28.

Also, in this embodiment, the first inverse spread processor 111 is provided between the single-phase converter 28 and the transmission level controller 29, but the configuration may instead be one in which the first inverse spread processor 111 is provided inside the transmission level controller 29. Furthermore, in this embodiment, it does not matter whether or not the transfer signal has undergone spread modulation.

Twelfth Embodiment

Figure 37:
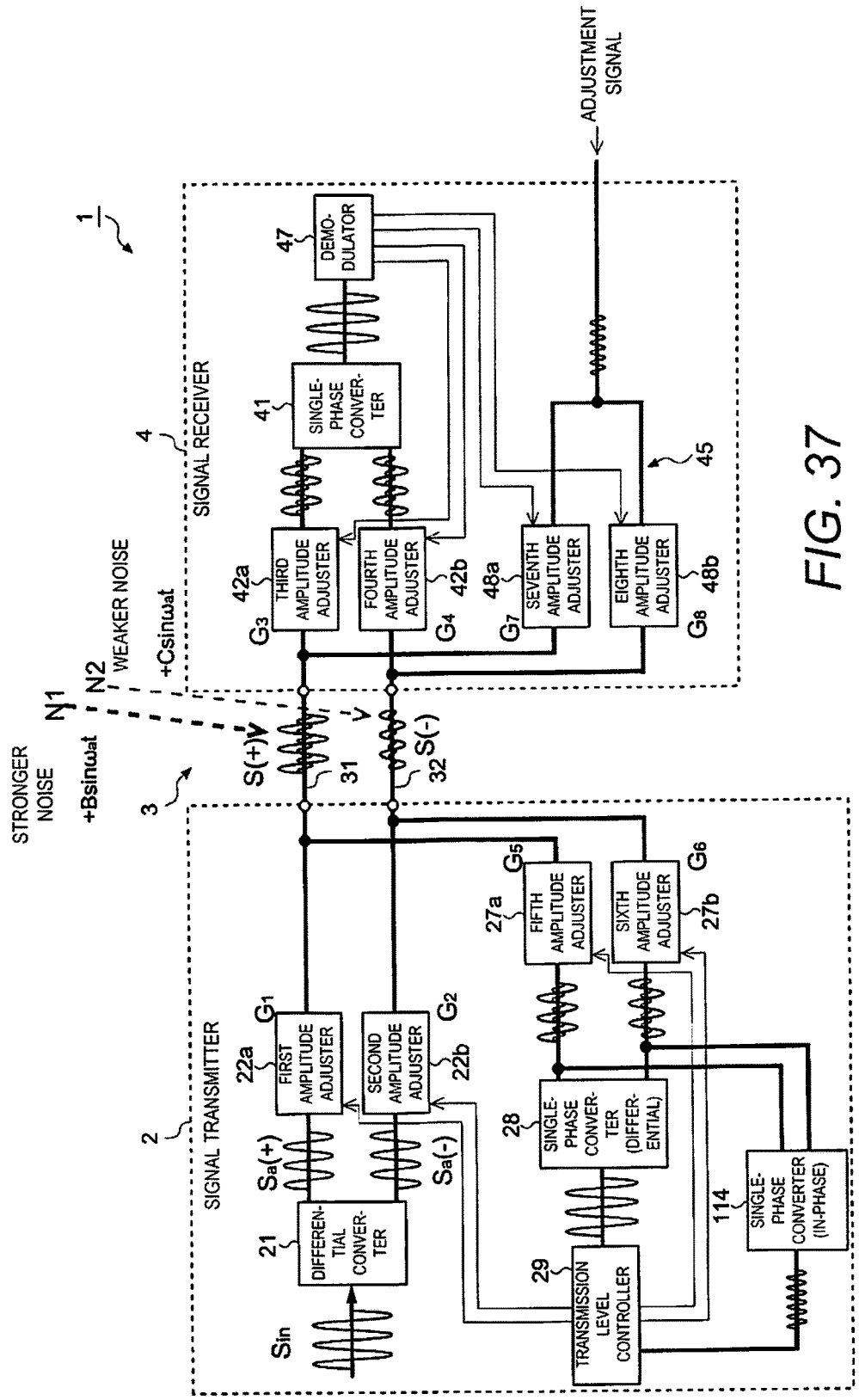
FIG. 37 is a conceptual configuration diagram showing an example of the signal transfer device pertaining to a twelfth embodiment.

As shown in FIG. 37, the configuration of the signal transfer device 1 pertaining to the twelfth embodiment is one in which a single-phase converter 114 is added to the signal transfer device 1 pertaining to the fifth embodiment. Thus, in FIG. 37, those components that are the same as or similar to those in FIG. 14 are numbered the same and will not be described in detail. As shown in FIG. 37, the single-phase converter 28 is a single-phase converter that subjects an input signal to differential combination, whereas the single-phase converter 114 is a single-phase converter that subjects an input signal to in-phase combination.

With the signal transfer device 1 pertaining to the fifth embodiment, complicated control is required in which the fifth and sixth gains $G_5$ and $G_6$ are controlled so that the adjustment signal will be cancelled out to zero based on the signal that has passed through the single-phase converter 28, whereas the first and second gains $G_1$ and $G_2$ are simultaneously controlled so that the transfer signal will be at its minimum. By contrast, with the signal transfer device 1 pertaining to this embodiment, since the single-phase converter 114 that performs in-phase combination is added, the transfer signal and the adjustment signal can be controlled independently.

Control is possible in the following two ways with the signal transfer device 1 pertaining to this embodiment. The following two ways of control can be performed by fixing on one, but can also be performed while switching, or by weighting the values obtained with the two controls for each gain.

(1) The fifth and sixth gains $G_5$ and $G_6$ and the first and second gains $G_1$ and $G_2$ are controlled so that the adjustment signal that has passed through the single-phase converter 28 and the transfer signal that has passed through the single-phase converter 114 each drop to zero.

(2) The balance of the fifth and sixth gains $G_5$ and $G_6$ and the first and second gains $G_1$ and $G_2$ is controlled so that the transfer signal that has passed through the single-phase converter 28 and the adjustment signal that has passed through the single-phase converter 114 each drop to their minimum.

In this embodiment, any of the sixth to eleventh embodiments (including the modification examples described in the various embodiments) may be employed as the configuration between the single-phase converter 28 and the transmission level controller 29.

In the illustrated embodiment, with the signal transfer device 1 mentioned above, the fifth and sixth amplitude adjusters 27a and 27b, the single-phase converter 28, the single-phase converter 114, and the transmission level controller 29 (e.g., detector) are configured to detect the adjustment signals that are transferred to the first and second transfer paths 31 and 32.

In the illustrated embodiment, with the signal transfer device 1 mentioned above, the adjustment signals are spread signals.

In the illustrated embodiment, with the signal transfer device 1 mentioned above, the detector has the single-phase converter 28 (e.g., differential combiner). The single-phase converter 28 is configured to perform differential combination on amplified signals of the first and second transfer signals S(+) and S(−) transferred to the first and second transfer paths 31 and 32.

In the illustrated embodiment, with the signal transfer device 1 mentioned above, the detector has the single-phase converter 114 (in-phase combiner). The single-phase converter 114 is configured to perform in-phase combination on the amplified signals of the the first and second transfer signals S(+) and S(−) transferred to the first and second transfer paths 31 and 32.

Thirteenth Embodiment

Figure 38:
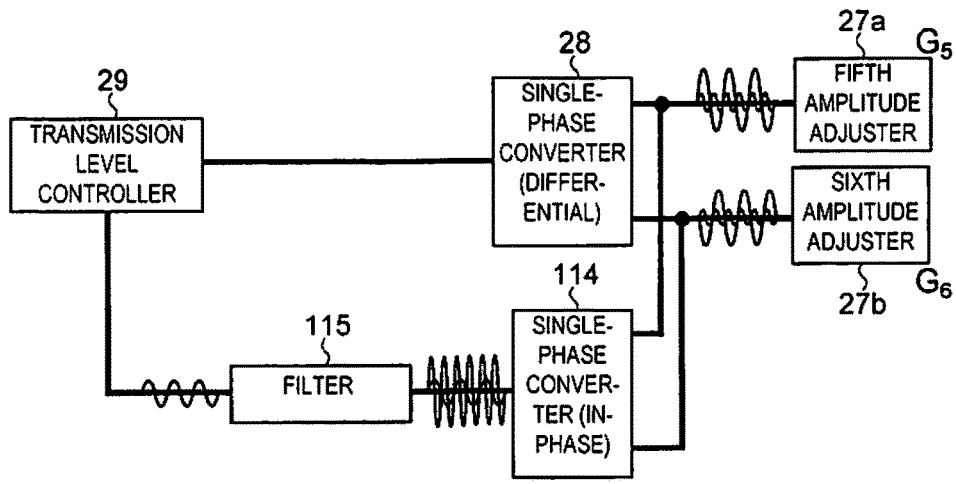
FIG. 38 is a conceptual partial configuration diagram showing an example of the signal transfer device pertaining to a thirteenth embodiment.

The configuration of the signal transfer device 1 pertaining to the thirteenth embodiment is one in which a filter 115 is provided between the single-phase converter 114 and the transmission level controller 29, as shown in FIG. 38, in the signal transfer device 1 pertaining to the twelfth embodiment. Thus, in FIG. 38, those components that are the same as or similar to those in FIG. 37 are numbered the same and will not be described in detail. A low-pass filter or a band-pass filter can be used, for example, as the filter 115.

Figure 39:
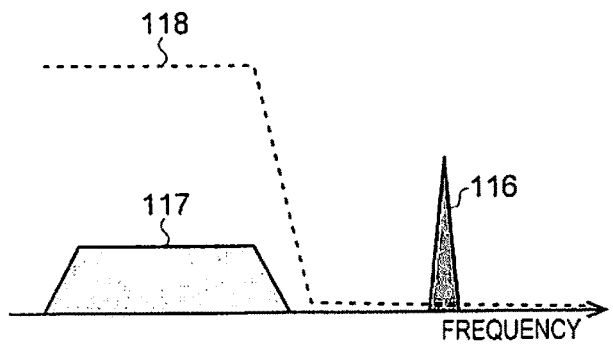
FIG. 39 is a graph of the pass characteristics of a filter and the output signal of a single-phase converter (in-phase) in the thirteenth embodiment.
Figure 40:
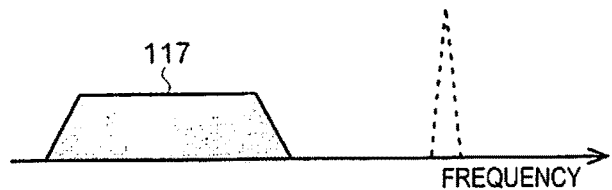
FIG. 40 is a graph of the output signal of the filter in the thirteenth embodiment.

As shown in FIG. 39, in this embodiment, the frequency bands are different for an adjustment signal component 116 and a transfer signal component 117 included in the output signal of the single-phase converter 114, and the transmission characteristics 118 of the filter 115 allow the transfer signal component 117 to pass, but remove the adjustment signal component 116. Therefore, the signal transferred from the filter 115 to the transmission level controller 29 has its adjustment signal component removed as shown in FIG. 40, and becomes a signal from which the transfer signal component 117 has been extracted.

In this embodiment, the filter 115 is provided between the single-phase converter 114 and the transmission level controller 29, but the configuration may instead be one in which the filter 115 is provided inside the single-phase converter 114, or one in which the filter 115 is provided inside the transmission level controller 29.

Also, with this embodiment, the adjustment signal component 116 is removed by the filter 115 and the transfer signal component 117 is extracted, but the pass characteristics 118 of the filter 115 may be such that the transfer signal component 117 is removed and the adjustment signal component 116 is allowed to pass, so that the transfer signal component 117 is removed and the adjustment signal component 116 is extracted. In this case, a high-pass filter or a band-pass filter can be used, for example, as the filter 115.

The drawings illustrating this embodiment illustrate a case in which the frequency of the adjustment signal is higher than the frequency of the transfer signal, but the frequency of the adjustment signal may instead be lower than the frequency of the transfer signal. In this case, the transfer signal component 117 can be removed and the adjustment signal component 116 extracted by using a low-pass filter or a band-pass filter, for example, as the filter 115, or the adjustment signal component 116 can be removed and the transfer signal component 117 extracted by using a high-pass filter or a band-pass filter, for example, as the filter 115.

In the illustrated embodiment, with the signal transfer device 1 mentioned above, the detector shown in FIG. 38 further has the filter 115 (e.g., in-phase combination-side extractor). The filter 115 is configured to extract either the transfer signal component 117 (e.g., signal component) of the of the first and second transfer signals S(+) and S(−) transferred to the first and second transfer paths 31 and 32 based on the single-phase input signal Sin or the adjustment signal component 116 from the in-phase combination signal of the single-phase converter 114 (e.g., in-phase combiner).

Also, in this embodiment, any of the sixth to eleventh embodiments (including the modification examples described in the various embodiments) may be employed as the configuration between the single-phase converter 28 and the transmission level controller 29.

For example, with the signal transfer device 1 mentioned above, the detector shown in FIG. 38 can further have the filter 101 (e.g., extractor) shown in FIG. 15. The filter 101 is configured to extract the adjustment signal component 102 shown in FIG. 16 from the differential combination signal of the single-phase converter 28 (e.g., differential combiner).

Fourteenth Embodiment

Figure 41:
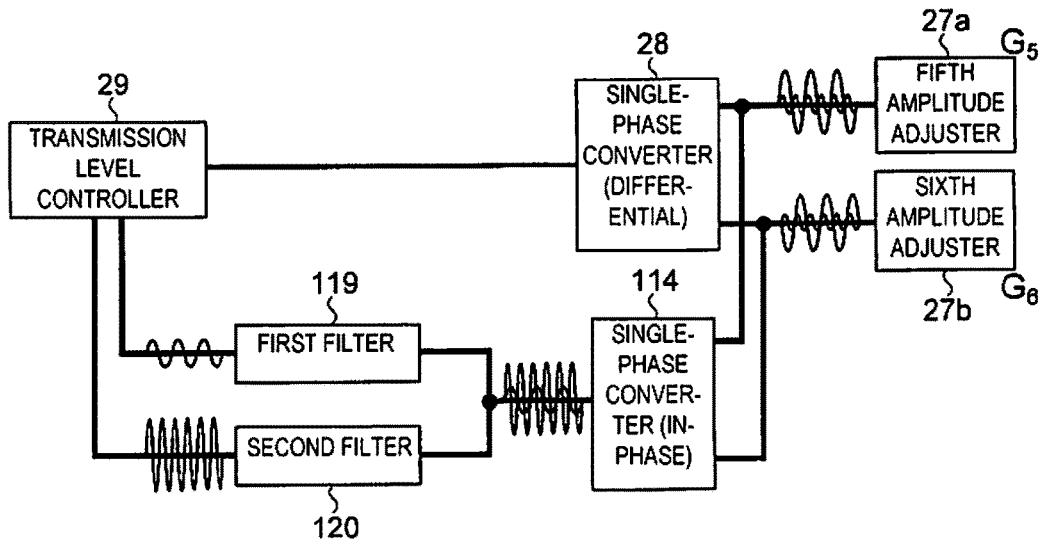
FIG. 41 is a conceptual partial configuration diagram showing an example of the signal transfer device pertaining to a fourteenth embodiment.

With the configuration of the signal transfer device 1 pertaining to the fourteenth embodiment, the transfer path between the single-phase converter 114 and the transmission level controller 29 is split in two as shown in FIG. 41 in the signal transfer device 1 pertaining to the twelfth embodiment. Thus, in FIG. 41, those components that are the same as or similar to those in FIG. 37 are numbered the same and will not be described in detail. In the illustrated embodiment, a first filter 119 is provided to one path and a second filter 120 is provided to the other. A low-pass filter or a band-pass filter can be used, for example, as the first filter 119, and a high-pass filter or a band-pass filter can be used, for example, as the second filter 120.

Figure 42:
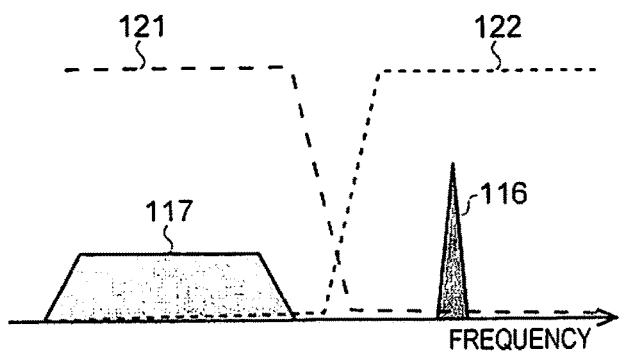
FIG. 42 is a graph of the pass characteristics of first and second filters and the output signal of a single-phase converter (in-phase) in the fourteenth embodiment.
Figure 43:
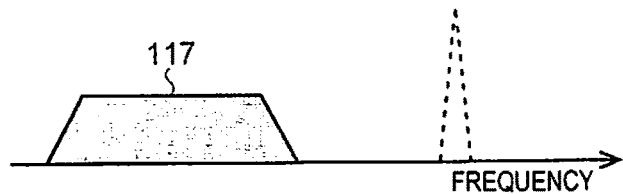
FIG. 43 is a graph of the output signal of the first filter in the fourteenth embodiment.
Figure 44:
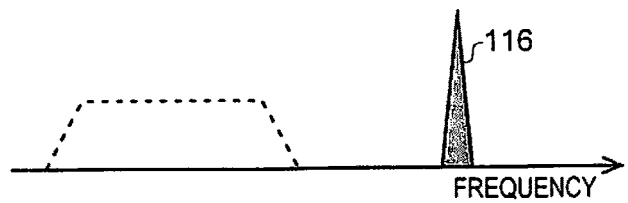
FIG. 44 is a graph of the output signal of the second filter in the fourteenth embodiment.

With this embodiment, as shown in FIG. 42, the frequency bands are different for the adjustment signal component 116 and the transfer signal component 117 included in the output signal of the single-phase converter 114. Also, as shown in FIG. 42, the transmission characteristics 121 of the first filter 119 allow the transfer signal component 117 to pass, but remove the adjustment signal component 116. Therefore, the signal transferred from the first filter 119 to the transmission level controller 29 has its adjustment signal component removed as shown in FIG. 43, and becomes a signal from which the transfer signal component 117 has been extracted. Furthermore, as shown in FIG. 42, the transmission characteristics 122 of the second filter 120 remove the transfer signal component 117, and allow the adjustment signal component 116 to pass. Therefore, a signal transferred from the second filter 120 to the transmission level controller 29 has its transfer signal component 117 removed as shown in FIG. 44, and becomes a signal from which the adjustment signal component 116 has been extracted.

Also, with this embodiment, the first filter 119 and the second filter 120 are provided between the single-phase converter 114 and the transmission level controller 29, but the configuration may instead be such that just the first filter 119 and/or the second filter 120 is provided inside the transmission level controller 29.

Also, the drawings illustrating this embodiment illustrate a case in which the frequency of the adjustment signal is higher than the frequency of the transfer signal, but the frequency of the adjustment signal may instead be lower than the frequency of the transfer signal. In this case, the adjustment signal component 116 can be removed and the transfer signal component 117 extracted by using a high-pass filter or a band-pass filter, for example, as the filter 119, and the transfer signal component 117 can be removed and the adjustment signal component 116 extracted by using a low-pass filter or a band-pass filter, for example, as the filter 120.

In the illustrated embodiment, with the signal transfer device 1 mentioned above, the detector shown in FIG. 41 further has the first and second filters 119 and 120 (e.g., in-phase combination-side extractor). The first and second filters 119 and 120 are configured to extract either the transfer signal component 117 of the first and second transfer signals S(+) and S(−) transferred to the first and second transfer paths 31 and 32 based on the single-phase input signal Sin or the adjustment signal component 116 from the in-phase combination signal of the single-phase converter 114 (e.g., in-phase combiner).

In the illustrated embodiment, with the signal transfer device 1 mentioned above, the detector shown in FIG. 41 further has the in-phase combination-side splitter (black dot on the signal line between the single-phase converter 114 and the first and second filters 119 and 120), and the first filter 119 (e.g., first in-phase combination-side extractor). The in-phase combination-side splitter is configured to split in-phase combination signal of the single-phase converter 114. The first filter 119 is configured to extract one of the transfer signal component 117 of the first and second transfer signals S(+) and S(−) transferred to the first and second transfer paths 31 and 32 based on the single-phase input signal Sin and the adjustment signal component 116 from one output of the in-phase combination-side splitter.

In the illustrated embodiment, with the signal transfer device 1 mentioned above, the detector shown in FIG. 41 further has the second filter 120 (e.g., second in-phase combination-side extractor). The second filter 120 is configured to extract the other one of the transfer signal component 117 of the first and second transfer signals S(+) and S(−) transferred to the first and second transfer paths 31 and 32 based on the single-phase input signal Sin and the adjustment signal component 116 from the other output of the in-phase combination-side splitter.

In this embodiment, any of the sixth to eleventh embodiments (including the modification examples described in the various embodiments) may be employed as the configuration between the single-phase converter 28 and the transmission level controller 29.

For example, with the signal transfer device 1 mentioned above, the detector shown in FIG. 41 can further have the filter 101 (e.g., extractor) shown in FIG. 15. The filter 101 is configured to extract the adjustment signal component 102 from the differential combination signal of the single-phase converter 28 (e.g., differential combiner).

Also, for example, with the signal transfer device 1 mentioned above, the detector shown in FIG. 41 can further have a splitter (black dot on the signal line between the single-phase converter 28 and the first and second filters 105 and 106) and the first filter 105 (e.g., first extractor), as shown in FIG. 18. The splitter is configured to split the differential combination signal of the single-phase converter 28. The first filter 105 is configured to extract the adjustment signal component 102 from one output of the splitter.

Also, for example, with the signal transfer device 1 mentioned above, the detector shown in FIG. 41 can further have the second filter 106 (e.g., second extractor) shown in FIG. 18. The second filter 106 is configured to extract the transfer signal component (e.g., signal component) of the first and second transfer signals S(+) and S(−) transferred to the first and second transfer paths 31 and 32 based on the single-phase input signal Sin from the other output of the splitter.

Fifteenth Embodiment

Figure 45:
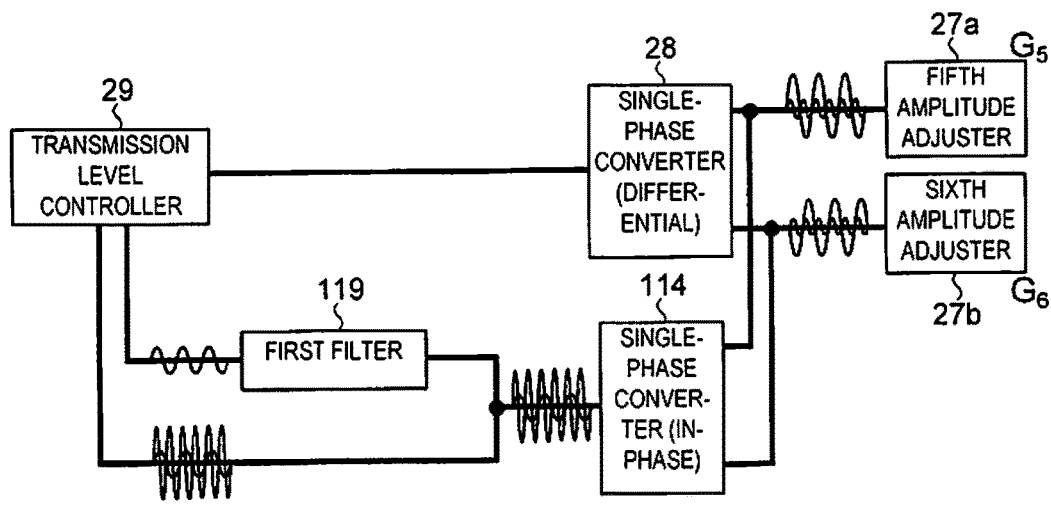
FIG. 45 is a conceptual partial configuration diagram showing an example of the signal transfer device pertaining to a fifteenth embodiment.
Figure 46:
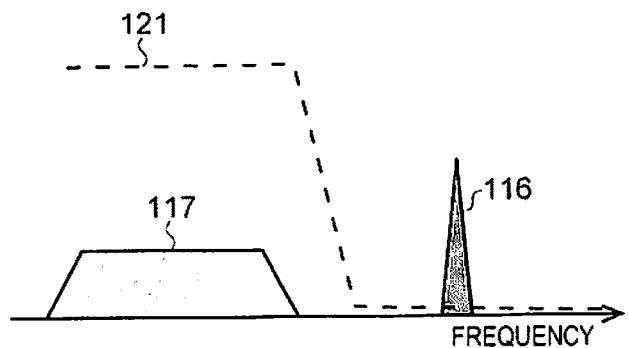
FIG. 46 is a graph of the pass characteristics of a first filter and the output signal of a single-phase converter (in-phase) in the fifteenth embodiment.
Figure 47:
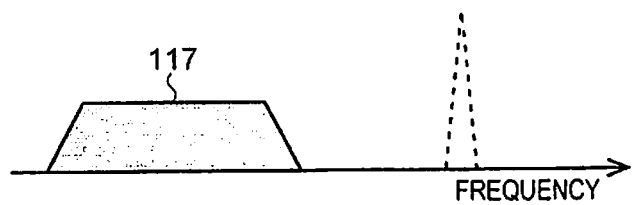
FIG. 47 is a graph of the output signal of the first filter in the fifteenth embodiment.
Figure 48:
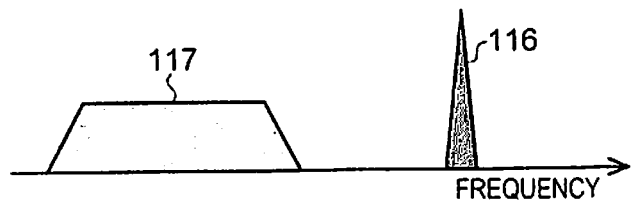
FIG. 48 is a graph of the signal transferred from the single-phase converter (in-phase) to a transmission level controller, without going through a filter, in the fifteenth embodiment.

As shown in FIG. 45, the configuration of the signal transfer device 1 pertaining to the fifteenth embodiment is one in which the second filter 120 is omitted from the signal transfer device 1 pertaining to the fourteenth embodiment. In FIG. 45, those components that are the same as or similar to those in FIG. 41 are numbered the same and will not be described in detail. Therefore, again in this embodiment, just as in the fourteenth embodiment, the frequency bands are different for the adjustment signal component 116 and the transfer signal component 117 included in the output signal of the single-phase converter 114, as shown in FIG. 46. Also, as shown in FIG. 46, the transmission characteristics 121 of the first filter 119 allow the transfer signal component 117 to pass, but remove the adjustment signal component 116. Therefore, the signal transferred from the first filter 119 to the transmission level controller 29 has its adjustment signal component removed as shown in FIG. 47, and becomes a signal from which the transfer signal component 117 has been extracted. The signal transferred from the single-phase converter 114 to the transmission level controller 29 without going through a filter includes the adjustment signal component 116 and the transfer signal component 117, as shown in FIG. 48.

To maintain good signal quality of the transfer signal after demodulation by the demodulator 47, the adjustment signal is kept at a level that is usually lower than that of the transfer signal, but as long as the transfer signal component included in the output signal of the single-phase converter 114 is kept by in-phase combination at the single-phase converter 114 to a level that is usually sufficiently lower than that of the adjustment signal component included in the output signal of the single-phase converter 114, then even if the second filter 120 is omitted, the transmission level controller 29 of this embodiment will still be able to perform the same control as in the fourteenth embodiment.

Similarly, with a signal that has undergone in-phase combination at the single-phase converter 114, if the adjustment signal is outputted at a level sufficiently lower than that of the transfer signal, then the transmission level controller 29 in this embodiment can perform the same control as in the fourteenth embodiment even if the filter 119 is omitted instead of the filter 120.

When the second filter 120 is omitted in this embodiment, the first filter 119 is provided between the single-phase converter 114 and the transmission level controller 29, but the configuration may be such that the first filter 119 is provided inside the transmission level controller 29.

Also, when the first filter 119 is omitted in this embodiment, the second filter 120 is provided between the single-phase converter 114 and the transmission level controller 29, but the configuration may be such that the second filter 120 is provided inside the transmission level controller 29.

Also, the drawings illustrating this embodiment illustrate a case in which the frequency of the adjustment signal is higher than the frequency of the transfer signal, but the frequency of the adjustment signal may instead be lower than the frequency of the transfer signal, just as the fourteenth embodiment.

In this embodiment, any of the sixth to eleventh embodiments (including the modification examples described in the various embodiments) may be employed as the configuration between the single-phase converter 28 and the transmission level controller 29.

Sixteenth Embodiment

Figure 49:
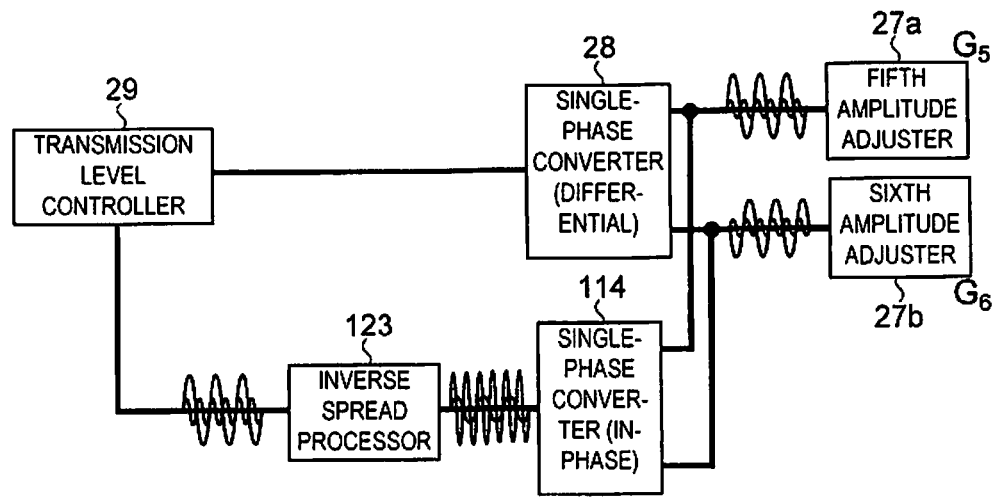
FIG. 49 is a conceptual partial configuration diagram showing an example of the signal transfer device pertaining to a sixteenth embodiment.

The configuration of the signal transfer device 1 pertaining to the sixteenth embodiment is one in which an inverse spread processor 123 is provided between the single-phase converter 114 and the transmission level controller 29 as shown in FIG. 49, in the signal transfer device 1 pertaining to the twelfth embodiment. Thus, in FIG. 49, those components that are the same as or similar to those in FIG. 37 are numbered the same and will not be described in detail.

Figure 50:
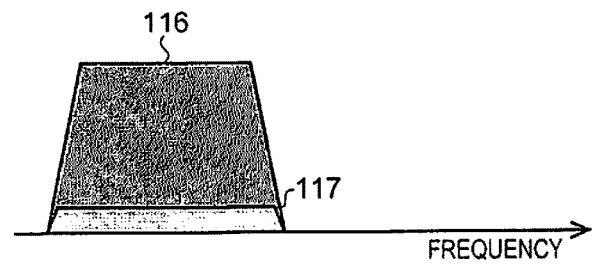
FIG. 50 is a graph of the output signal of the single-phase converter (in-phase) in the sixteenth embodiment.
Figure 51:
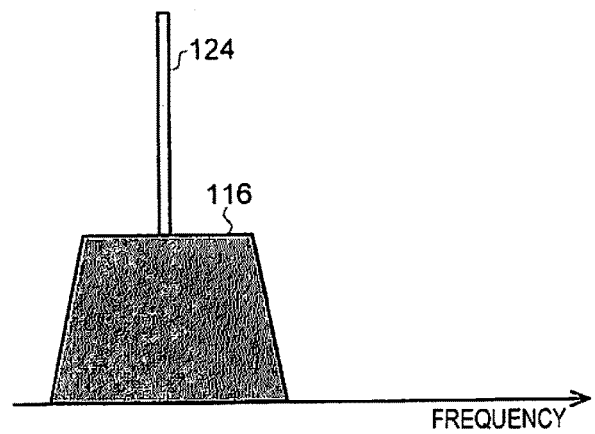
FIG. 51 is a graph of the output signal of the inverse spread processor in the sixteenth embodiment.

In this embodiment, as shown in FIG. 50, the frequency bands are the same for the adjustment signal component 116 and the transfer signal component 117 included in the output signal of the single-phase converter 114, and inverse modulation is performed in advance on the transfer signal. Accordingly, as shown in FIG. 51, the level of an inversely spread transfer signal component 124 included in the output signal of the inverse spread processor 123 is sufficiently higher than the level of the adjustment signal component 116 included in the output signal of the inverse spread processor 123. Consequently, the inversely spread transfer signal component 124 can be easily extracted by the transmission level controller 29.

Here, if we assume that the adjustment signal is also a signal that has been inversely modulated, the adjustment signal and the transfer signal may be signals that have undergone spread modulation with different spread codes, and the inverse spread processor 123 may perform the inverse spread processing using the spread code of the transfer signal.

With this embodiment, the inverse spread processor 123 is provided between the single-phase converter 114 and the transmission level controller 29, but the configuration may be one in which the inverse spread processor 123 is provided inside the single-phase converter 114, or one in which the inverse spread processor 123 is provided inside the transmission level controller 29.

Also, with this embodiment, the inverse spread processor 123 extracted the transfer signal component 117 that had already undergone spread modulation, but conversely the inverse spread processor 123 may extract the adjustment signal component 116 that has already undergone spread modulation.

In the illustrated embodiment, with the signal transfer device 1 mentioned above, either the first and second transfer signals S(+) and S(−)(e.g., signals) transferred to the first and second transfer paths 31 and 32 based on the single-phase input signal Sin or the adjustment signals are spread signals. The detector shown in FIG. 49 further has the inverse spread processor 123 (e.g., in-phase combination-side inverse spread processor). The inverse spread processor 123 is configured to inversely spread the in-phase combination signal of the single-phase converter 114 (e.g., in-phase combiner).

Also, in this embodiment, any of the sixth to eleventh embodiments (including the modification examples described in the various embodiments) may be employed as the configuration between the single-phase converter 28 and the transmission level controller 29.

For example, with the signal transfer device 1 mentioned above, the adjustment signals can be spread signals. The detector shown in FIG. 49 can further have the inverse spread processor 109 shown in FIG. 26. The inverse spread processor 109 is configured to inversely spread the differential combination signal of the single-phase converter 28 (e.g., differential combiner).

Seventeenth Embodiment

Figure 52:
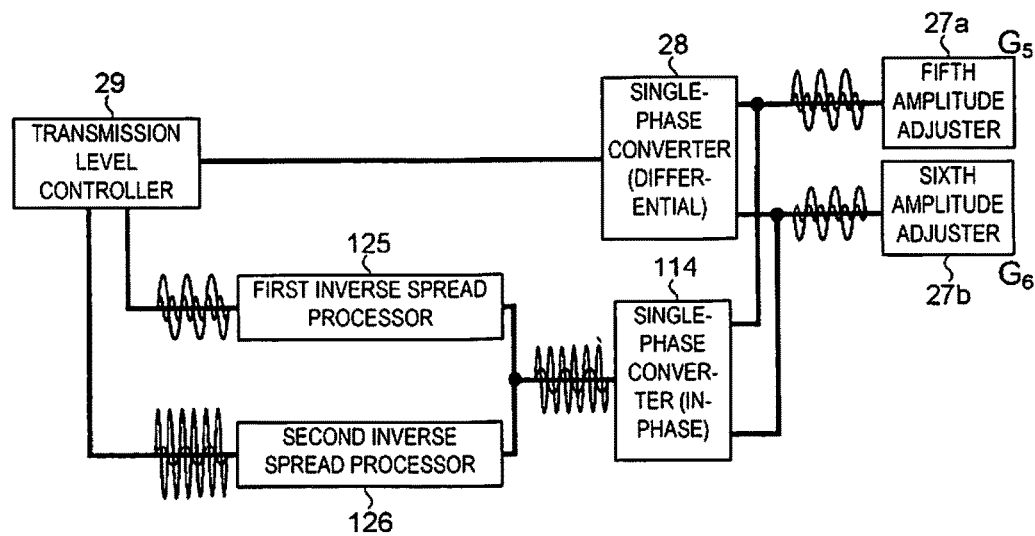
FIG. 52 is a conceptual partial configuration diagram showing an example of the signal transfer device pertaining to a seventeenth embodiment.

The configuration of the signal transfer device 1 pertaining to the seventeenth embodiment is one in which the transfer path between the single-phase converter 114 and the transmission level controller 29 is split in two as shown in FIG. 52 in the signal transfer device 1 pertaining to the twelfth embodiment. Thus, in FIG. 52, those components that are the same as or similar to those in FIG. 37 are numbered the same and will not be described in detail. In the illustrated embodiment, a first inverse spread processor 125 is provided to one path, and a second inverse spread processor 126 is provided to the other.

Figure 53:
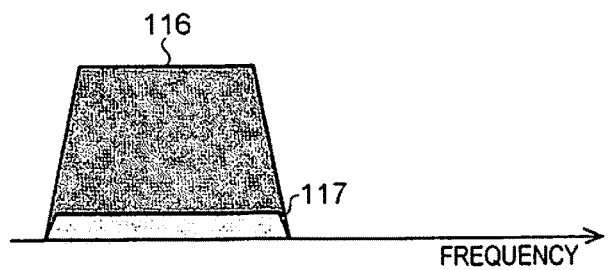
FIG. 53 is a graph of the output signal of the single-phase converter (in-phase) in the seventeenth embodiment.
Figure 54:
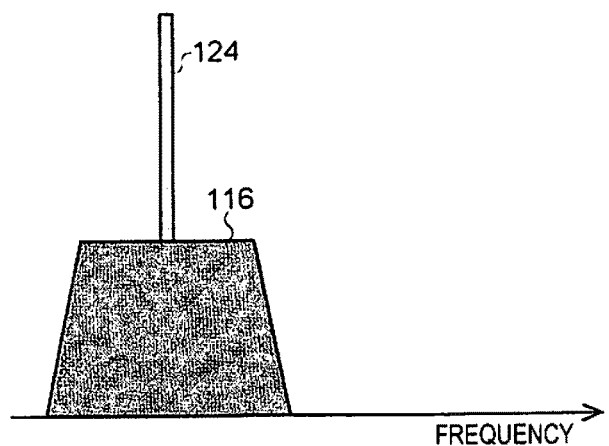
FIG. 54 is a graph of the output signal of the first inverse spread processor in the seventeenth embodiment.

With this embodiment, as shown in FIG. 53, the frequency bands are the same for the adjustment signal component 116 and the transfer signal component 117 included in the output signal of the single-phase converter 114, and the adjustment signal and the transfer signal are signals that have been inversely spread with different spread codes (e.g., third and fourth spread codes).

The first inverse spread processor 125 performs inverse spread processing using the spread code (e.g., third spread code) of the transfer signal. Accordingly, as shown in FIG.

54, the level of the inversely spread transfer signal component 124 included in the output signal of the first inverse spread processor 125 is sufficiently higher than the level of the adjustment signal component 116 included in the output signal of the first inverse spread processor 125. Consequently, the inversely spread transfer signal component 124 can be easily extracted by the transmission level controller 29.

Figure 55:
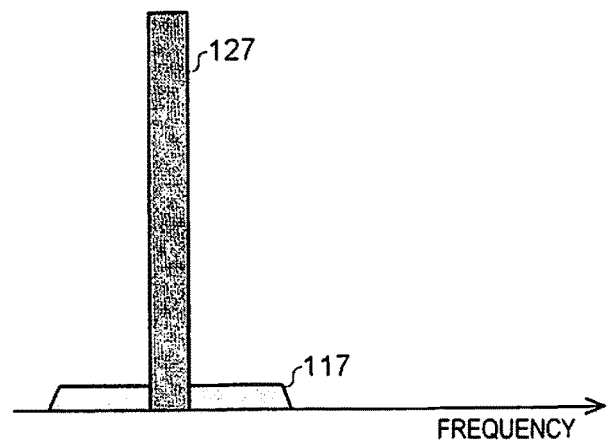
FIG. 55 is a graph of the output signal of the second inverse spread processor in the seventeenth embodiment.

Meanwhile, the second inverse spread processor 126 performs inverse spread processing using the spread code (e.g., fourth spread code) of the adjustment signal. Accordingly, as shown in FIG. 55, the level of the inversely spread adjustment signal component 127 included in the output signal of the second inverse spread processor 126 is sufficiently higher than the level of the transfer signal component 117 included in the output signal of the second inverse spread processor 126. Consequently, the inversely spread adjustment signal component 127 can be easily extracted by the transmission level controller 29.

Also, with this embodiment, the first inverse spread processor 125 and the second inverse spread processor 126 are provided between the single-phase converter 114 and the transmission level controller 29, but the configuration may instead be such that just the first inverse spread processor 125 and/or the second inverse spread processor 126 is provided inside the transmission level controller 29.

In the illustrated embodiment, with the signal transfer device 1 mentioned above, either the first and second transfer signals S(+) and S(−)(e.g., signals) transferred to the first and second transfer paths 31 and 32 based on the single-phase input signal Sin or the adjustment signals are spread signals. The detector shown in FIG. 52 further has the first and second inverse spread processors 125 and 126 (e.g., in-phase combination-side inverse spread processor). The first and second inverse spread processors 125 and 126 are configured to inversely spread the in-phase combination signal of the single-phase converter 114 (e.g., in-phase combiner).

In the illustrated embodiment, with the signal transfer device 1 mentioned above, one of the first and second transfer signals S(+) and S(−)(e.g., signals) transferred to the first and second transfer paths 31 and 32 based on the single-phase input signal Sin and the adjustment signals are spread signals that are spread with the third spread code. The detector shown in FIG. 52 further has the in-phase combination-side splitter (black dot on the signal line between the single-phase converter 114 and the first and second inverse spread processors 125 and 126) and the first inverse spread processor 125 (e.g., in-phase combination-side inverse spread processor). The in-phase combination-side splitter is configured to split the in-phase combination signal of the single-phase converter 114. The first inverse spread processor 125 is configured to inversely spread one output of the in-phase combination-side splitter using the third spread code.

In the illustrated embodiment, with the signal transfer device 1 mentioned above, the other one of the first and second transfer signals S(+) and S(−)(e.g., signals) transferred to the first and second transfer paths 31 and 32 based on the single-phase input signal Sin and the adjustment signals are spread signals that are spread with the fourth spread code. The detector shown in FIG. 52 further has the second inverse spread processor 126 (e.g., second in-phase combination-side inverse spread processor). The second inverse spread processor 126 is configured to inversely spread the other output of the in-phase combination-side splitter using the fourth spread code.

In this embodiment, any of the sixth to eleventh embodiments (including the modification examples described in the various embodiments) may be employed as the configuration between the single-phase converter 28 and the transmission level controller 29.

For example, with the signal transfer device 1 mentioned above, the adjustment signals can be spread signals. The detector shown in FIG. 52 can further have the inverse spread processor 109 shown in FIG. 26. The inverse spread processor 109 is configured to inversely spread the differential combination signal of the shingle-phase converter 28 (e.g., differential combiner).

Also, for example, with the signal transfer device 1 mentioned above, the adjustment signals can be spread signals that are spread with the first spread code. The detector shown in FIG. 52 can further have a splitter (black dot on the signal line between the single-phase converter 28 and the first and second inverse spread processors 111 and 112), and the first inverse spread processor 111, as shown in FIG. 29. The splitter is configured to split the differential combination signal of the single-phase converter 28. The first inverse spread processor 111 is configured to inversely spread one output of the splitter using the first spread code.

Also, for example, with the signal transfer device 1 mentioned above, the first and second transfer signals S(+) and S(−) transferred to the first and second transfer paths 31 and 32 based on the single-phase input signal Sin are spread signals that are spread with the second spread code. The detector shown in FIG. 52 further has the second inverse spread processor 112 shown in FIG. 29. The second inverse spread processor 112 is configured to inversely spread the other output of the splitter using the second spread code. In the illustrated embodiment, the first spread code and the second spread code can be the same spread code or different spread code, as needed and/or desired.

Eighteenth Embodiment

Figure 56:
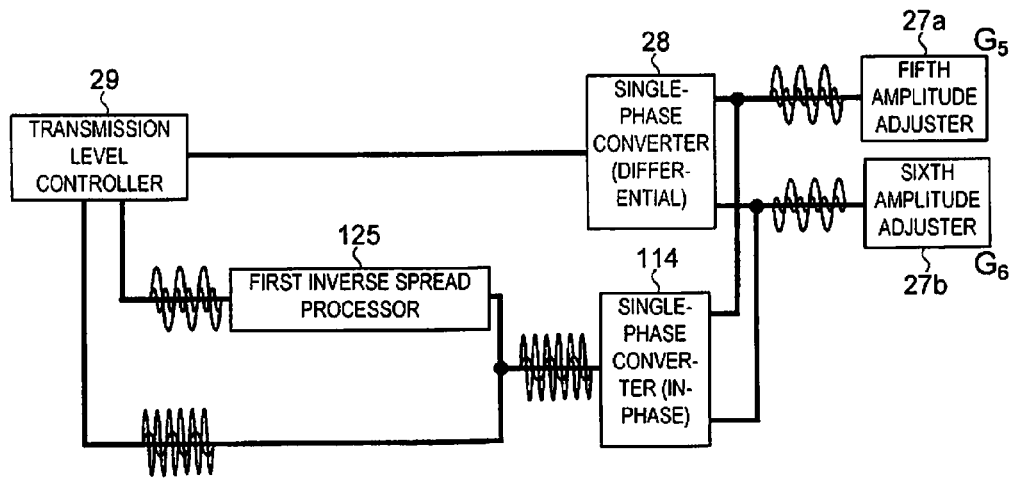
FIG. 56 is a conceptual partial configuration diagram showing an example of the signal transfer device pertaining to a eighteenth embodiment.
Figure 57:
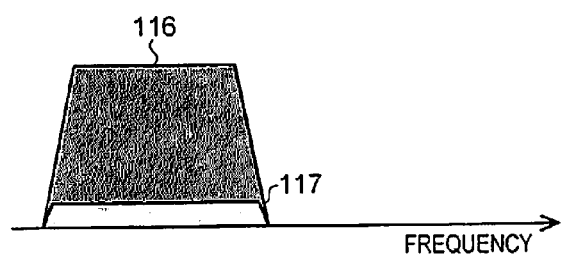
FIG. 57 is a graph of the output signal of the single-phase converter (in-phase) in the eighteenth embodiment.

As shown in FIG. 56, the configuration of the signal transfer device 1 pertaining to the eighteenth embodiment is one in which the second inverse spread processor 126 is omitted from the signal transfer device 1 pertaining to the seventeenth embodiment. Thus, in FIG. 56, those components that are the same as or similar to those in FIG. 52 are numbered the same and will not be described in detail. Therefore, again in this embodiment, just as in the eleventh embodiment, the frequency bands are the same for the adjustment signal component 116 and the transfer signal component 117 included in the output signal of the single-phase converter 114, as shown in FIG. 57, and the adjustment signal and the transfer signal are signals that have undergone spread modulation with different spread codes.

Figure 58:
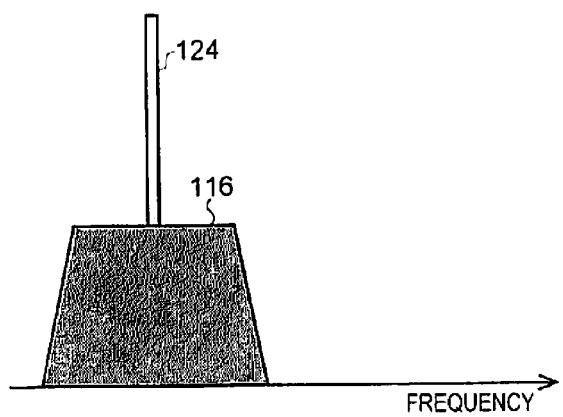
FIG. 58 is a graph of the output signal of the first inverse spread processor in the eighteenth embodiment.
Figure 59:
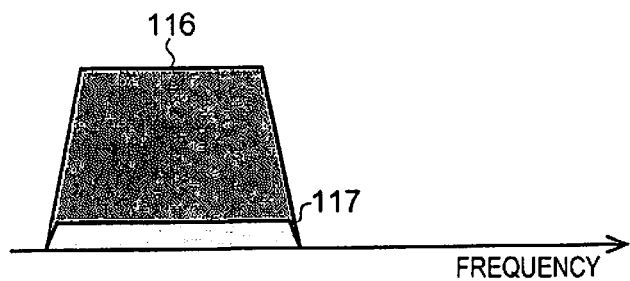
FIG. 59 is a graph of the signal transferred from the single-phase converter to a transmission level controller, without going through an inverse spread processor, in the eighteenth embodiment.

The first inverse spread processor 125 performs inverse spread processing using the spread code of the transfer signal. Accordingly, as shown in FIG. 58, the level of the inversely spread transfer signal component 124 included in the output signal of the first inverse spread processor 125 is sufficiently higher than the level of the adjustment signal component 116 included in the output signal of the first inverse spread processor 125. Consequently, the inversely spread transfer signal component 124 can be easily extracted by the transmission level controller 29.

To maintain good signal quality of the transfer signal after demodulation by the demodulator 47, the adjustment signal is kept at a level that is usually lower than that of the transfer signal, but as long as the transfer signal component included in the output signal of the single-phase converter 114 is kept by in-phase combination at the single-phase converter 114 to a level that is usually sufficiently lower than that of the adjustment signal component included in the output signal of the single-phase converter 114, then even if the second inverse spread processor 126 is omitted, the transmission level controller 29 of this embodiment will still be able to perform the same control as in the seventeenth embodiment.

Even with a signal that has undergone in-phase combination at the single-phase converter 114, if the adjustment signal is outputted at a level that is lower than that of the transfer signal, the transmission level controller 29 in this embodiment can perform the same control as in the seventeenth embodiment even if the first inverse spread processor 125 is omitted instead of the second inverse spread processor 126.

In this embodiment the first inverse spread processor 125 is provided between the single-phase converter 28 and the transmission level controller 29 when the second inverse spread processor 126 is omitted, but the configuration may be such that the first inverse spread processor 125 is provided inside the transmission level controller 29. Furthermore, in this case it does not matter whether the adjustment signal is a signal that has undergone spread modulation.

Also, in this embodiment the second inverse spread processor 126 is provided between the single-phase converter 28 and the transmission level controller 29 when the first inverse spread processor 125 is omitted, but the configuration may be such that the second inverse spread processor 126 is provided inside the transmission level controller 29. Furthermore, in this case it does not matter whether the transfer signal is a signal that has undergone spread modulation.

In this embodiment, any of the sixth to eleventh embodiments (including the modification examples described in the various embodiments) may be employed as the configuration between the single-phase converter 28 and the transmission level controller 29.

Nineteenth Embodiment

Figure 60:
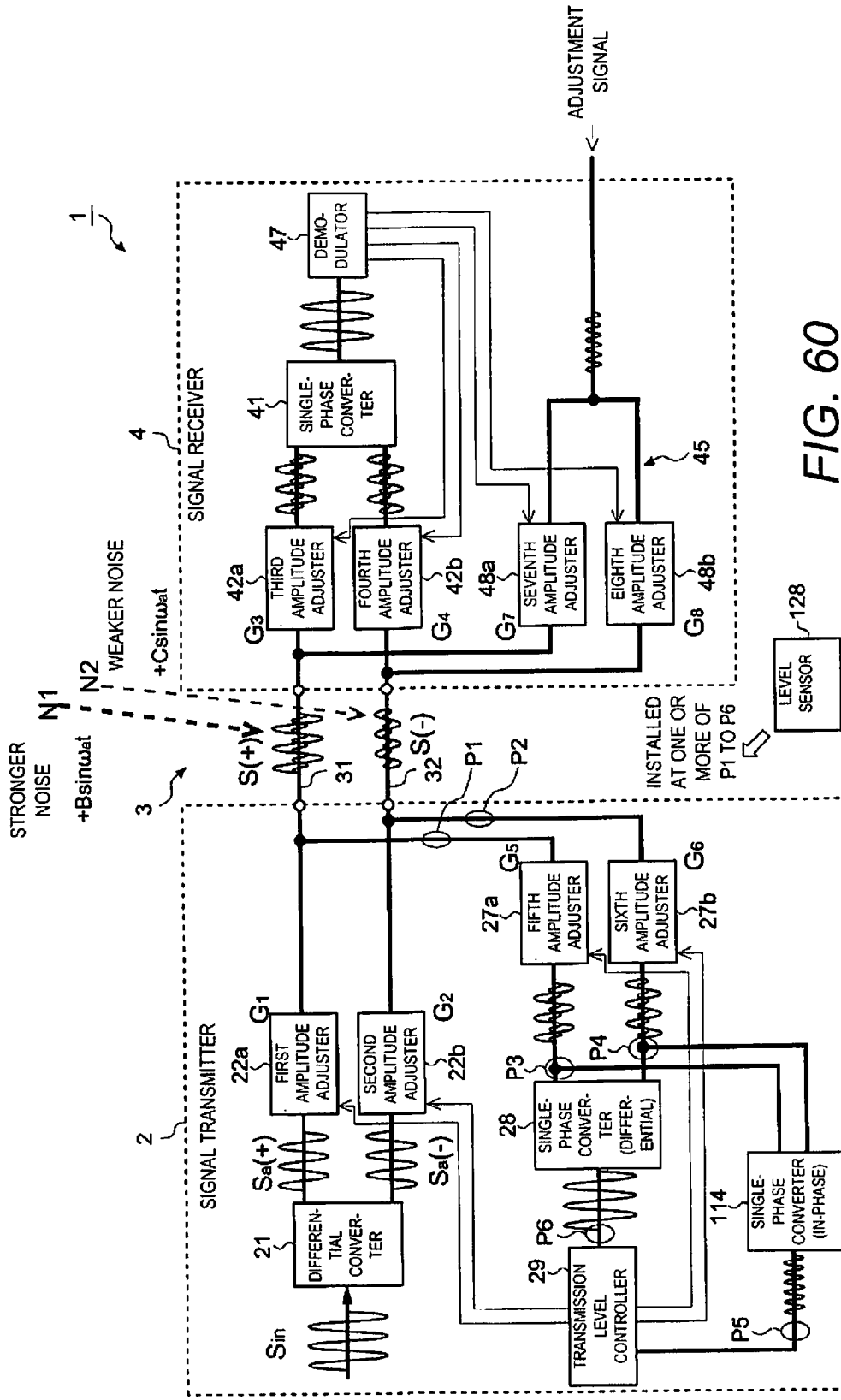
FIG. 60 is a conceptual partial configuration diagram showing an example of the signal transfer device pertaining to a nineteenth embodiment.

As shown in FIG. 60, the configuration of the signal transfer device 1 pertaining to the nineteenth embodiment is one in which a level sensor 128 that senses the absolute level of a signal is provided to one or more insertion candidate places P1 to P6 of the signal transfer device 1 pertaining to the twelfth embodiment. Thus, in FIG. 60, those components that are the same as or similar to those in FIG. 37 are numbered the same and will not be described in detail.

The insertion candidate places P1 to P6 are places where path loss can be detected from the level of an adjustment signal.

Here, we will let $L_1$ be the loss on the signal path over which the input signal Sin is transferred, $L_2$ be the loss on the transfer paths 3 in the section up to the place where noise is superposed on the transfer paths 3 from the signal transmitter 2, and $L_3$ be the loss on the transfer paths 3 in the section up to the signal receiver 4 from the place where noise is superposed on the transfer paths 3.

Signals Sc(+) and Sc(−) at the insertion candidate places P1 and P2 are as follows.

$$Sc(+)=G_1(A/2)L_1 \sin \omega t+G_7L_2L_3F \sin \omega_p t+L_2B \sin \omega_n t$$

$$Sc(-)=-G_2(A/2)L_1 \sin \omega t+G_8L_2L_3F \sin \omega_p t+L_2C \sin \omega_n T$$

Signals Se(+) and Se(−) at the insertion candidate places P3 and P4 are as follows.

$$Se(+)=G_1G_5(A/2)L_1 \sin \omega t+G_7G_5L_2L_3F \sin \omega_p t+G_5L_2B \sin \omega_n t$$

$$Se(-)=-G_2G_6(A/2)L_1 \sin \omega t+G_8G_6L_2L_3F \sin \omega_p t+G_6L_2C \sin \omega_n T$$

A signal Sg at the insertion candidate place P5 is as follows.

$$Sg=(G_1G_5-G_2G_6)(A/2)L_1 \sin \omega t+(G_7G_5+G_8G_6)L_2L_3F \sin \omega_p t+(G_5B+G_6C)L_2B \sin \omega_n t$$

A signal Sf at the insertion candidate place P6 is as follows.

$$Sf=(G_1G_5+G_2G_6)(A/2)L_1 \sin \omega t+(G_7G_5-G_8G_6)(L_2L_3F \sin \omega_p t+(G_5B-G_6C)L_2 \sin \omega_n t$$

The losses $L_2$ and $L_3$ on the transfer paths 3 are included with respect to the term (F sin $\omega_p$t) expressing the adjustment signal component for each signal at the insertion candidate places P1 to P6. Specifically, the adjustment signal component of each signal at the insertion candidate places P1 to P6 is proportional to the loss on the transfer paths 3. Therefore, providing the level sensor 128 at one or more of the insertion candidate places P1 to P6 makes it possible to sense the loss on the transfer paths 3 and control so that this loss is compensated for.

Because the adjustment signal at the insertion candidate place P6 is controlled so that it is canceled out and approaches zero, the level sensor 128 is preferably provided at one or more of the insertion candidate places P1 to P5.

The installation of the sensors at the insertion candidate places P5 and P6 may be inside the transmission level controller.

In the illustrated embodiment, with the signal transfer device 1 mentioned above, the signal transmitter 2 has the level sensor 128. The level sensor 128 is configured to sense the level of the adjustment signal component.

In this embodiment, any of the sixth to eleventh embodiments (including the modification examples described in the various embodiments) may be employed as the configuration between the single-phase converter 28 and the transmission level controller 29. In this case, the insertion candidate place P6 may be provided at the location where this configuration is employed.

Also, in this embodiment, any of the modification examples of the thirteenth to eighteenth embodiments (including the modification examples described in the various embodiments) may be employed as the configuration between the single-phase converter 114 and the transmission level controller 29. In this case, the insertion candidate place P5 may be provided at the location where this configuration is employed.

In this embodiment, the following situations can be handled by applying an amplitude control method so that loss on the transfer paths 3 is sensed, and this loss is compensated for.

(1) When loss on the transfer paths, etc., prevents a signal from being received at a sufficient level by the signal receiver 4.

(2) When there is a high level of noise coming into the transfer paths, and the signal level is to be raised to suppress the effect of noise.

With a system in which a dedicated amplitude control line (AGC gain) is provided, such as a tuner circuit, spacing saving and other significant benefits can be obtained if the dedicated amplitude control line is omitted and the transfer paths are used to control amplitude.

Superposition of Various Other Information Over Adjustment Signals

In the various embodiments, it is also possible to use a configuration in which various information signals are superposed over an adjustment signal and transmitted, and the information is read on the receiving side. In this case, a reader for reading information signals superposed over adjustment signals is installed on the receiving side.

For example, when an information signal is superposed over an adjustment signal in the nineteenth embodiment, a reader for reading the information signal superposed over the adjustment signal (superposed signal) is installed in the signal transmitter 2. The reader for reading superposed signals can be installed at any of the insertion candidate places P1 to P6. However, since the adjustment signal at the insertion candidate place P6 is controlled so as to be cancelled out and approach zero, the reader for reading superposed signals is preferably provided at one or more of the insertion candidate places P1 to P5.

The installation of the sensors at the insertion candidate places P5 and P6 may be inside the transmission level controller.

The content of the superposed signal may be amplitude balance information or amplitude information, or may be control parameters or other such control information, or the like. As to amplitude balance and amplitude information, the method for transferring has been described with a method that does not involve the use of a superposed signal in the various embodiments above, but sensing accuracy can be enhanced if this information is transferred with superposed signals as well.

The following benefits can be anticipated from employing a configuration in which various information signals are superposed with adjustment signals and transmitted, and the information is read on the receiving side.

(1) A spacing saving due to being able to cut down on the dedicated lines used for transmitting various information signals.

(2) A reduction in the effect caused by noise on dedicated lines used for transmitting various information signals.

The benefit in (2) above can be realized by selecting a superposition method for the superposed signal that is good at resisting noise. For instance, the spread modulation used in the ninth embodiment, etc., is resistant to noise, so spread modulation may be applied to superposed signals.

In the illustrated embodiment, the signal transfer device 1 further comprises the reader. The reader is configured to read the information signal that is superposed over the adjustment signals. The reader can include a hardware or software structure that is well-known in the art for reading the information signals. Thus, the detailed explanation of the configuration of the reader will be omitted for the sake of brevity.

Control Timing

The adjustment (control) of amplitude balance and amplitude level in the various embodiments can be applied to wired communication circuits within various kinds of device and between devices, but there will be situations in which the control method to be applied will vary with the model of stationary device, mobile device, etc.

With mobile devices or devices that include wireless communication or wireless broadcasting, the reception signal is not always in the same environment, and the signal level and noise incidence conditions are continually changing. For example, loss on a signal path over which the input signal Sin is transferred, and noise flowing into the transfer paths 3 are always fluctuating. In this situation, the amplitude level and amplitude balance of a signal is preferably monitored at all times and subjected to feedback control.

Meanwhile, with a stationary device, since the signal environment is not constantly changing, it is usually sufficient to perform feedback control when a few events occur with which there is the possibility that the signal environment will change. Compare to a mobile device or a device that includes wireless communication or wireless broadcasting, with a stationary device it is safe to assume that there is almost no fluctuation in the loss on the signal path over which the input signal Sin is transferred. Therefore, with a stationary device, it is preferable to execute one or more of Nos. 3 to 10 that indicate the control timing in FIG. 61, for example. With a configuration in which one or more of Nos. 3 to 10 that indicate the control timing in FIG. 61 are executed, once a specific length of time has elapsed since a specific event has occurred and a switch is made to feedback control, the feedback control may be ended and the control turned off or returned to fixed value control.

The control timing in FIG. 61 will now be described briefly.

With control timing No. 1 in FIG. 61, no communication operation is in progress, so no control is needed. Therefore, control is off for both a stationary device and a mobile device or the like.

With control timing No. 2 in FIG. 61, for a stationary device, a steady continuing communication state is assumed in which there are no particular changes in the signal environment, so no feedback control is performed, and fixed value control is performed in which the control value (the result of measuring the level of the transfer signal and the result of detecting the adjustment signal component at the transmission level controller 29) is fixed. On the other hand, with a mobile device or the like, the signal environment is changing all the time, so feedback control is performed.

With control timing No. 3 in FIG. 61, feedback control is performed at the start of communication for both a stationary device and a mobile device or the like.

With control timing No. 4 in FIG. 61, feedback control is performed at the point when there is a change in the communication rate, the signal channel, the hierarchical selection of a hierarchical signal, the synchronization method, or other communication conditions, for both a stationary device and a mobile device or the like.

With control timing No. 5 in FIG. 61, feedback control is performed at the point when the transmitting device (the device equipped with the signal transmitter 2) or the receiving device (the device equipped with the signal receiver 4) starts operating, for both a stationary device and a mobile device or the like. Conceivable situations in which the transmitting device or the receiving device starts operating are when power is supplied from a power supply and the transmitting device or receiving device starts operating automatically, and when a command in the form of a control signal or the like is received and the transmitting device or receiving device starts operating.

With control timing No. 6 in FIG. 61, feedback control is performed at the point when the transmitting device or receiving device is connected to the transfer paths 3, for both a stationary device and a mobile device or the like. There are two possible points when the transmitting device or receiving device is connected to the transfer paths 3. One is the point when a cable is connected between the transmitting and receiving devices, where the transmitting device and the receiving device are in independent devices. The other is the point when a fixed signal path is wired between the transmitting and receiving devices, where the transmitting device or receiving device are in the same device, and when this fixed signal path goes from a disable state (a state of not being electrically connected) to an enabled state (a state of being electrically connected).

With control timing No. 7 in FIG. 61, feedback control is performed at the point when degradation is confirmed that exceeds the permissible range of signal quality (S/N, etc.), for both a stationary device and a mobile device or the like. When degradation that exceeds the permissible range of signal quality (S/N, etc.) has been confirmed, it is particularly important to perform feedback control. In this case, since it is necessary to improve the degraded signal quality, it is necessary to check both the signal amplitude level and amplitude balance to see whether they are the cause of degradation in signal quality, and to see whether this can be optimized by feedback control.

With control timing No. 8 in FIG. 61, feedback control is performed at the point when there is a change in the operating conditions, at the start of operation of another circuit, etc., at the transmitting device and/or the receiving device, this generates noise, and there is the possibility that noise will affect communication between the transmitting and receiving devices, for both a stationary device and mobile device or the like.

With control timing No. 9 in FIG. 61, feedback control is performed at the point when there is the possibility that noise from the transmitting device or the receiving device will affect another circuit, and there is a request from the other circuit to the transmitting device or the receiving device to change the communication operating conditions (amplitude balance, amplitude level) in order to reduce said noise, for both a stationary device and mobile device or the like.

With control timing No. 10 in FIG. 61, feedback control is performed by checking the signal state at regular time intervals in which there is the possibility that a change in the environment will occur over time, such as the temperature or the usage status of another device, aside from Nos. 2 to 9 above, for both a stationary device and mobile device or the like.

In the illustrated embodiments, with the signal transfer device 1 mentioned above, when the specific event occurs, feedback control is executed by the adjustment signal detector 44, the adjustment signal detector 24, or the transmission level controller 29 (e.g., detector), and the third and fourth amplitude adjusters 42a and 42b or the first and second amplitude adjusters 22a and 22b (e.g., second amplitude adjustment component). When the specific event does not occur, the second amplitude adjustment component is configured to fix the detection result of the detector to fix the amplitudes of the first and second transfer signals S(+) and S(−) transferred to the first and second transfer paths 31 and 32 based on detection result of the detector.

Other

Embodiments of the present invention are described above. These embodiments are just examples, and it will be understood by a person skilled in the art that various modifications are possible in the combinations of constituent elements and processing, and that these modifications fall within the scope of the present invention.

In the illustrated embodiments described above, the signal transfer device 1 can also include controller for controlling various parts of the signal transmitter 2 and the signal receiver 4. The controller can be a single processor or microcomputer for controlling the various parts of the signal transmitter 2 and the signal receiver 4, or separate processors or microcomputers for controlling the various parts of the signal transmitter 2 and the signal receiver 4.

Specifically, the controller preferably includes the processor(s) or microcomputer(s) with control programs that control the various parts of the signal transmitter 2 and the signal receiver 4. The controller can also include other conventional components such as an input interface circuit, an output interface circuit, and storage devices such as a ROM (Read Only Memory) device and a RAM (Random Access Memory) device. The is programmed to control the various parts of the signal transmitter 2 and the signal receiver 4. The memory circuit stores processing results and control programs. The internal RAM of the controller stores statuses of operational flags and various control data. The internal ROM of the controller stores the control programs for various operations. It will be apparent to those skilled in the art from this disclosure that the precise structure and algorithms for controller can be any combination of hardware and software that will carry out the functions of the present invention. Thus, the parts of the signal transmitter 2 and the signal receiver 4 can be suitably realized by the hardwares (circuits) or softwares executed by the controller, as desired and/or needed. For example, the parts of the signal transmitter 2 and the signal receiver 4 pertaining to the first to nineteenth embodiments can be formed by the circuits, respectively, that are controlled by the processor(s) or microcomputer(s) of the signal transfer device 1. Also, the parts of the signal transmitter 2 and the signal receiver 4 pertaining to the first to nineteenth embodiments can be formed by the softwares executed by the processor(s) or microcomputer(s) of the signal transfer device 1.

To achieve the stated object, the signal transfer device pertaining to the present invention comprises a signal transmitter that transmits first and second transfer signals of mutually opposite phase, a first transfer path over which the first transfer signal is transferred, a second transfer path over which the second transfer signal is transferred, and a signal receiver that converts the first transfer signal received from the first transfer path and the second transfer signal received from the second transfer path into single-phase output signals, wherein an amplitude adjustment means for dissimilating the amplitudes of the first and second transfer signals received from the signal receiver is provided to at least one of the signal transmitter and the first and second transfer paths, the signal receiver comprises a converter that converts the received first and second transfer signals based on the amplitude ratio of the first and second transfer signals adjusted by the amplitude adjustment means, one of the signal transmitter and the signal receiver has a superposition component that superposes a first adjustment signal over a first transfer signal, and superposes a second adjustment signal that is in the same phase as the first adjustment signal over a second transfer signal, and the other one of the signal transmitter and the signal receiver has a detector that detects a first adjustment signal transferred by the first transfer path and a second adjustment signal transferred by the second transfer path, and an amplitude variation component that varies the amplitude of the first and second transfer signals based on the detection result of the detector (first configuration).

With this configuration, first and second transfer signals of mutually opposite phase that are set to different amplitudes are transferred, and the transferred first and second transfer signals are converted into single-phase output signals based on the amplitude ratio of the first and second transfer signals adjusted by an amplitude adjustment means. Accordingly, even if noise signals of different amplitude are superposed during the transfer of the first and second transfer signals, the effect of the noise signals can be reduced when the first and second transfer signals are converted into single-phase output signals. Therefore, the effect that noise signals of different amplitude have on differential signals can be effectively reduced. Also, with this configuration, the other one of the signal transmitter and signal receiver can execute gain balance suited to the gain balance determined by one of the signal transmitter and the signal receiver, based on an adjustment signal. There is therefore no need for a control line to transfer control signals.

With the signal transfer device having the above-mentioned first configuration, the signal receiver has a superposition component that superposes a first adjustment signal with the first transfer path, and superposes a second adjustment signal that is in the same phase as the first adjustment signal over a second transfer signal, and the signal transmitter has a detector that detects a first adjustment signal transferred by the first transfer path and a second adjustment signal transferred by the second transfer path, and an amplitude variation component that varies the amplitude of the first and second transfer signals based on the detection result of the detector (second configuration).

With this configuration, when the quality of a transfer signal that is transferred from the signal transmitter is evaluated by the signal receiver, the gain balance can be determined by the signal receiver based on the evaluation result.

With the signal transfer device having the above-mentioned second configuration, it is preferable if the signal receiver comprises a reception-side amplifier at a stage subsequent to the superposition component (third configuration).

With this configuration, signal amplification can be performed by the signal receiver.

With the signal transfer device having the above-mentioned second or third configuration, it is preferable if the signal transmitter comprises a transmission-side amplifier at a stage prior to the detector (fourth configuration).

With this configuration, signal amplification can be performed by the signal transmitter.

With the signal transfer device having any of the above-mentioned first to fourth configurations, the first and second adjustment signals are spread signals (fifth configuration).

With this configuration, there will be less of a decrease in the accuracy of control by adjustment signals, without markedly compromising the signal quality of the data signals that are being transferred.

With the signal transfer device having any of the above-mentioned second to fourth configurations, it is preferable if the detector has a differential combiner that performs differential combination on signals produced by amplifying the signals of the first and second transfer paths (sixth configuration).

With this configuration, the first and second adjustment signal components can be bundled together and processed at a stage subsequent to the differential combiner.

With the signal transfer device having the above-mentioned sixth configuration, it is preferable if the detector further has an extractor that extracts first and second adjustment signal components from the differential combination signal of the differential combiner (seventh configuration).

With this configuration, the first and second adjustment signal components can be measured accurately.

With the signal transfer device having the above-mentioned sixth configuration, it is preferable if the detector further has a splitter that splits the differential combination signal of the differential combiner, and a first extractor that extracts first and second adjustment signal components from one output of the splitter (eighth configuration).

With this configuration, the first and second transfer signal components can be transferred at a stage subsequent to the differential combiner, even though a first extractor is provided.

With the signal transfer device having the above-mentioned eighth configuration, it is preferable if the detector further has a second extractor that extracts first and second transfer signal components from the other output of the splitter, and also detects first and second transfer signal components (ninth configuration).

With this configuration, the first and second transfer signal components can be measured accurately even when there is only a small level difference between the first and second adjustment signal components and the first and second transfer signal components.

With the signal transfer device having the above-mentioned sixth configuration, it is preferable if the first and second adjustment signals are spread signals, and the detector further has an inverse spread processor that inversely spreads the differential combination signal of the differential combiner (tenth configuration).

With this configuration, the first and second adjustment signal components can be measured accurately.

With the signal transfer device having the above-mentioned sixth configuration, it is preferable if the first and second adjustment signals are spread signals that are spread with a first spread code, and the detector further has a splitter that splits the differential combination signal of the differential combiner, and a first inverse spread processor that inversely spreads one output of the splitter using a first spread code (eleventh configuration).

With this configuration, the inversely spread first and second adjustment signals have a higher level, but first and second transfer signal components can be transferred at a stage subsequent to the differential combiner, apart from these signals with a high level.

With the signal transfer device having the above-mentioned eleventh configuration, it is preferable if the first and second transfer signals are spread signals that are spread with a second spread code, and the detector further has a second inverse spread processor that inversely spreads the other output of the splitter using the second spread code, and also detects first and second transfer signal components (twelfth configuration).

With this configuration, the first and second transfer signal components can be measured accurately even when there is only a small level difference between the first and second adjustment signal components and the first and second transfer signal components.

With the signal transfer device having any of the above-mentioned sixth to twelfth configurations, it is preferable if the detector has an in-phase combiner that performs in-phase combination on signals produced by amplifying the signals of the first and second transfer paths, and also detects first and second transfer signal components (thirteenth configuration).

With this configuration, the first and second transfer signal components can be bundled together and processed at a stage subsequent to the in-phase combiner.

With the signal transfer device having the above-mentioned thirteenth configuration, it is preferable if the detector further has an in-phase combination-side extractor that extracts either first and second transfer signal components or first and second adjustment signal components from the in-phase combination signals of the in-phase combiner (fourteenth configuration).

With this configuration, the first and second transfer signal components or the first and second adjustment signal components can be accurately measured.

With the signal transfer device having the above-mentioned thirteenth configuration, it is preferable if the detector further has an in-phase combination-side splitter that splits the in-phase combination signals of the in-phase combiner, and a first in-phase combination-side extractor that extracts one of first and second transfer signal components and first and second adjustment signal components from one output of the in-phase combination-side splitter (fifteenth configuration).

With this configuration, even though a first in-phase combination-side extractor is provided, the other one of the first and second transfer signal components and the first and second adjustment signal components can be transferred at a stage subsequent to the differential combiner.

With the signal transfer device having the above-mentioned fifteenth configuration, it is preferable if the detector further has a second in-phase combination-side extractor that extracts the other one of the first and second transfer signal components and first and second adjustment signal components from the other output of the in-phase combination-side splitter (sixteenth configuration).

With this configuration, the other one of the first and second transfer signal components and the first and second adjustment signal components can be measured accurately even when there is only a small level difference between the first and second adjustment signal components and the first and second transfer signal components.

With the signal transfer device having the above-mentioned thirteenth configuration, it is preferable if the first and second transfer signals or the first and second adjustment signals are spread signals, and the detector further has an in-phase combination-side inverse spread processor that inversely spreads the in-phase combination signals of the in-phase combiner (seventeenth configuration).

With this configuration, the first and second transfer signal components or the first and second adjustment signal components can be accurately measured.

With the signal transfer device having the above-mentioned thirteenth configuration, it is preferable if one of the first and second transfer signals and the first and second adjustment signals are spread signals that are spread with a specific spread code, and the detector further has an in-phase combination-side splitter that splits the in-phase combination signals of the in-phase combiner, and a first in-phase combination-side inverse spread processor that inversely spreads one output of the in-phase combination-side splitter using the specific spread code (eighteenth configuration).

With this configuration, the inversely spread one of first and second transfer signals and the first and second adjustment signals will have a higher level, but the other one of the first and second transfer signals and the first and second adjustment signals can be transferred at a stage subsequent to the differential combiner, apart from these signals with a high level.

With the signal transfer device having the above-mentioned eighteenth configuration, it is preferable if the other one of the first and second transfer signals and the first and second adjustment signals are spread signals that are spread with the other specific spread code, and the detector further has a second in-phase combination-side inverse spread processor that inversely spreads the other output of the in-phase combination-side splitter using the other specific spread code (nineteenth configuration).

With this configuration, the other one of the first and second transfer signal components and the first and second adjustment signals can be measured accurately even when there is only a small level difference between the first and second adjustment signal components and the first and second transfer signal components.

With the signal transfer device according to any of the above-mentioned sixth to nineteenth configurations, it is preferable if the signal transmitter has a level sensor that senses the level of a first adjustment signal component, the level of a second adjustment signal component, or the level of first and second adjustment signal components (twentieth configuration).

With this configuration, any loss on the first transfer path included in the first adjustment signal component and/or any loss on the second transfer path included in the second adjustment signal component can be sensed, so the device can be controlled so as to compensate for loss on the first transfer path and/or loss on the second transfer path.

With the signal transfer device according to any of the above-mentioned first to twentieth configurations, it is preferable if an information signal is superposed over the first and second adjustment signals, and the other one of the signal transmitter and the signal receiver has a reader that reads the information signal (twenty-first configuration).

With this configuration, information can be transferred using the first and second transfer paths, without providing any dedicated line for transmitting various kinds of information.

With the signal transfer device according to any of the above-mentioned first to twenty-first configurations, it is preferable if, when a specific event occurs, feedback control is executed by the detector and the amplitude variation component, and at least sometimes when the specific event has not occurred, the amplitude variation component fixes the detection result of the detector and thereby fixes the amplitude of the first and second transfer signals (twenty-second configuration).

With this configuration, a control method that is suited to a stationary device can be obtained. Feedback control can be reduced, and better control stability can be achieved.

To achieve the stated object, the signal transfer method pertaining to the present invention comprises the steps of transmitting first and second transfer signals of mutually opposite phase, transferring the first transfer signal along a first transfer path and the second transfer signal along a second transfer path, receiving the first transfer signal from the first transfer path and the second transfer signal from the second transfer path, and converting the first and second transfer signals received in the step of receiving into single-phase output signals, wherein the step of transmitting and/or the step of transferring includes a step of dissimilating the amplitudes of the first and second transfer signals transferred in the step of transferring, in the step of receiving, the first and second transfer signals transferred in the step of transferring are converted based on the amplitude ratio of the first and second transfer signals adjusted in the step of dissimilating, one of the step of transmitting and the step of receiving involves superposing a first adjustment signal over a first transfer signal and superposing a second adjustment signal that is in the same phase as the first adjustment signal over a second transfer signal, and the other one of the step of transmitting and the step of receiving involves detecting the first adjustment signal transferred by the first transfer path and the second adjustment signal transferred by the second transfer path, and varying the amplitude of the first and second transfer signals based on the detection result (twenty-third configuration).

With this configuration, the same effect can be obtained as with the signal transfer device of the above-mentioned first configuration. Specifically, the effect that noise signals of different amplitude have on differential signals can be effectively reduced, and there is no need for any control lines that transfer control signals.

The present invention provides a signal transfer device and a signal transfer method with which the effect that noise signals of different amplitude have on differential signals can be effectively reduced, and there is no need for any control lines that transfer control signals.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A signal transfer device comprising:
a signal transmitter that outputs differential output pair of signals to first and second transfer paths based on differential input pair of signals, the signal transmitter including a first amplitude adjuster that adjusts an amplitude of at least one of a pair of modified differential signals based on a predetermined amplitude ratio to generate the differential output pair of signals transferred to the first and second transfer paths; wherein the pair of modified differential signals are based on the differential input pair of signals and adjustment signals; and
a signal receiver including a detector that detects the adjustment signals in the differential output pair of signals received via the first and second transfer paths and a second amplitude adjuster that adjusts an amplitude of at least one of a subsequent pair of the differential output pair of signals outputted by the signal transmitter based on the adjustment signals detected by the detector.

2. The signal transfer device according to claim 1, wherein
the signal transmitter includes a first converter that converts a single-phase input signal to the differential input pair of signals, the differential input pair of signals being signals of mutually opposite phase.

3. The signal transfer device according to claim 1, wherein
the signal receiver further includes a second converter that converts the differential output pair of signals received via the first and second transfer paths to a single-phase output signal,
the second converter converting the differential output pair of signals based on the predetermined amplitude ratio.

4. The signal transfer device according to claim 1, wherein
the adjustment signals received via the first and second transfer paths are signals of the same phase.

5. The signal transfer device according to claim 1, wherein
the detector detects the adjustment signals that are transferred to an output signal transfer path over which a single-phase output signal is transferred.

6. The signal transfer device according to claim 1, wherein
the first amplitude adjuster adjusts amplitude ratio of amplitudes of the pair of modified differential signals transferred to the first and second transfer paths to the predetermined amplitude ratio.

7. The signal transfer device according to claim 1, wherein
the signal transmitter further includes a reader that reads information signal that is superposed over the adjustment signals.

8. The signal transfer device according to claim 1, wherein
when a specific event occurs, feedback control is executed by the detector and the second amplitude adjuster, and
when the specific event does not occur, the second amplitude adjuster fixes detection result of the detector to fix amplitudes of the differential output pair of signals received via the first and second transfer paths based on the detection result of the detector.

* * * * *